US011073373B2

(12) United States Patent
Gordon

(10) Patent No.: US 11,073,373 B2
(45) Date of Patent: Jul. 27, 2021

(54) NON-CONTACT COORDINATE MEASURING MACHINE USING A NONCONTACT METROLOGY PROBE

(71) Applicant: Government of the United States of America, as represented by the Secretary of Commerce, Gaithersburg, MD (US)

(72) Inventor: Joshua A. Gordon, Lafayette, CO (US)

(73) Assignee: GOVERNMENT OF THE UNITED STATES OF AMERICA, AS REPRESENTED BY THE SECRETARY OF COMMERCE, Gaithersburg, MD (US)

( * ) Notice: Subject to any disclaimer, the term of this patent is extended or adjusted under 35 U.S.C. 154(b) by 49 days.

(21) Appl. No.: 16/545,235

(22) Filed: Aug. 20, 2019

(65) Prior Publication Data
US 2020/0064119 A1   Feb. 27, 2020

Related U.S. Application Data

(60) Provisional application No. 62/721,099, filed on Aug. 22, 2018.

(51) Int. Cl.
*G01B 5/008* (2006.01)
*G01B 11/00* (2006.01)
(Continued)

(52) U.S. Cl.
CPC ............ *G01B 11/005* (2013.01); *G01B 5/008* (2013.01); *G01B 21/042* (2013.01); *G06T 7/80* (2017.01); *G06T 2207/30204* (2013.01)

(58) Field of Classification Search
CPC ............................ G01B 11/005; G01B 21/047
(Continued)

(56) References Cited

U.S. PATENT DOCUMENTS 7,506,451 B1 *  3/2009  Ding ................. G01R 31/2891
                                                      33/286
10,078,898 B2    9/2018  Gordon
(Continued)

OTHER PUBLICATIONS

Muralikrishnan, B., et al., "Laser trackers for large-scale dimensional metrology: a review", Precision Engineering, 2016, p. 13-28, vol. 44.
(Continued)

*Primary Examiner* — George B Bennett
(74) *Attorney, Agent, or Firm* — Office of Chief Counsel for National Institute of Standards and Technology

(57) ABSTRACT

A non-contact coordinate measuring machine includes: a noncontact metrology probe including: first and second cameras, wherein the second camera has a second field of view that overlaps a first field of view in a prime focal volume; a third camera has a third field of view that overlaps the prime focal volume and forms a probe focal volume; a multidimensional motion stage comprising: a machine coordinate system and motion arms that move the noncontact metrology probe in a machine coordinate system; a camera platform on which the cameras are disposed; a tracker with a world coordinate system and that determines a location of the probe focal volume in a tracker field of view, the non-contact coordinate measuring machine having the non-contact metrology probe for non-contact coordinate measurement of an object in an absence a stylus and in an absence of physical contact with the object.

17 Claims, 53 Drawing Sheets

(51) Int. Cl.
*G01B 21/04* (2006.01)
*G06T 7/80* (2017.01)

(58) Field of Classification Search
USPC .......................................................... 33/503
See application file for complete search history.

(56) References Cited

U.S. PATENT DOCUMENTS

| | | | | |
|---|---|---|---|---|
| 2008/0127501 | A1* | 6/2008 | Eaton | G01B 21/047 33/503 |
| 2009/0013548 | A1* | 1/2009 | Ferrari | G01B 21/04 33/503 |
| 2015/0211847 | A1* | 7/2015 | Abe | G01B 21/04 33/503 |
| 2015/0241203 | A1* | 8/2015 | Jordil | G01B 11/005 356/4.01 |
| 2015/0345932 | A1* | 12/2015 | Wakai | G01B 21/047 33/503 |
| 2016/0071272 | A1* | 3/2016 | Gordon | G01B 11/245 348/48 |
| 2016/0084633 | A1* | 3/2016 | Ferrari | G01B 11/005 33/503 |
| 2017/0227355 | A1* | 8/2017 | Pettersson | B25J 9/0063 |
| 2019/0145764 | A1* | 5/2019 | Atherton | G01B 21/047 33/503 |
| 2021/0025692 | A1* | 1/2021 | Nahum | B25J 9/1697 |

OTHER PUBLICATIONS

Petz, M., et al., "Tactile-optical probes for three-dimensional microparts", Measurements, 2012, p. 2288-2298, vol. 45.

Cuypers, W., et al., "Optical measurement techniques for mobile and large-scale dimensional metrology", Optics and Lasers in Engineering, 2009, p. 292-300, vol. 47.

Isa, M.A., et al., "Design and analysis of a 3D laser scanner", Measurement, 2017, p. 122-133, vol. 111.

Bos, E.J.C., "Aspects of tactile probing on the micro scale", Precision Engineering, 2011, p. 228-240, vol. 35.

Pereira, P.H., "Cartesian Coordinate Measuring Machines", Coordinate Measuring Machines and Systems, 2017, p. 57-79.

Weckenmann, A., et al., "Probing Systems for Coordinate Measuring Machines", Coordinate Measuring Machines and Systems, 2017, p. 93-124.

Christoph, R., et al., "Multisensor Coordinate Metrology", Coordinate Measuring Machines and Systems, 2017, p. 125-151.

* cited by examiner

NON-CONTACT COORDINATE MEASURING MACHINE USING A NONCONTACT METROLOGY PROBE

CROSS REFERENCE TO RELATED APPLICATIONS

The application claims priority to U.S. Provisional Patent Application Ser. No. 62/721,099 filed Aug. 22, 2018, the disclosure of which is incorporated herein by reference in its entirety.

STATEMENT REGARDING FEDERALLY SPONSORED RESEARCH

This invention was made with United States Government support from the National Institute of Standards and Technology (NIST), an agency of the United States Department of Commerce. The Government has certain rights in the invention. Licensing inquiries may be directed to the Technology Partnerships Office, NIST, Gaithersburg, Md., 20899; voice (301) 301-975-2573; email tpo@nist.gov; reference NIST Docket Number 18-059US1.

BRIEF DESCRIPTION

Disclosed is a non-contact coordinate measuring machine comprising: a noncontact metrology probe comprising: a first camera comprising a first field of view and a first coordinate system; a second camera comprising a second field of view and a second coordinate system, the second camera arranged such that the second field of view overlaps the first field of view and forms a prime focal volume; and a third camera comprising a third field of view and a third coordinate system, the third camera arranged such that the third field of view overlaps the prime focal volume and forms a probe focal volume; a multidimensional motion stage in communication with the noncontact metrology probe on which the noncontact metrology probe is disposed and comprising: a machine coordinate system in which the multidimensional motion stage moves the noncontact metrology probe; a first motion arm that moves the noncontact metrology probe along a first machine direction of the machine coordinate system; a second motion arm that moves the noncontact metrology probe along a second machine direction of the machine coordinate system; and a third motion arm that moves the noncontact metrology probe along a third machine direction of the machine coordinate system; a camera platform disposed on the multidimensional motion stage and interposed between the multidimensional motion stage and the noncontact metrology probe such that the camera platform communicates motion of the first motion arm, the second motion arm, and the third motion arm to the noncontact metrology probe; a tracker comprising: a tracker field of view; and a world coordinate system to which an element in the tracker field of view is provided a world coordinate, wherein the tracker: optically overlaps the probe focal volume; and determines a location of the probe focal volume in the tracker field of view, the non-contact coordinate measuring machine having the noncontact metrology probe for non-contact coordinate measurement of an object in an absence a stylus and absence of physical contact with the object.

Disclosed is a process for calibrating the non-contact coordinate measuring machine, the process comprising: disposing a reference member in the probe focal volume of the non-contact coordinate measuring machine with the multidimensional motion stage at a first position; obtaining, by the first camera, a first reference image centroid of the reference member; obtaining, by the second camera, a second reference image centroid of the reference member; obtaining, by the third camera, a third reference image centroid of the reference member, a first set of image centroids comprising the first reference image centroid, the second reference image centroid, and the third reference image centroid; moving multidimensional motion stage to a second position, such that reference member has a second set of image centroids; measuring, by the tracker, a three-dimensional location of the centroid; producing a machine coordinate system by moving the multidimensional motion stage to a plurality of positions along orthogonal directions while measuring, with the tracker, the three-dimensional location of the centroid at each position; producing pixel coordinate vector $\vec{u}$ from the second set of image centroids; producing point vector $\vec{U}$ from the three-dimensional location of the centroid; and determining a pose of the first camera, the second camera, and the third camera from pixel coordinate vector $\vec{u}$ and point vector $\vec{U}$ to calibrate the non-contact coordinate measuring machine.

Disclosed is a process for targeting an object member with the non-contact coordinate measuring machine, the process comprising: determining a centroid of a probe focal volume for the non-contact coordinate measuring machine; disposing the object member at an arbitrary position with respect to the centroid; obtaining a first image of the object member by the first camera; obtaining a second image of the object member by the second camera; obtaining a third image of the object member by the third camera; producing a region of interest of the object member in the first image, the second image, and the third image; determining, from the first image, a first object image centroid for the object member; determining, from the second image, a second object image centroid for the object member; determining, from the third image, a third object image centroid for the object member; producing target coordinates from the first object image centroid, the second object image centroid, and the third object image centroid; and determining a distance differential between the centroid and the object centroid to target the object member.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments is presented herein by way of exemplification and not limitation.

It has been discovered that a noncontact metrology probe described herein has advantageous and unexpectedly high spatial resolution. Further, the noncontact metrology probe provides a probe focal volume in space that is coincident with a reference member. The probe focal volume accordingly provides acquisition of spatial information, e.g., location, size, and the like, of an object member that can be referenced to a coordinate frame of a tracker.

Figure 6:
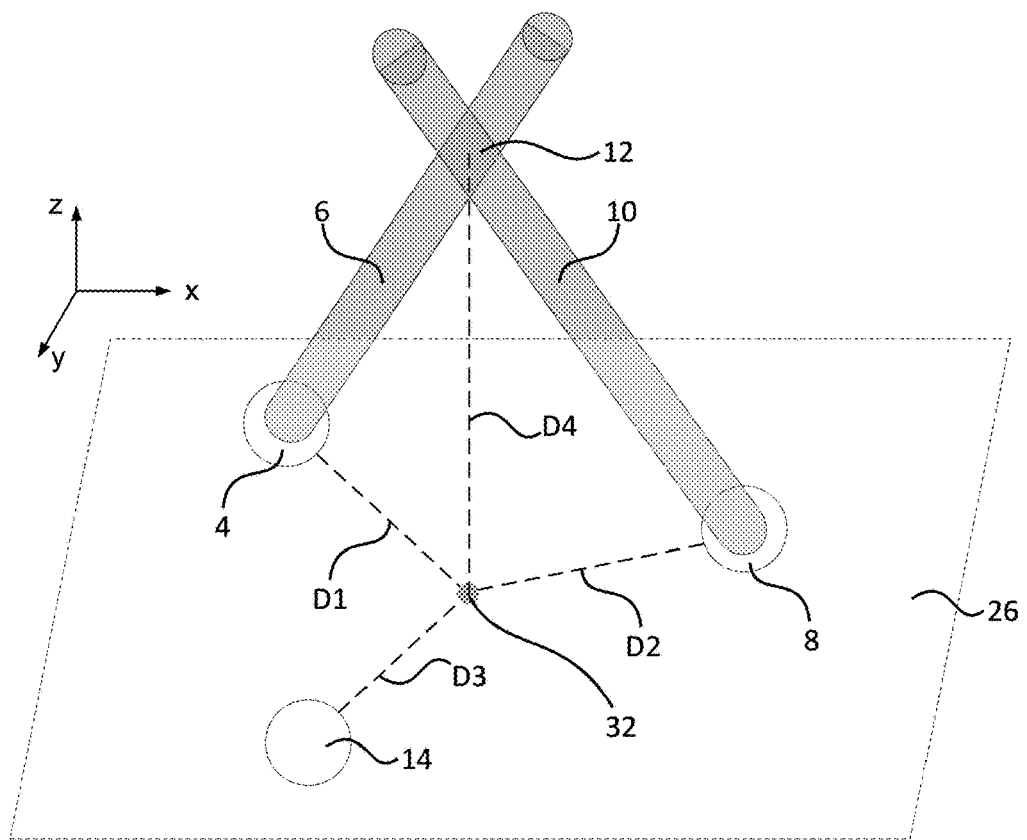
FIG. 6 shows a first field of view, a second field of view, and a prime focal volume for cameras shown in FIG. 3.
Figure 7:
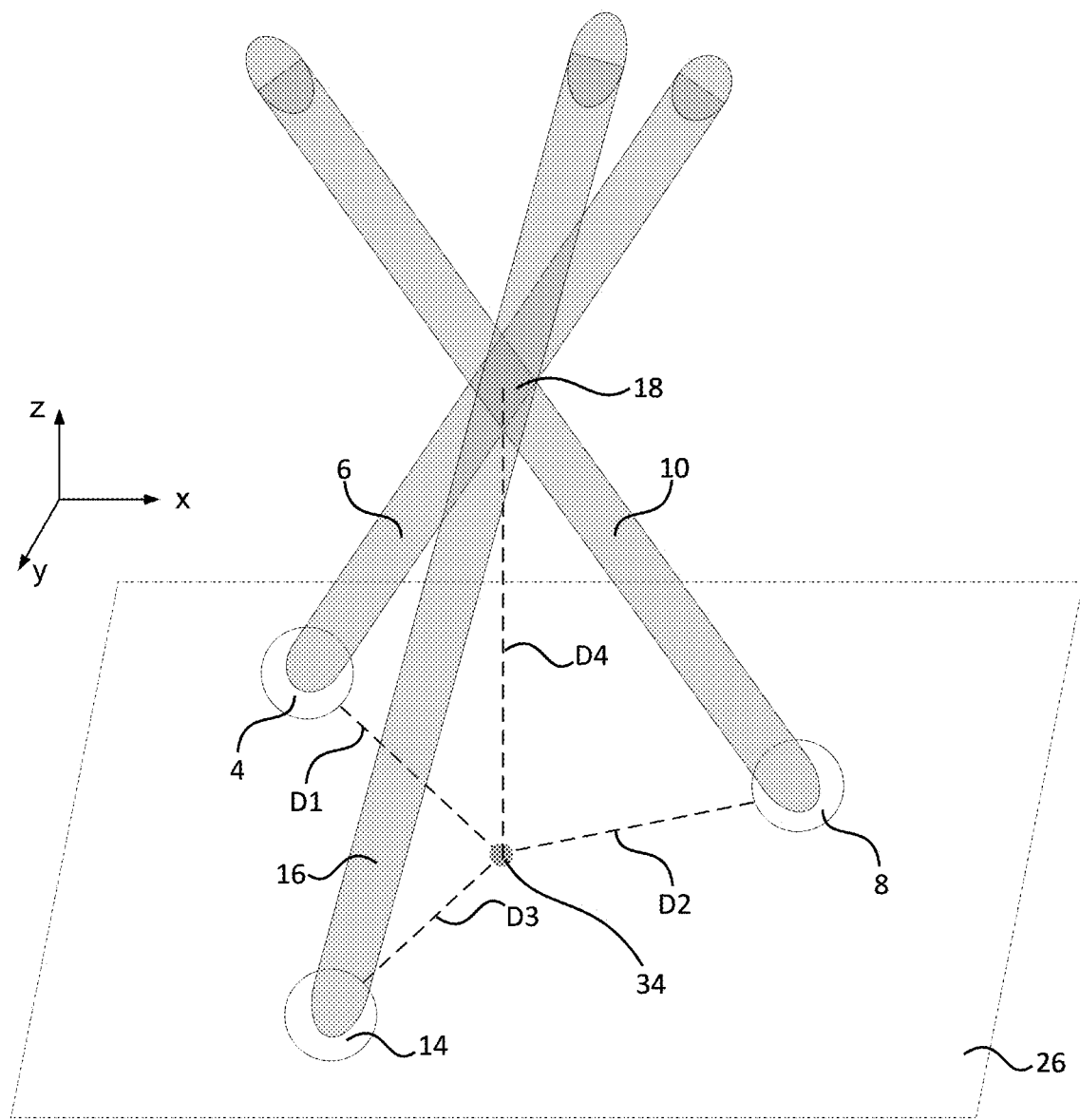
FIG. 7 shows a first field of view, a second field of view, a third field of view, and a probe focal volume for cameras shown in FIG. 3.

In an embodiment, with reference to FIG. 1, FIG. 2, FIG. 3, FIG. 4, FIG. 5, FIG. 6, FIG. 7, FIG. 8, and FIG. 9, noncontact metrology probe 2, also referred to as a pixel probe, includes a plurality of cameras (e.g., first camera 4, second camera 8, third camera 14), optionally reference member 28 disposed proximate to cameras (4, 8, 14), and tracker 20. Here, first camera 4 includes first field of view 6, and second camera 8 includes second field of view 10. First camera 4 and second camera 8 are arranged such that second field of view 10 overlaps first field of view 6 to form prime focal volume 12 as shown in FIG. 6. Additionally, third camera 14 includes third field of view 16, wherein third field of view 16 overlaps prime focal volume 12 to form probe focal volume 18 as shown in FIG. 7. Moreover, tracker 20 includes tracker field of view 22 to determine a location of probe focal volume 18 in tracker field of view 22.

First camera 4, second camera 8, and third camera 14 are disposed in a planar configuration in plane 26. Reference member 28 produces projection 30 on plane 26 at a minimum separation between reference member 28 and plane 26 of distance D4. First camera 4, second camera 8, and third camera 14 respectively are separated from projection 30 in plane 26 by distances D1, D2, and D3. First camera 4 and second camera 8 are arranged at angle A; second camera 8 and third camera 14 arranged at angle B, and first camera four and third camera 14 are arranged at angle C.

In some embodiments, first camera 4, second camera 8, and third camera 14 are disposed at vertices of a tetrahedral with respect to reference member 28 such that first camera 4 is located at a first vertex at included angle c between reference member 28 and projection 30. Likewise, second camera 8 is located at a second vertex at included angle D between reference member 28 and projection 30, and third camera 14 is located at a third vertex at included angle D between reference member 28 and projection 30.

It is contemplated that first field of view 6, second field of view 10, third field of view 16, tracker field of view 22 can be any optical shape along a long axis of such field of view (6, 10, 16, 22) including conical, collimated, convergent-divergent, and the like. Moreover, an optic independently can be interposed between first camera 4, second camera 8, third camera 14, or tracker 20 and reference member 28. Exemplary optics include a lens, filter, optical chopper, optical modulator, optical fiber, and the like.

Figure 1:
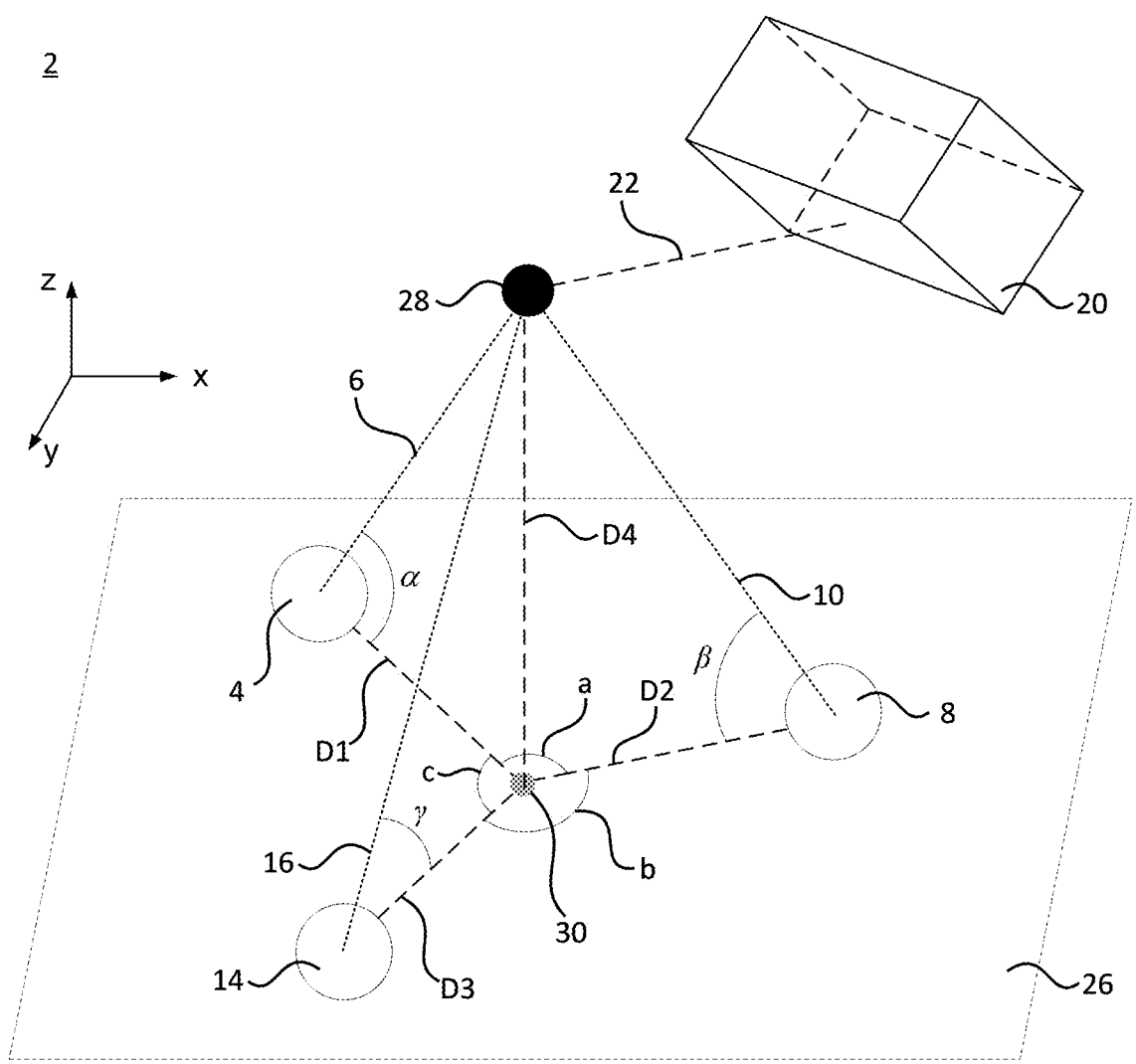
FIG. 1 shows a noncontact metrology probe.
Figure 2:
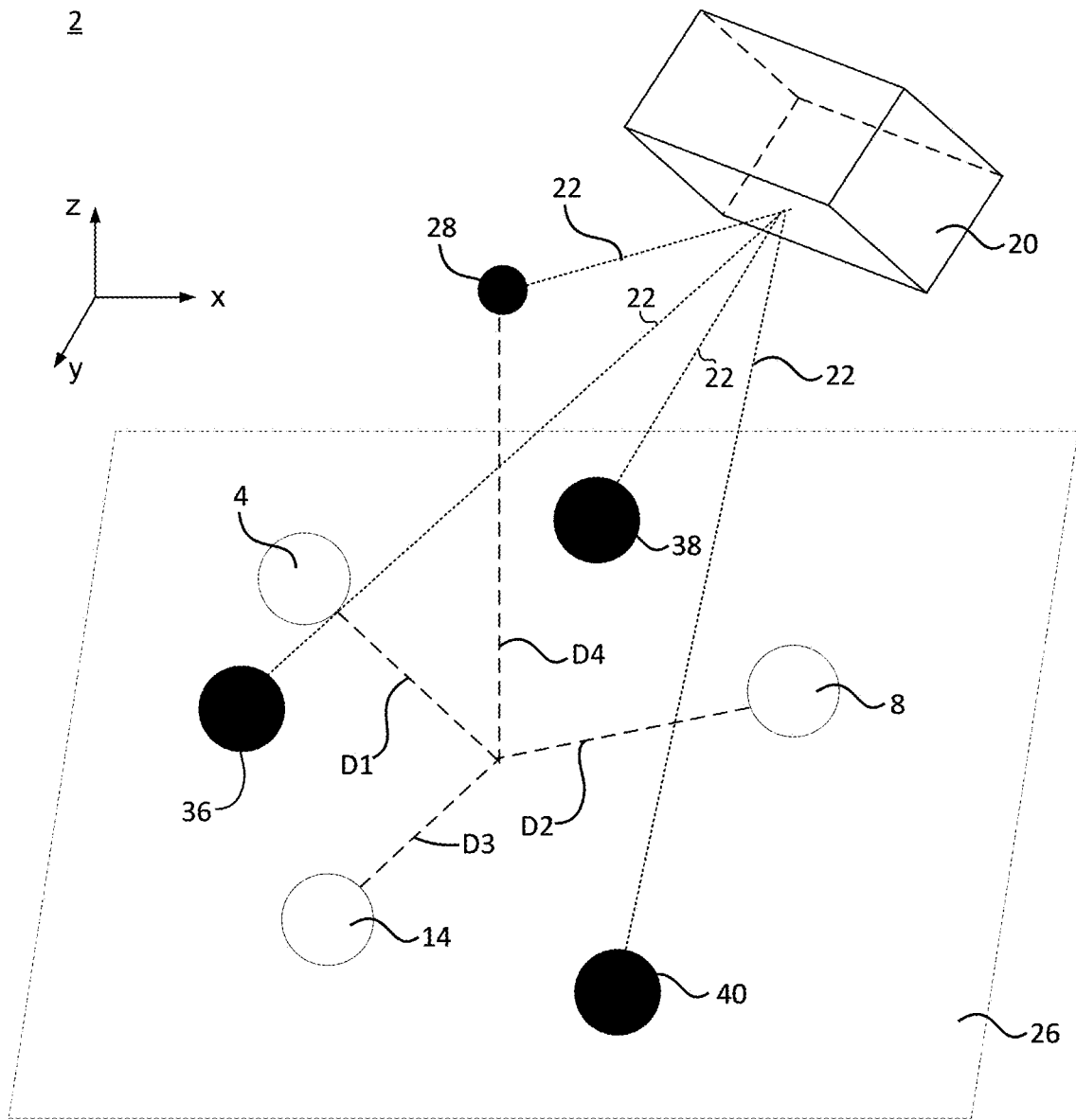
FIG. 2 shows a noncontact metrology probe.

According to an embodiment, as shown in FIG. 2, noncontact metrology probe 2 includes a plurality of secondary members (e.g., secondary members 36, 38, 40) disposed proximate to first camera 4 and second camera 8 in tracker field of view 22 and arranged for tracker 20 to determine a location of secondary members (36, 38, 40). Furthermore, a location of reference member 28 can be referenced to secondary members (36, 38, 40). Here, secondary members (36, 38, 40) are fixedly disposed relative to cameras (4, 8, 14). Accordingly, a location of secondary members (36, 38, 40) relative to cameras (4, 8, 14) is fixed in a coordinate system of tracker 20. In an embodiment, tracker 20 can track a movement of cameras (4, 8, 14) by virtue of tracking a location of secondary members (36, 38, 40). In an embodiment, to coordinate movement or fix a relative position of cameras (4, 8, 14) and secondary members (36, 38, 40), cameras (4, 8, 14) and secondary members (36, 38, 40) are attached to a mounting base such as an optical breadboard or the like.

Figure 3:
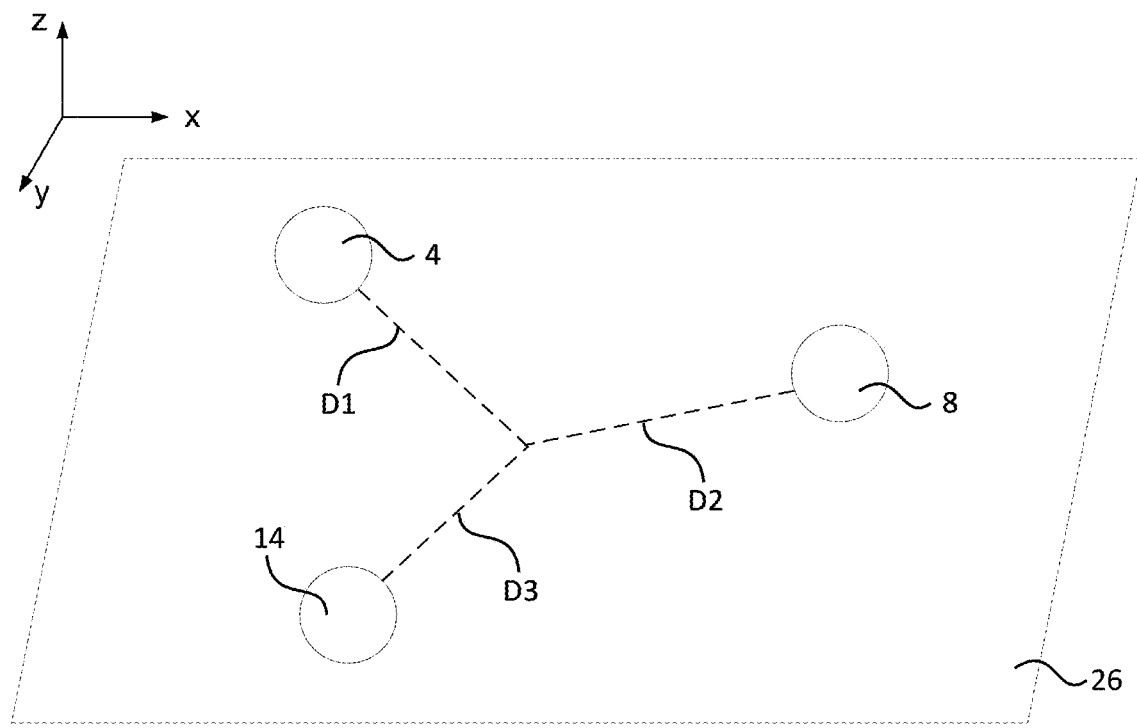
FIG. 3 shows a perspective view of a plurality of cameras.
Figure 4:
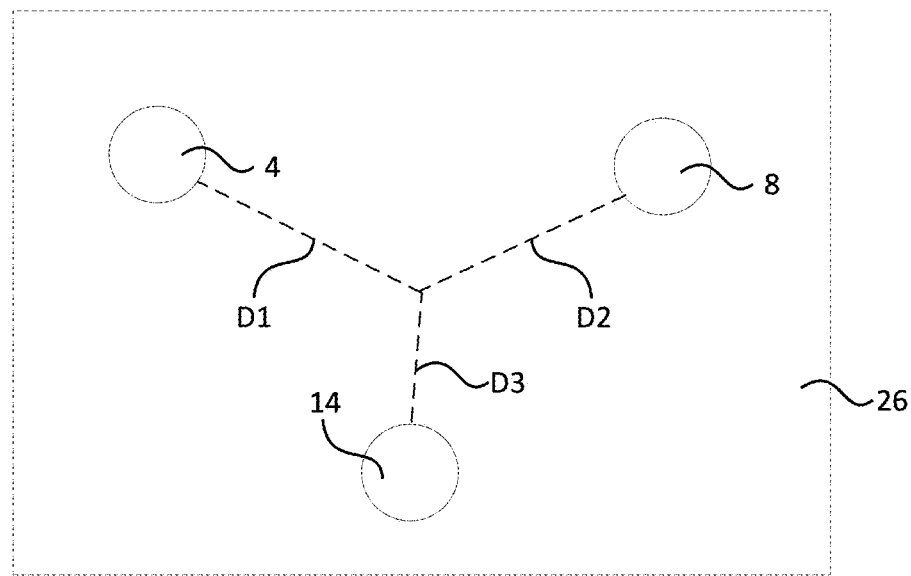
FIG. 4 shows a top view of the cameras shown in FIG. 3.
Figure 5:
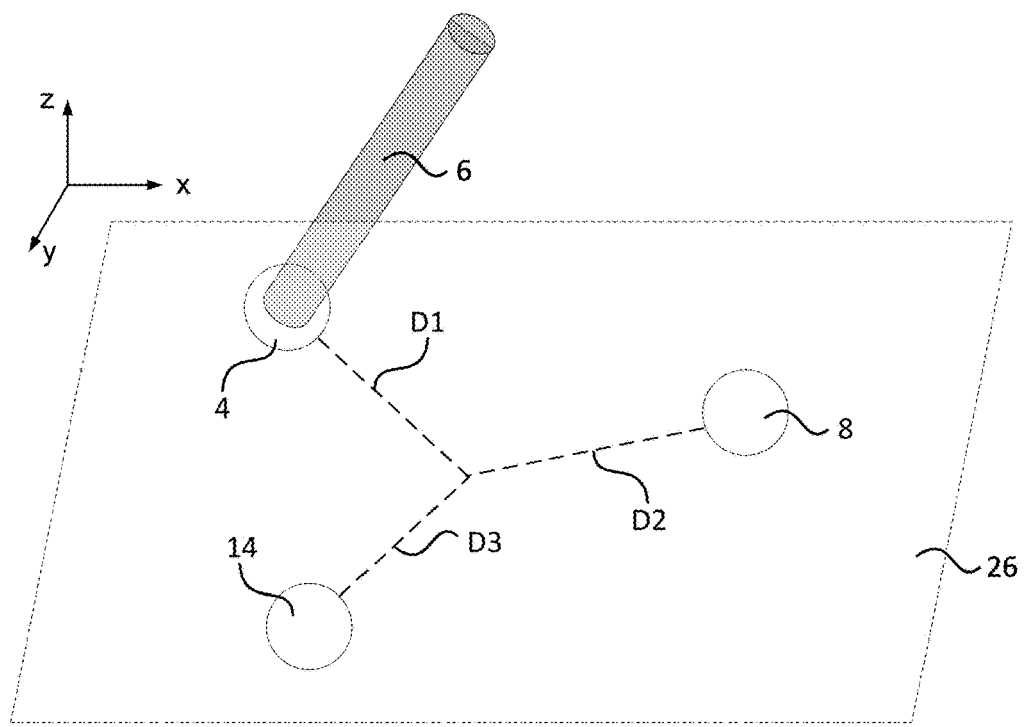
FIG. 5 shows a first field of view of a first camera shown in FIG. 3.

In an embodiment, as shown in FIG. 3 (perspective view of cameras 4, 8, and 14) and FIG. 4, first camera 4, second camera 8, and third camera 14 can be disposed in a trigonal pattern in plane 26. Although three cameras (4, 8, 14) are shown, noncontact metrology probe can include greater than three cameras. In some embodiments, the plurality of cameras (e.g., 4, 8, 14) is disposed linearly in plane 26. According to an embodiment in which there are greater than three cameras, three cameras can be disposed in plane 26, and a camera can be disposed external to plane 26. In a particular embodiment, noncontact metrology probe includes first camera 4, second camera 8, and third camera 14 tetrahedrally disposed to each other in plane 26 with respect to reference member 28. Such a tetrahedron can be a regular tetrahedron or an irregular tetrahedron, based a distance of separation between first camera 4, second camera 8, and third camera 14.

Figure 8:
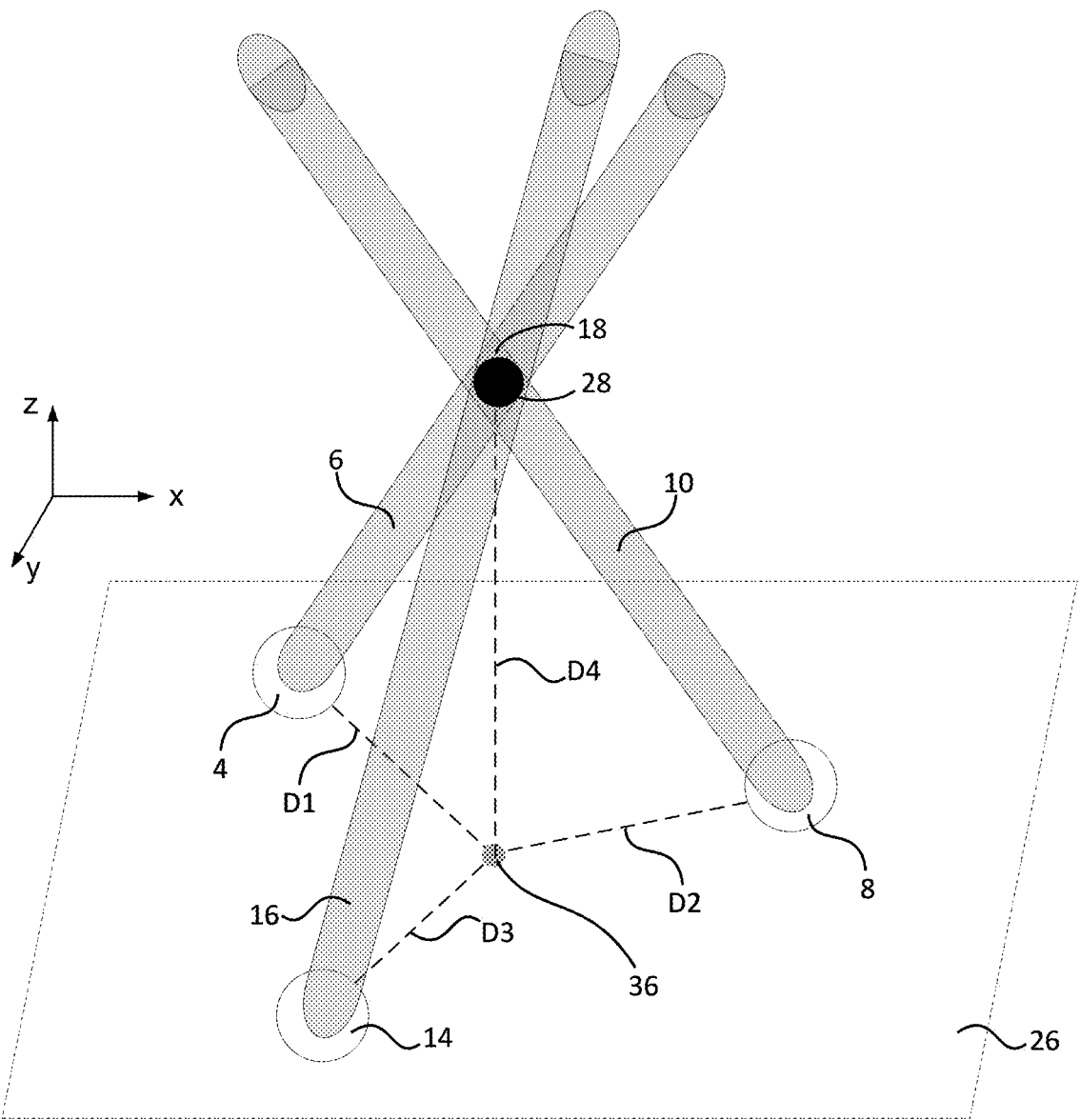
FIG. 8 shows a reference member disposed in the probe focal volume shown in FIG. 3.

It is contemplated that, as shown in FIG. 8, reference member 28 is disposed in probe focal volume 18. In some embodiments, a portion of reference member 28 can be disposed external to probe focal volume 18.

Figure 9:
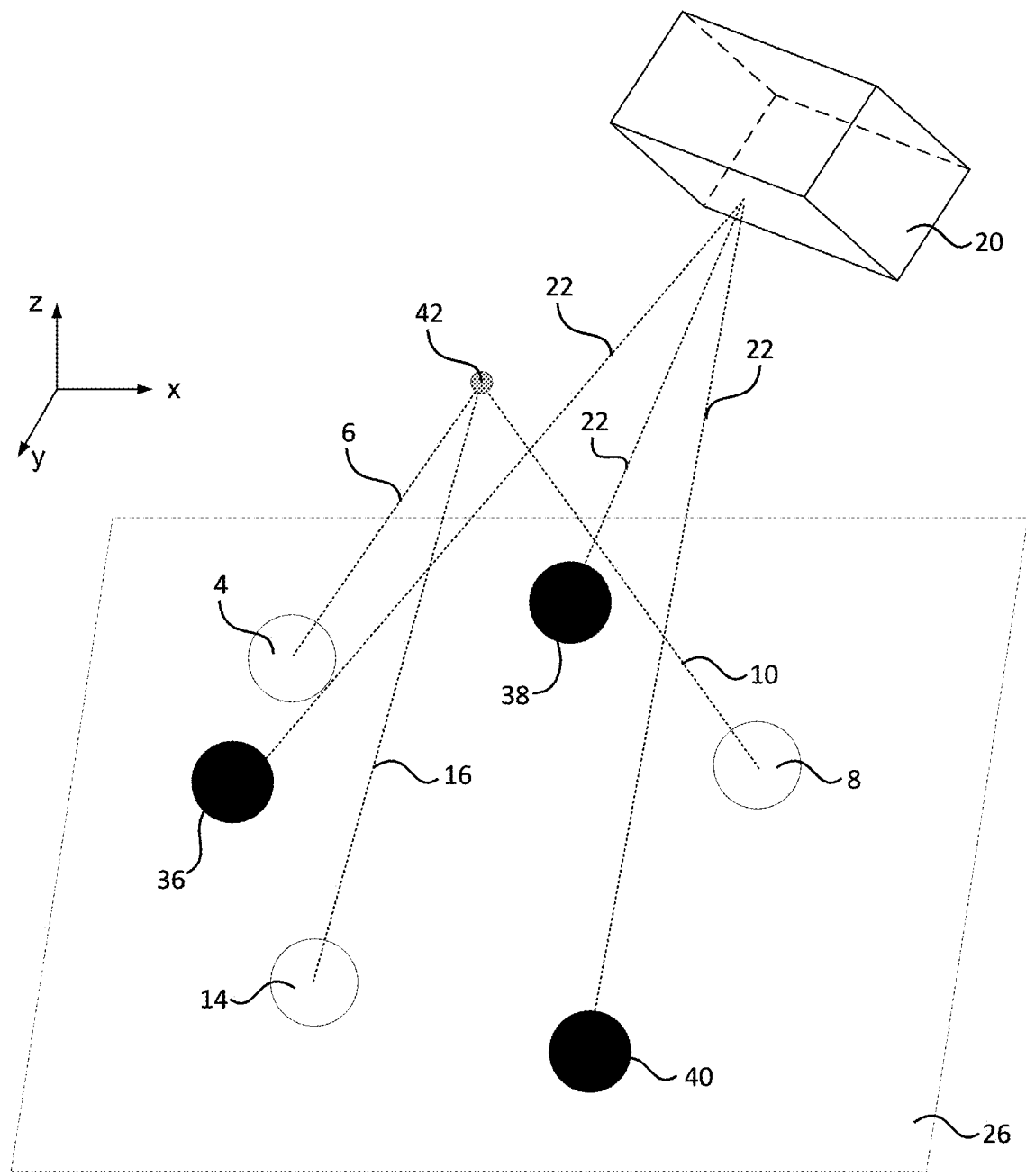
FIG. 9 shows a noncontact metrology probe.

In an embodiment, with reference to FIG. 9, images from first camera 4, second camera 8, and third camera 14 are used to determine centroid 42 of reference member 28. It is contemplated that centroid 42 of reference member 28 is stored in a computer readable memory such that reference member 28 can be removed from noncontact metrology probe while maintaining a location of centroid 42 with regard to a location of secondary members 36, 38, 40 in a coordinate system of tracker 20 and also with regard to the location of reference member 28 prior to its removal in the coordinate system of tracker 20. Similarly, images of reference member 28 acquired by cameras (4, 8, 14) and centroids of such images determined from the images are stored in a computer readable memory such that reference member 28 can be removed from noncontact metrology probe while maintaining a location of centroid 42 with regard to the images in a pixel coordinate system of each camera (4, 8. 14). Accordingly, in an embodiment, tracker 20 provides a location of reference member 28 and secondary members (36, 38, 40), wherein the location of reference member 28 and secondary members (36, 38, 40) from tracker 20 is stored in a computer readable medium. The location of reference member 28 and secondary members (36, 38, 40) provided by tracker 20 can be reference to a coordinate system used by tracker 20 or transformed into another coordinate system.

According to an embodiment, centroid 42 determined from images of reference member 28 acquired by first camera 4, second camera 8, and third camera 14 is determined by pixel coordinates of first camera 4, second camera 8, and third camera 14. Moreover, the pixel coordinates of centroid 42 of first camera 4, second camera 8, and third camera 14 collectively provide a spatial location of a geometrical center of reference member 28 in three-dimensional space. The pixel coordinates of cameras (4, 8, 14) are tied to the coordinate system of tracker 20 by locations of reference 28 and secondary members (36, 38, 40).

Figure 10:
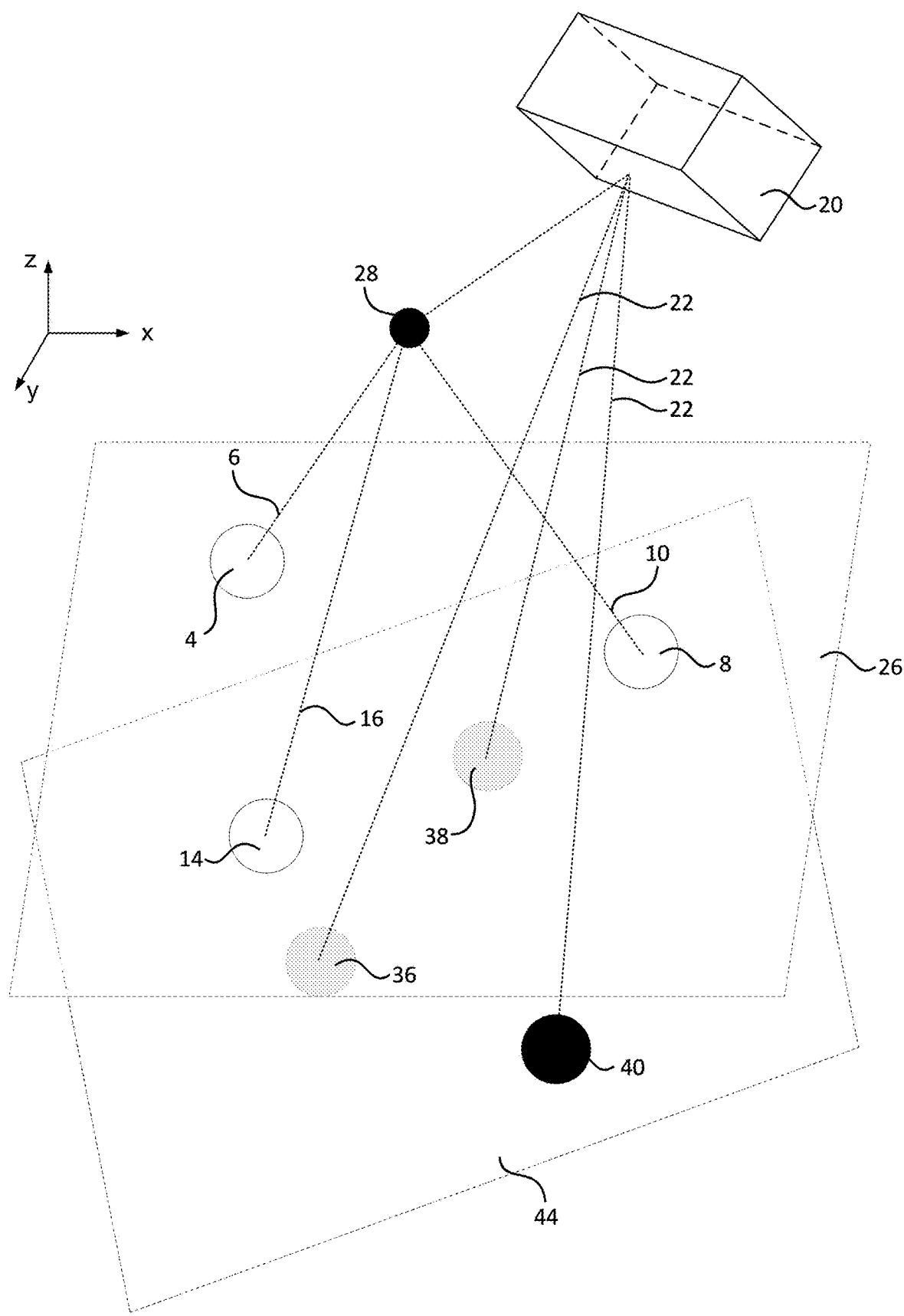
FIG. 10 shows a noncontact metrology probe.

In an embodiment, as shown in FIG. 10, the plurality of secondary members (36, 38, 40) can be disposed in plane 44. Plane 44 can be coplanar with plane 26 or not coplanar. According to an embodiment, plane 44 is not coplanar with plane 26, and none of secondary members (36, 38, 40) is disposed in plane 26. In some embodiments, plane 44 is not coplanar with plane 26, and secondary member (36, 38, or 40) is disposed in plane 26.

Figure 11:
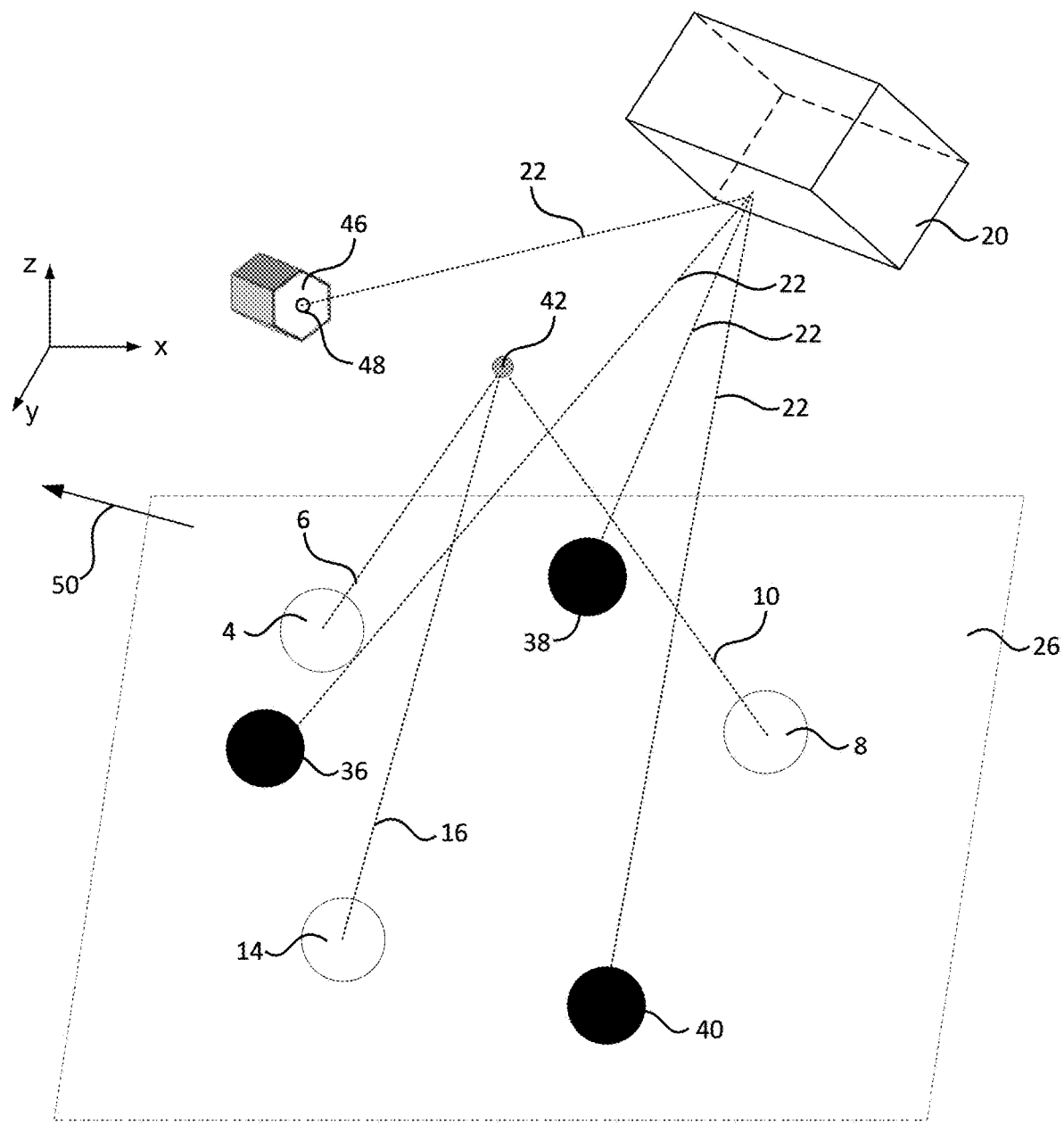
FIG. 11 shows a noncontact metrology probe.
Figure 12:
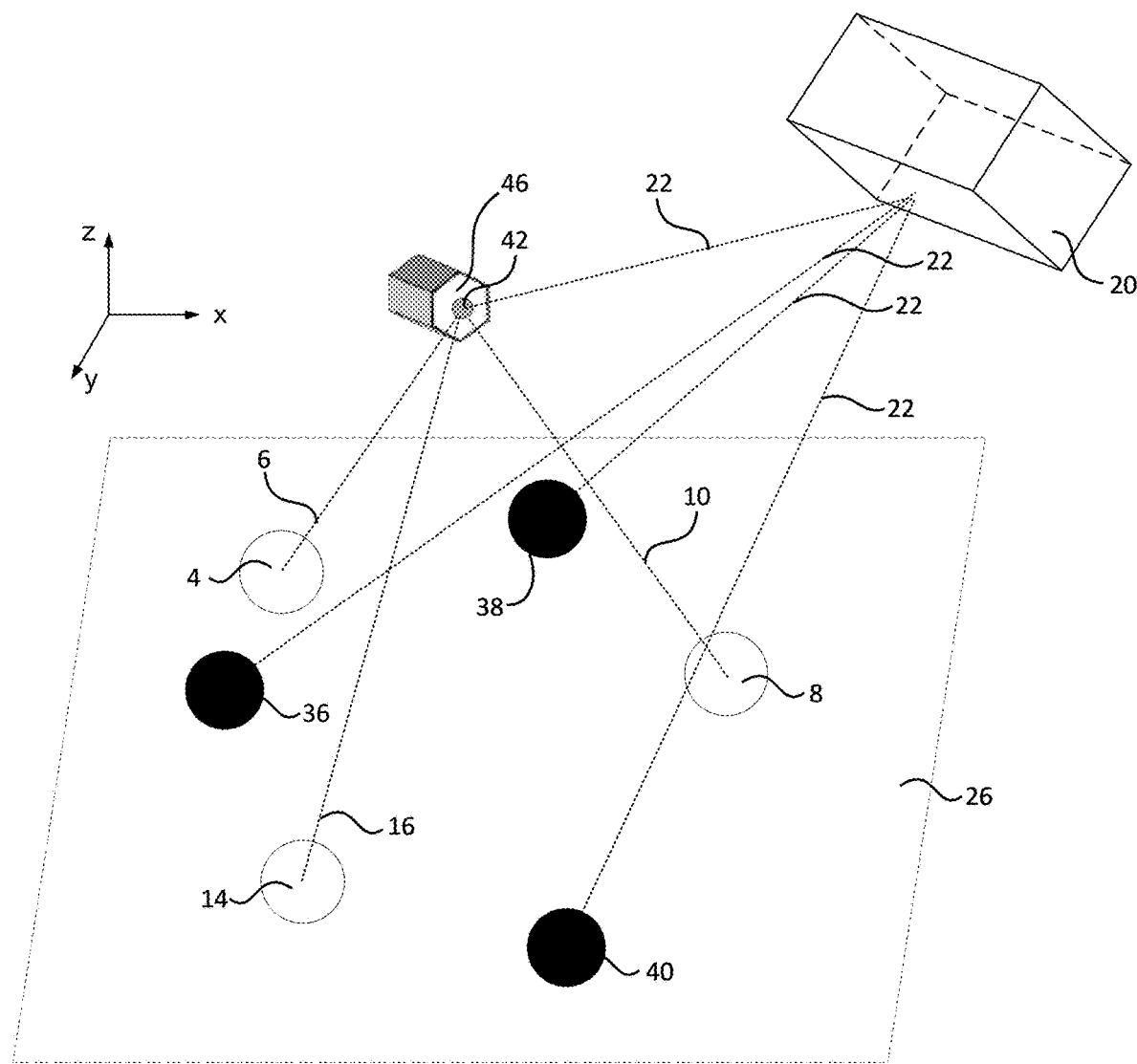
FIG. 12 shows a noncontact metrology probe.

In an embodiment, as shown in FIG. 11, noncontact metrology probe 2 includes object member 46. Here, an element, e.g., a shape or feature such as an edge, of object member 46 can be analyzed to obtain object centroid 48. Reference centroid 42 may not overlap object centroid 48, and cameras (4, 8, 14) and secondary members (36, 38, 40) are moved in direction of motion 52 to overlap reference centroid 42 with object centroid 48 as shown in FIG. 12. Before cameras (4, 8, 14) and secondary members (36, 38, 40) are moved from the first location shown in FIG. 11 to a second position shown in FIG. 12, tracker 20 determines tracker coordinates (i.e., in a coordinate system in a frame of reference used by tracker 20) for secondary members (36, 38, 40) to which pixel coordinates of reference centroid 42 is referenced. Thereafter, cameras (4, 8, 14) and secondary members (36, 38, 40) are moved to the second location shown in FIG. 12 to overlap reference centroid 42 with object centroid 48. Second locations of secondary members (36, 38, 40) are determined by tracker 20 from which the second location of cameras (4, 8, 14) and reference centroid 42 can be determined. By comparing the tracker coordinates of the first position of reference centroid 42 to the tracker coordinates of the second position of reference centroid 42, tracker 20 can provide a direction or distance of travel of reference centroid 42 or dimensional information (e.g., size) of object member 46.

It is contemplated that a position of tracker 20 may be changed or not changed in response to or independent of movement of cameras (4, 8, 14) or secondary members (36, 38, 40). According to an embodiment, tracker 20 is immobile, and cameras (4, 8, 14) and secondary members (36, 38, 40) synchronously move together. In a certain embodiment, cameras (4, 8, 14) and secondary members (36, 38, 40) synchronously move together, and tracker 20 moves asynchronously with motion of cameras (4, 8, 14) and secondary members (36, 38, 40). In a particular embodiment, tracker 20 moves synchronously with motion of cameras (4, 8, 14) and secondary members (36, 38, 40).

Figure 13:
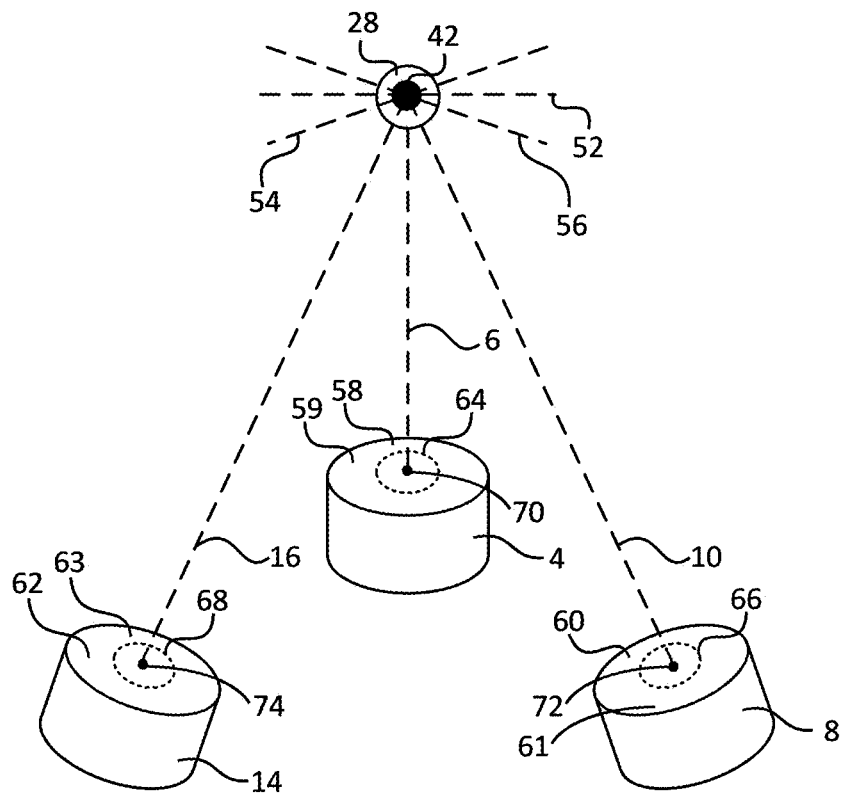
FIG. 13 shows a reference member disposed proximate to cameras of a noncontact metrology probe.

In an embodiment, noncontact metrology probe 2 includes the plurality of cameras, e.g., first camera 4, second camera 8, and third camera 14. Cameras (4, 8, 14) independently include a plurality of pixels, wherein the pixels can be identified by pixel coordinates. As shown in FIG. 13, first camera 4 includes a plurality of first pixels 58, and first pixels 58 individually have first pixel coordinate 59. Similarly, second camera 8 includes a plurality of second pixels 60, and second pixels 60 individually have second pixel coordinate 61. Further, camera 14 includes a plurality of third pixels 62, and third pixels 62 individually have third pixel coordinate 63. Additionally, cameras (4, 8, 14) respectively include image plane (52, 54, 56) disposed at a distance from pixels (58, 60, 62). Accordingly, cameras (4, 8, 14) respectively acquire first reference image 64, second reference image 66, and third reference image 68 of reference member 28. The plurality of pixel coordinates (59, 61, 63) of reference images (52, 54, 56) are used to determine a centroid of reference member 28 in probe focal volume 18. Moreover, first pixel coordinates 59 corresponding to first reference image 64 can be analyzed to determine first reference image centroid 70; second pixel coordinates 61 corresponding to second reference image 66 can be analyzed to determine second reference image centroid 72, and third pixel coordinates 63 corresponding to third reference image 68 can be analyzed to determine third reference image centroid 74. Projection of first reference image centroid 70, second reference image centroid 72, and third reference image centroid 74 onto probe focal volume 18 (which is located at an intersection of image planes (52, 54, 56)) produces reference centroid 42. In an embodiment, reference member 28 in combination with secondary members (36, 38, 40, and the like) are used to reference a location of reference centroid 42 in the tracker coordinate system of tracker 20 during calibration of noncontact metrology probe 2. The location of reference centroid 42 is known in the tracker coordinate system, and pixel coordinates (59, 61, 63) of reference image centroids (70, 72, 74) are known for each camera (4, 8, 14) so that pixel coordinates (59, 61, 63) are linked indirectly in the tracker coordinate system of tracker 20 by virtue of the projection of reference member 28 onto pixels (58, 60, 62) of cameras (4, 8, 14).

Figure 14:
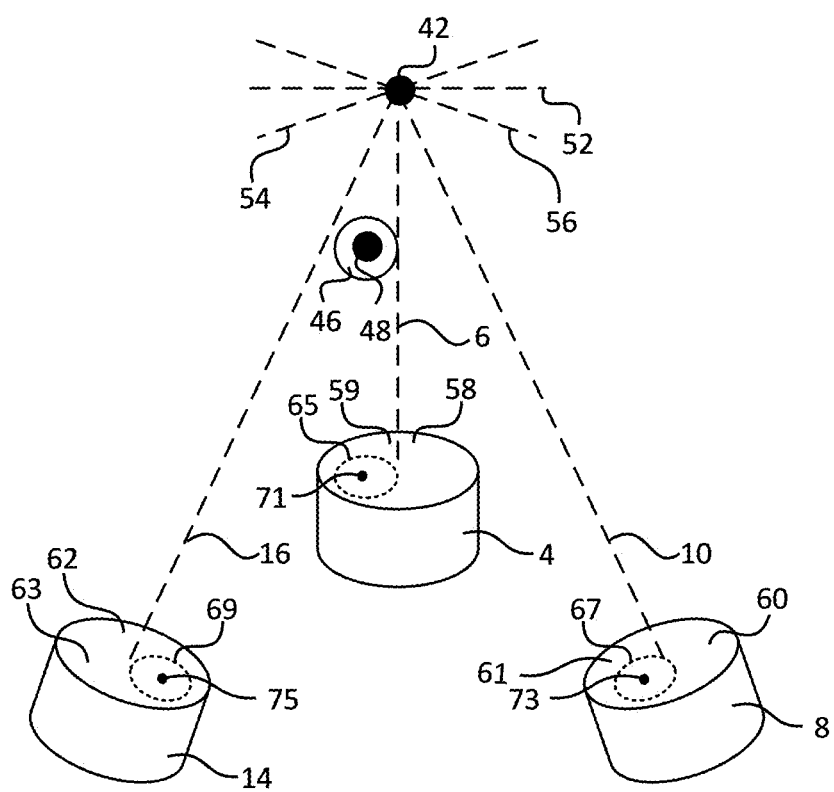
FIG. 14 shows an object member disposed proximate to cameras of a noncontact metrology probe.
Figure 15:
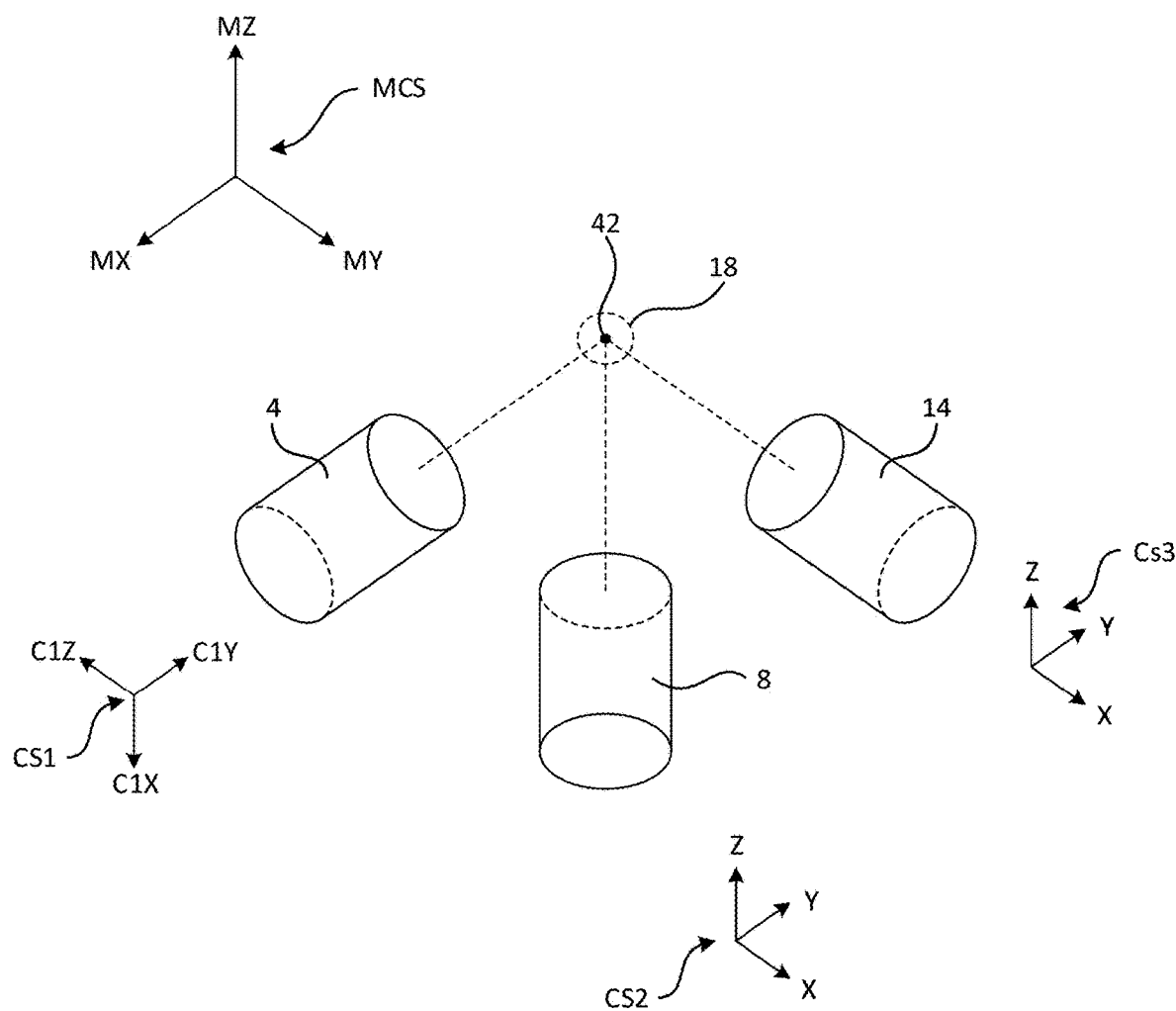
FIG. 15 shows a noncontact metrology probe.

In an embodiment, reference member 28 optionally is removed from noncontact metrology probe 2 after calibration of noncontact metrology probe 2 provides the location of reference centroid 42 in the tracker coordinate system of tracker 20 as well as providing the pixel coordinates (59, 61, 63) of reference image centroids (70, 72, 74). With reference to FIG. 14, object member 46 is disposed in noncontact metrology probe 2. Here, the location of reference centroid 42 is, e.g., stored in a computer readable memory and connects pixel coordinates (59, 61, 63) to the tracker coordinate system of tracker 20 even in an absence of reference member 28. It should be appreciated that reference centroid 42 is a virtual representation and is not physically embodied apart from reference member 28. However, since the location of reference centroid 42 in the tracker coordinate system of tracker 20 is known, reference centroid 42 can be superimposed virtually in probe focal volume 18 or superimposed virtually on an element, e.g., object member 46 when object member 46 is disposed in probe focal volume 18. If object member 46 is not disposed in probe focal volume 18, reference centroid 42 will not be superimposed virtually on object member 46 but can be superimposed in probe focal volume 18. Accordingly, after disposal of object member 46 at an arbitrary location in noncontact metrology probe 2, cameras (4, 8, 14) respectively acquire first object image 65, second object image 67, and third object image 69 of object member 46. The plurality of pixel coordinates (59, 61, 63) of object images (65, 67, 69) are used to determine object centroid 48 of object member 46 in noncontact metrology probe 2. Moreover, first pixel coordinates 59 corresponding to first object image 65 can be analyzed to determine first object image centroid 71; second pixel coordinates 61 corresponding to second object image 67 can be analyzed to determine second object image centroid 72, and third pixel coordinates 63 corresponding to third object image 68 can be analyzed to determine third object image centroid 74. Projection of first object image centroid 70, second object image centroid 72, and third object image centroid 74 onto object image 46 produces object centroid 48. In some embodiments, when tracking or measuring an object member, noncontact metrology probe 2 is used to locate a very small region (e.g., a point location) of the object member that fits within the field of view of single pixels of cameras (4,8.14) and that represents a reference centroid 42.

Noncontact metrology probe 2 has numerous advantageous uses including providing image capture in non-contact coordinate measuring machine 200. Non-contact coordinate measuring machine 200 solves three dimensional and six-dimensional spatial measurement challenges involved with conventional technology and provides measuring and tracking of a location (3D) and orientation (6D) of an object that can be, e.g., smaller than 5 mm in size, has sharp edges, or is too delicate to touch via contact (e.g., with a stylus) and such being accomplished with spatial resolution better than 30 microns with acquisition of such information inside a larger volume and a world coordinate system. Beneficially, non-contact coordinate measuring machine 200 measures the object directly without recourse to an auxiliary target attached to the object as in a conventional system. Such object can be part of a larger system such as an industrial robot that manipulates the object. Non-contact coordinate measuring machine 200 relates the position and orientation of the object to motion of the robot, wherein measurements exist in a global coordinate system that includes the position and orientation of the object and measurements of motion of the robot. Moreover, non-contact coordinate measuring machine 200 scans pixel probe 2 over object member 46 to measure a spatial extent and dimension of object member 46 and simultaneously linking these measurements to a global coordinate system with an accuracy that is, e.g., greater than 30 microns and without contact. In non-contact coordinate measuring machine 200, pixel probe 2 is a virtual, non-contact, non-physical stylus since it projects a set of three pixels to a single point in space from a cameras (4, 8, 14). This projected pixel maps a point in three-dimensional space to a point in the images captured by camera (4, 8. 14). Instead of deflection of a physically contacting stylus being recorded to determine a coordinate on an object, non-contact coordinate measuring machine 200 measures the coordinate on object 46 by projecting the point from object 46 onto camera images. Cameras (4, 8, 14) are disposed on multidimensional motion stage 210 that moves cameras (4, 8, 14) in a plurality of directions, e.g., an X–, Y–, or Z-direction. Non-contact coordinate measuring machine 200 provides a graphic user interface (GUI) for user interactions. It is contemplated that, when a user clicks on a point in an image from camera (4, 8, 14) that corresponds to a coordinate to be measured, multidimensional motion stage 210 autonomously moves noncontact metrology probe 2 to the user-selected point, and non-contact coordinate measuring machine 200 obtains a measurement tracker 20 or an optical encoder.

Unexpectedly, non-contact coordinate measuring machine 200 provides non-contact coordinate measurement, high resolution that is greater than 25 microns in three dimensions, links coordinate measurements to a global coordinate system of tracker 20 so that coordinate measurements are absolute and not just relative, directly measures sharp edges, measures objects that have size ranging from mesoscale or microscale (e.g., much less than 10 mm in size) to macroscale (e.g., a size greater than 1 meter), extends spatial metrology to an expanded range of objects that include non-tangible elements such as an image, hologram, or a components of an image.

According to an embodiment, with reference to FIG. 15, FIG. 16, FIG. 17, FIG. 18, and FIG. 19, non-contact coordinate measuring machine 200 includes: noncontact metrology probe 2 including: first camera 4 including first field of view 6 and first coordinate system CS1; second camera 8 including second field of view 10 and second coordinate system CS2, second camera 8 arranged such that second field of view 10 overlaps first field of view 6 and forms prime focal volume 12; and third camera 14 including third field of view 16 and third coordinate system CS3, third camera 14 arranged such that third field of view 16 overlaps prime focal volume 12 and forms probe focal volume 18; multidimensional motion stage 210 in communication with noncontact metrology probe 2 on which noncontact metrology probe 2 is disposed and including: machine coordinate system MCS in which multidimensional motion stage 210 moves noncontact metrology probe 2; first motion arm 210.1 that moves noncontact metrology probe 2 along first machine direction M1 of machine coordinate system MCS; second motion arm 210.2 that moves noncontact metrology probe 2 along second machine direction M2 of machine coordinate system MCS; and third motion arm 210.3 that moves noncontact metrology probe 2 along third machine direction M3 of machine coordinate system MCS; camera platform 212 disposed on multidimensional motion stage 210 and interposed between multidimensional motion stage 210 and noncontact metrology probe 2 such that camera platform 212 communicates motion of first motion arm 210.1, second motion arm 210.2, and third motion arm 210.3 to noncontact metrology probe 2; tracker 20 including: tracker field of view 22; and world coordinate system WCS to which an element (e.g., reference member 28, object member 46, and the like) in tracker field of view 22 is provided a world coordinate, wherein tracker 20: optically overlaps probe focal volume 18; and determines a location of probe focal volume 18 in tracker field of view 22, non-contact coordinate measuring machine 200 having noncontact metrology probe 2 for non-contact coordinate measurement of the element in an absence of a stylus and absence of physical contact with the element.

Figure 16:
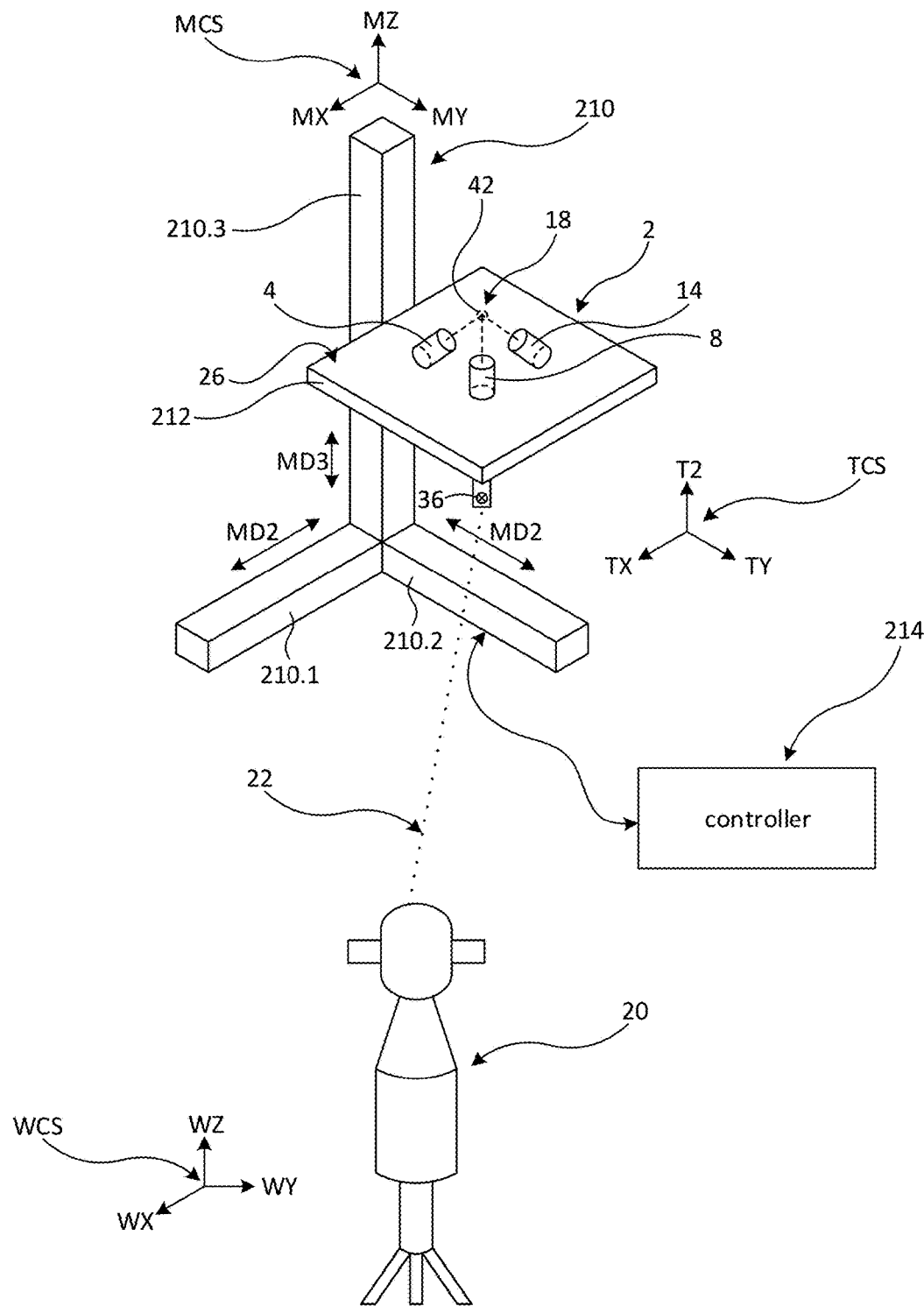
FIG. 16 shows a non-contact coordinate measuring machine.

As shown in FIG. 16, secondary member 36 can be disposed on camera platform 212 in tracker field of view 22 and can include tracker coordinate system TCS that links first coordinate system CS1, second coordinate system CS2, and third coordinate system CS3 to world coordinate system WCS.

Controller 214 can be in communication with multidimensional motion stage 210. Here, controller 214 can control movement of first motion arm 210.1 along first machine direction M1, movement of second motion arm 210.2 along second machine direction M2, and movement of third motion arm 210.3 along third machine direction M3. It is contemplated that controller 214 provides a single-point coincidence, and selection of a measurement coordinate through a GUI by point-and-click in an image captured by first camera 4, second camera 8, or third camera 14 of non-contact coordinate measuring machine 200.

Figure 17:
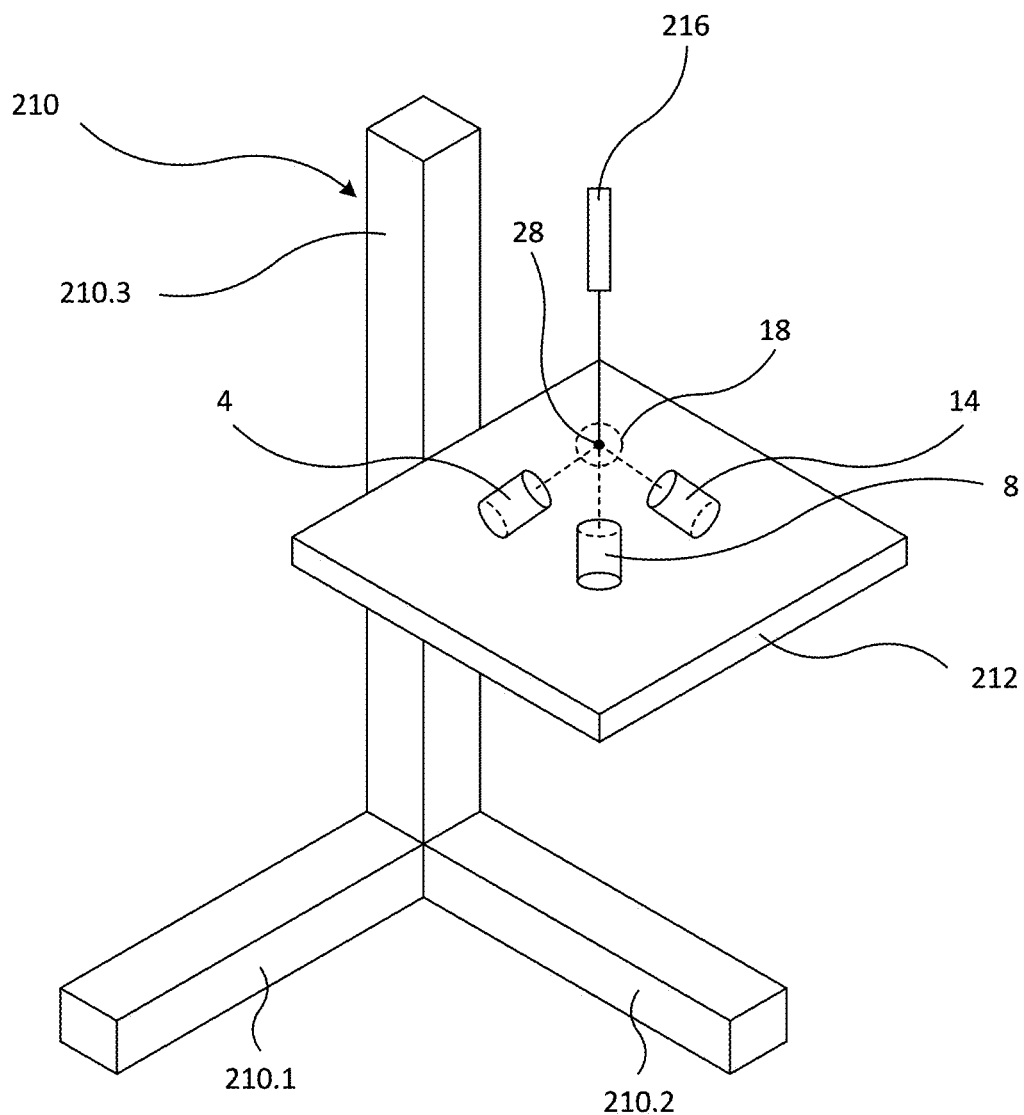
FIG. 17 shows a non-contact coordinate measuring machine.
Figure 18:
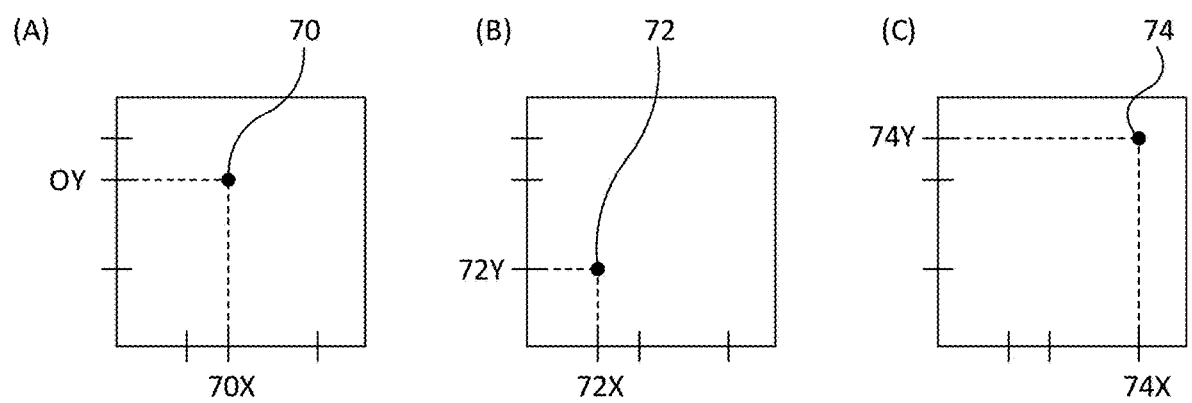
FIG. 18 shows images of coordinates in panels A, B, and C.
Figure 19:
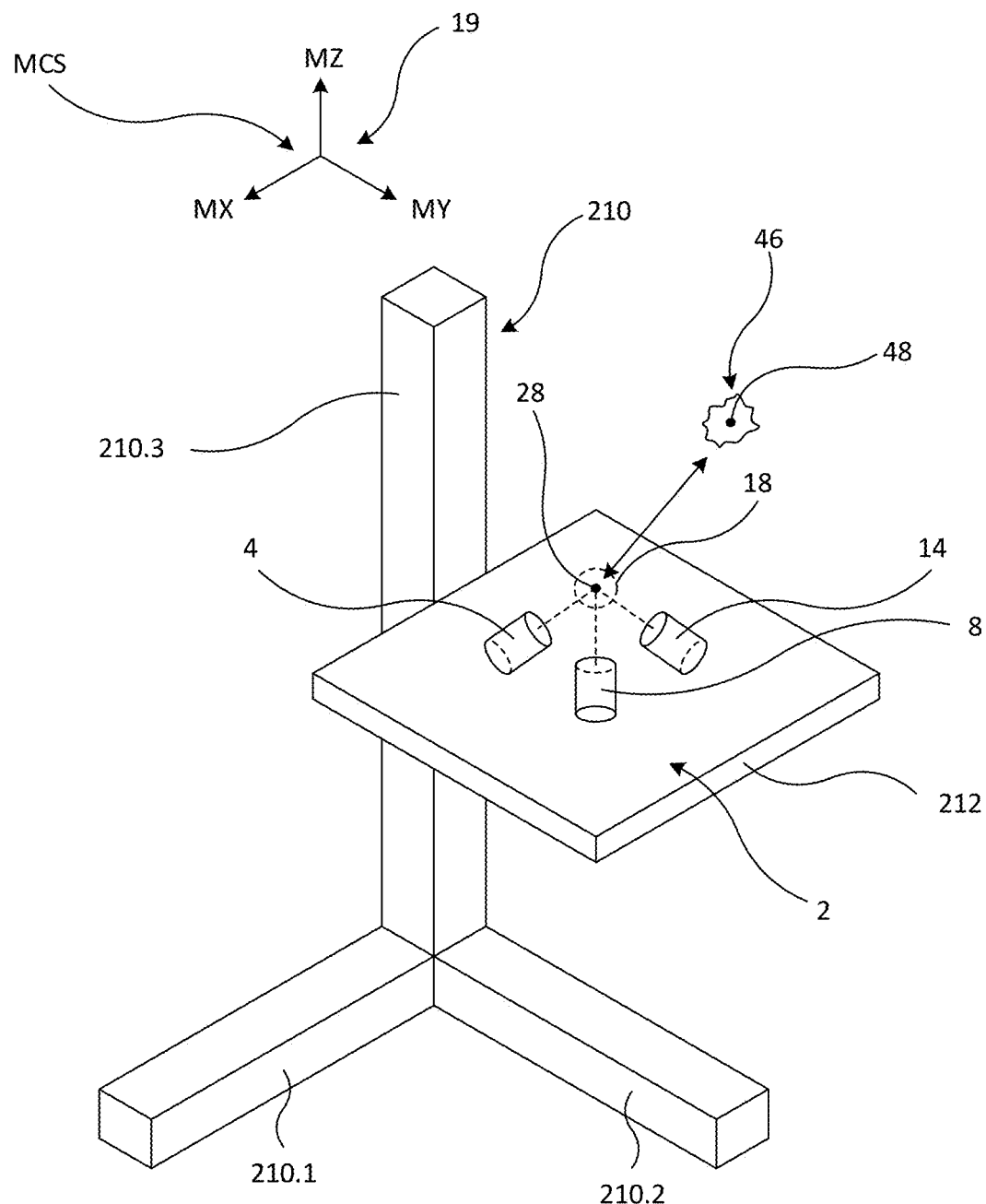
FIG. 19 shows a non-contact coordinate measuring machine.

In an embodiment, with reference to FIG. 17, reference member 28 is disposed in probe focal volume 18, wherein reference member support 216 is in communication with reference member 28 and on which reference member 28 is disposed. Accordingly, as shown in FIG. 18, non-contact coordinate measuring machine 200 provides first reference image centroid 70, second reference image centroid 72, and third reference image centroid 74 of reference member 28.

Figure 20:
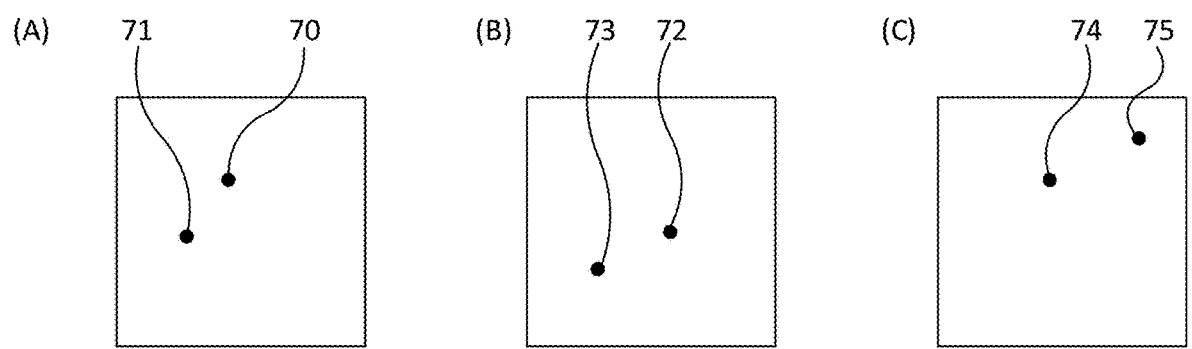
FIG. 20 shows images of coordinates in panels A, B, and C.

It is contemplated that noncontact metrology probe 2 provides centroid 42 of probe focal volume 18. According to an embodiment, with reference to FIG. 19, object member 46 is disposed external to centroid 42. Non-contact coordinate measuring machine 200 can determine object centroid 48 of object member 46 and distance differential 218 between centroid 42 and object centroid 48. Controller 214 can cause multidimensional motion stage 210 to move noncontact metrology probe 2 based on distance differential 218 so that object centroid 48 and centroid 42 overlap. In an embodiment, multidimensional motion stage 210 includes a three degree-of-freedom motion stage or a six degree-of-freedom motion stage for positioning noncontact metrology probe 2. It is contemplated that non-contact coordinate measuring machine 200 provides imaging-based non-contact to obtain the coordinate measurement of object 46 so that technical limitations involved with conventional articles that use a physical stylus to contact an element such as object 46 are overcome. It should be appreciated that controller 214 or an analyzer (e.g., a computer processor) receives image data and position information from components of non-contact coordinate measuring machine 200 so that first reference image centroid 70, first object image centroid 71, second reference image centroid 72, second object image centroid 73, third reference image centroid 74, are third object image centroid 75 produced from images of object member 46, object centroid 48, centroid 42, or the like, as shown in FIG. 20.

Figure 21:
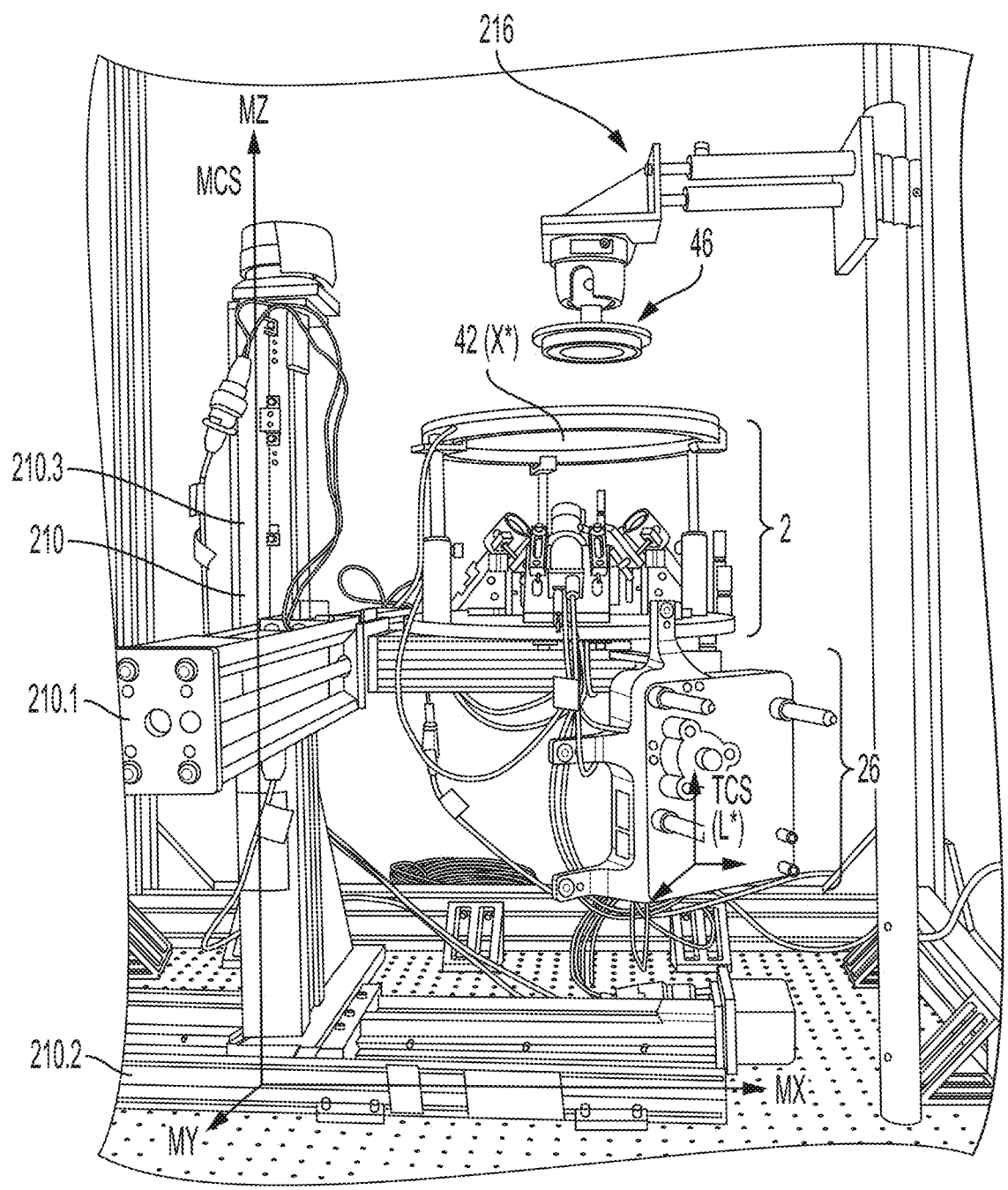
FIG. 21 shows a non-contact coordinate measuring machine.

In an embodiment, with reference to FIG. 21, non-contact coordinate measuring machine 200 includes light source 198 disposed on reference member support 216 to illuminate noncontact metrology probe 2, object member 46, and the like.

Camera (4, 8, 14) can be various types of image capture devices. Exemplary cameras include charge coupled devices; complementary metal-oxide semiconductor (CMOS) sensors; thermal microbolometer arrays; an array of optical, infrared or ultraviolet sensors, and the like. Camera (4, 8, 14) includes pixels (58, 60, 62) arranged in various formats such as an array. The number of pixels included in the camera (4, 8, 14) is effective to acquire images (first image, second image, third images, and the like) of reference member 28 or object member 46. Camera (4, 8, 14) acquires images at various wavelengths, which can include a broadband of wavelengths such as a visible wavelength, ultraviolet wavelength, infrared wavelength, and the like, or a combination thereof. Moreover, an optical filter can be interposed between camera (4, 8, 14) and image plane (52, 54, 56) to provide wavelength or optical polarization selectivity or sensitivity to camera (4, 8, 14).

It is contemplated that camera (4, 8, 14) acquires images (e.g., 64, 66, 68 65, 67, 69) of reference member 28 or object member 46. Images (64, 66, 68 65, 67, 69) include direct images of reference member 28 or object member 46 or indirect images of reference member 28 or object member 46. Camera (4, 8, 14) can acquire light reflected from member (28, 46), light emitted from member (28, 46), light transmitted through member (28, 46), light transmitted around member (28, 46), and the like. In an embodiment, reference member 46 is interposed between camera (4, 8, 14) and a light source, and camera (4, 8, 14) acquires an image of reference member 46 as a shape that blocks a portion of light from the light source.

According to an embodiment, noncontact metrology probe 2 includes reference member 28 that includes a light reflector, a light emitter, a light blocker, a light filter, or a combination thereof. In an embodiment, reference member 28 is the light reflector that includes a spherical mirror reflector, a six-degree-of-freedom tracker target, or a combination comprising at least one of the foregoing. In a particular embodiment, reference member 28 is the spherical mirror reflector. Exemplary spherical mirror reflectors include a corner cube reflector, retroreflective spherical target as used in photogrammetry, and the like.

In an embodiment, noncontact metrology probe 2 includes secondary members (36, 38, 40, 37, 39) that independently include a light reflector, a light emitter, a light blocker, a light filter, or a combination thereof. Secondary member (36, 38, 40, 37, 39) can be a same as or different than reference member 28. In an embodiment, secondary members are a spherical mirror reflector.

Noncontact metrology probe 2 can include object member 46. Here, object member 46 can be disposed in probe focal volume 18 or external to probe focal volume 18. Object member 46 is an item that is subjected, by noncontact metrology probe 2, to tracking (by tracker 20) a movement or location of object member 46; positioning in one-, two-, or three-dimensional space; sizing; determining its surface topology; associating optical or infrared spectral or polarization properties to physical aspects of object member 46; and the like.

Object member 46 can have a size and shape that is not particularly limited. A portion of object member 46 can be subjected to being tracked by tracker 20 or imaged by cameras (4, 8, 14). A size of object member 46 can be, e.g., less than 1 millimeter (mm); greater than 1 meter (m); from 1 cm to 10 m, specifically from 1 mm to 1 centimeter (cm), and more specifically from 1 micrometer (μm) to 1 mm. In a particular embodiment, object member 2 has a size that is less than 10 μm. In some embodiments, a size of a portion of object member 2 that is subjected to image acquisition by cameras (4, 8, 14) is 2 mm. Moreover, a shape of object member 46 can be any shape that cameras (4, 8, 14) can image.

Additionally, object member 46 can include tangible objects made of optically semitransparent, transparent, reflective, soft materials such as liquid and wax, or objects that are in tangible or virtually present such as the distribution of light from a laser beam, a projected image of a real object, or a hologram.

In an embodiment, noncontact metrology probe 2 includes tracker 20. Tracker 20 tracks a location of reference member 28 or secondary members (36, 38, 40, 37, 39). Moreover, tracker 20 monitors a location of reference member 28 or secondary members (36, 38, 40, 37, 39) in the tracker coordinate system. The tracker coordinate system is generated via software and linked to spatial locations of reference member 28 or secondary members (36, 38, 40, 37, 39) by detecting such spatial locations using an optical detector. According to an embodiment, reference member 28 or secondary members (36, 38, 40, 37, 39) are spherical mirror reflectors such that tracker 20 provides a laser beam that is reflected from reference member 28 or secondary members (36, 38, 40, 37, 39) and detected by an optical detector of tracker 20. Moreover, tracker 20 can also measure six-degree of freedom reference members to provide measurement and tracking of full six-degree of freedom motion and position. Exemplary trackers 20 include a laser tracker, photogrammetry tracking system, structured light scanning system, and the like.

Light source 198 produces light to illuminate components of as well as object member 46. Light source 198 can include various sources of light including light emitting diodes, arc lamps, lasers, as well as light projectors that create patterns of light such as grids, lines, dots, and the like to provide various types of illumination for instance bright field illumination, dark field illumination, various distributions and structures of light so as to make features such as edges or surfaces stand out and can be made from light sources and or light sources in combination with optical components to achieve the type of lighting scenario. Moreover, the light source can produce light across the electromagnetic spectrum such as ultra violet, visible, infrared, and include optical components such as wavelength selective filters, lenses, polarizers so as to achieve specific spectral components and distributions of light and polarization states as well as include a distribution and arrangement of individual light sources. In an embodiment, light source 198 includes a ring of light emitting diodes and a diffusing filter to provide dark field and bright field illumination across the visible spectrum with random polarization.

Multidimensional motion stage 210 moves noncontact metrology probe 2 (e.g., pixel probe) to coordinates to measured, on an object to be measured. This motion can be achieved in any type of coordinate system geometry that can include, e.g., Cartesian, spherical, cylindrical, and the like in either 2-D, 3-D, or 6-D. More specifically, range of motion is not restricted such that multidimensional motion stage 210 can move noncontact probe 2 over a range of distance in 2-D and 3-D from a few microns or less up to meters or greater and in orientation from less than a degree to more the 360 degrees in rotational orientation. Moreover, the motion can be controlled by a controlling unit such as a computer or can be manually adjusted.

In an embodiment, first motion arm 210.1 provides motion in one of three 3-D directions with a range of meters to as small as microns with a resolution in steps of a microns along first machine direction M1.

In an embodiment, second motion arm 210.2 provides motion in one of three 3-D directions with a range of meters to as small as microns with a resolution in steps of a microns along second machine direction M2.

In an embodiment, third motion arm 210.3 provides motion in one of three 3-D directions with a range of meters to as small as microns with a resolution in steps of a microns third machine direction M3.

Controller 214 can be in communication with multidimensional motion stage 210. Here, controller 214 can control movement of first motion arm 210.1 along first machine direction M1, movement of second motion arm 210.2 along second machine direction M2, and movement of third motion arm 210.3 along third machine direction M3. It is contemplated that controller 214 provides a single-point coincidence, and selection of a measurement coordinate through a GUI by point-and-click in an image captured by first camera 4, second camera 8, or third camera 14 of non-contact coordinate measuring machine 200.

Reference member support 216 can be a platform that provides surface mounting of various components and interface among various components as wells as communication of translational or rotary motion among such components.

Distance differential s218 is a distance between target point on an object to be measured and the noncontact metrology probe.

First coordinate system CS1 is a position and orientation of first camera 4. Second coordinate system CS2 is a position and orientation of second camera 8. Third coordinate system CS3 is a position and orientation of third camera 14.

Machine coordinate system MCS is a coordinate system that is used to determine the motion through which multidimensional motion stage 210 moves noncontact metrology probe distance differential s218.

World coordinate system WCS is a space wherein all coordinates and coordinate systems reside including those measured with noncontact metrology probe 2, machine coordinate system MCS Tracker coordinate system TCS, camera coordinate systems CS1, CS2, CS3 and all things measured with noncontact metrology probe 2 or elements that can be in proximity to objects measured with noncontact metrology probe 2. World coordinate system WCS provides a unifying coordinate system that ties together spatial relationships of all components of non-contact coordinate measuring machine 200.

Tracker coordinate system TCS is a coordinate system that is native to the tracker and within which measurements made by the tracker are assigned coordinates. In an embodiment, TCS can be equivalent to WCS.

In an embodiment, a process for making noncontact metrology probe 2 includes providing first camera 4; disposing second camera 8; arranged second camera 8 such that second field of view 10 overlaps first field of view 6 to form prime focal volume 12; disposing third camera 14; arranging third camera 14 such that third field of view 16 overlaps prime focal volume 12 to form probe focal volume 18; and disposing tracker 20 configured to determine a location of probe focal volume 18 in tracker field of view 22 to make noncontact metrology probe 2. The process further can include disposing reference member 28 in probe focal volume 18. Additionally, the process can include disposing a plurality of secondary reference members (36, 38, 40) proximate to first camera 4, second camera 8, or third camera 14, wherein secondary reference members (36, 38, 40) are disposed in tracker field of view 22. In some embodiments, the process includes disposing object member 46 in first field of view 6, second field of view 10, third field of view 16, or combination thereof. In a certain embodiment, the process includes disposing first camera 4, second camera 8, third camera 14, or combination thereof on a substrate, e.g., an optical breadboard.

In an embodiment, a process for making non-contact coordinate measuring machine 200 includes disposing third motion arm 210.3 on second motion arm 210.2; disposing second motion arm 210.2 on first motion arm 210.1 to form multidimensional motion stage 210; disposing camera platform 212 on multidimensional motion stage 210; disposing noncontact metrology probe 2 on camera platform 212; connecting controller 214 to multidimensional motion stage 210; disposing secondary member 36 on camera platform 212; and placing tracker 20 in communication with secondary member 36.

In an embodiment, a process for calibrating noncontact metrology probe 2 includes providing noncontact metrology probe 2 that includes first camera 4 including first field of view 6; second camera 8 including second field of view 10; third camera 14 including third field of view 16; and tracker 20 including tracker field of view 22. The process also includes overlapping first field of view 6 with second field of view 10 to form prime focal volume 12; overlapping prime focal volume 12 with third field of view 16 to form probe focal volume 18; and overlapping tracker field of view 22 with probe focal volume 18 to calibrate noncontact metrology probe 2. Additionally, the process can include providing reference member 28 in probe focal volume 18; acquiring first image 64 of reference member 28 by first camera 4; acquiring second image 66 of reference member 28 by second camera 8; acquiring third image 68 of reference member 28 by third camera 14; determining a plurality of first pixel coordinates 59 of a feature of reference member 28 from first image 64; determining a plurality of second pixel coordinates 61 of the feature of reference member 28 from second image 66; determining a plurality of third pixel coordinates 63 of the feature of reference member 28 from third image 68; and determining reference centroid 48 of the feature of reference member 28 from first pixel coordinates 59, second pixel coordinates 61, and third pixel coordinates 63. In an embodiment, the feature includes an edge of reference member 28.

According to an embodiment, the process for calibrating noncontact metrology probe 2 further includes disposing a plurality of secondary members (36, 38, 40, 37, 39) proximate to first camera 4 and second camera 8 in tracker field of view 20; acquiring, by tracker 20, individual locations of secondary members (36, 38, 40, 37, 39); and referencing reference centroid 48 to the individual locations. In this manner, the locations of the secondary members (36, 37, 38, 39, 40), reference member 28, and reference centroid 48 can be identified by coordinates in the tracker coordinate system of tracker 20. Further, the locations of the secondary members (36, 37, 38, 39, 40) and reference member 28 in the tracker coordinate system will be linked to pixel coordinates (59, 61, 63) of camera (4, 8, 14) via reference centroid 48. It is contemplated that a location of secondary members (36, 37, 38, 39, 40) is fixedly associated with a location of cameras (4, 8, 14) such that tracking a movement promotion of secondary members (36, 37, 38, 39, 40) will provide a location of cameras (4, 8, 14) and also reference centroid 48.

In a process for determining a location of object member 46, the process further includes disposing object member 46 at an arbitrary location with respect to reference centroid 42; acquiring first image 65 of object member 46 by first camera 4; acquiring second image 67 of object member 46 by second camera 8; acquiring third image 69 of object member 46 by third camera 14; determining a plurality of first pixel coordinates 59 of first image 65; determining a plurality of second pixel coordinates 61 of second image 67; determining a plurality of third pixel coordinates 63 of third image 69; determining object centroid 48 of object member 46 at the arbitrary location from first pixel coordinates of object member object image centroid 71, second pixel coordinates 61 of second object image centroid 73, and third pixel coordinates 63 of third object image centroid 75; and referencing object centroid 48 to the individual locations of secondary members (36, 38, 40) to determine a first location of object member 46 relative to reference centroid 42.

In some embodiments, instead of determining object centroid 48, it is contemplated that calculation of a centroid of whole of object member 46 can be made or determining a center of a feature on object member 46, the feature being the same size as a pixel of camera (4, 8, 14). Here, noncontact metrology probe 2 measures a single point location on object member 46. From a plurality of such point locations, the process can include constructing a geometry that these points occupy. Once the feature is identified, the feature is disposed at pixel coordinates in images for each camera (4, 8, 14) at the same time. In this manner, the point is located on object member 46 such that determination of a centroid of object member 46 optionally can be skipped.

According to an embodiment, the process further can include moving object member 46 from the arbitrary location to a second location; determining object centroid 48 of object member 46 at the second location; referencing object centroid 48 of object member 46 at the second location to the individual locations of secondary members (36, 38, 40) to determine the second location of object member 46 relative to reference centroid 42; and tracking movement of object member 46 by comparing the first location to the second location. In a certain embodiment, the process includes moving object member 46 from the arbitrary location to a third location, wherein object centroid 48 overlaps reference centroid 42 at the third location. In some embodiments, instead of determining object centroid 48, a feature (e.g., a spot, aperture, edge, shape, size, and the like) of object member 46 can be determined by acquiring images of the feature with cameras (4, 8, 14) and referencing the feature in the images to pixel coordinates of cameras (4, 8, 14), which can be linked to the tracker coordinates system via reference centroid 42.

Figure 22:
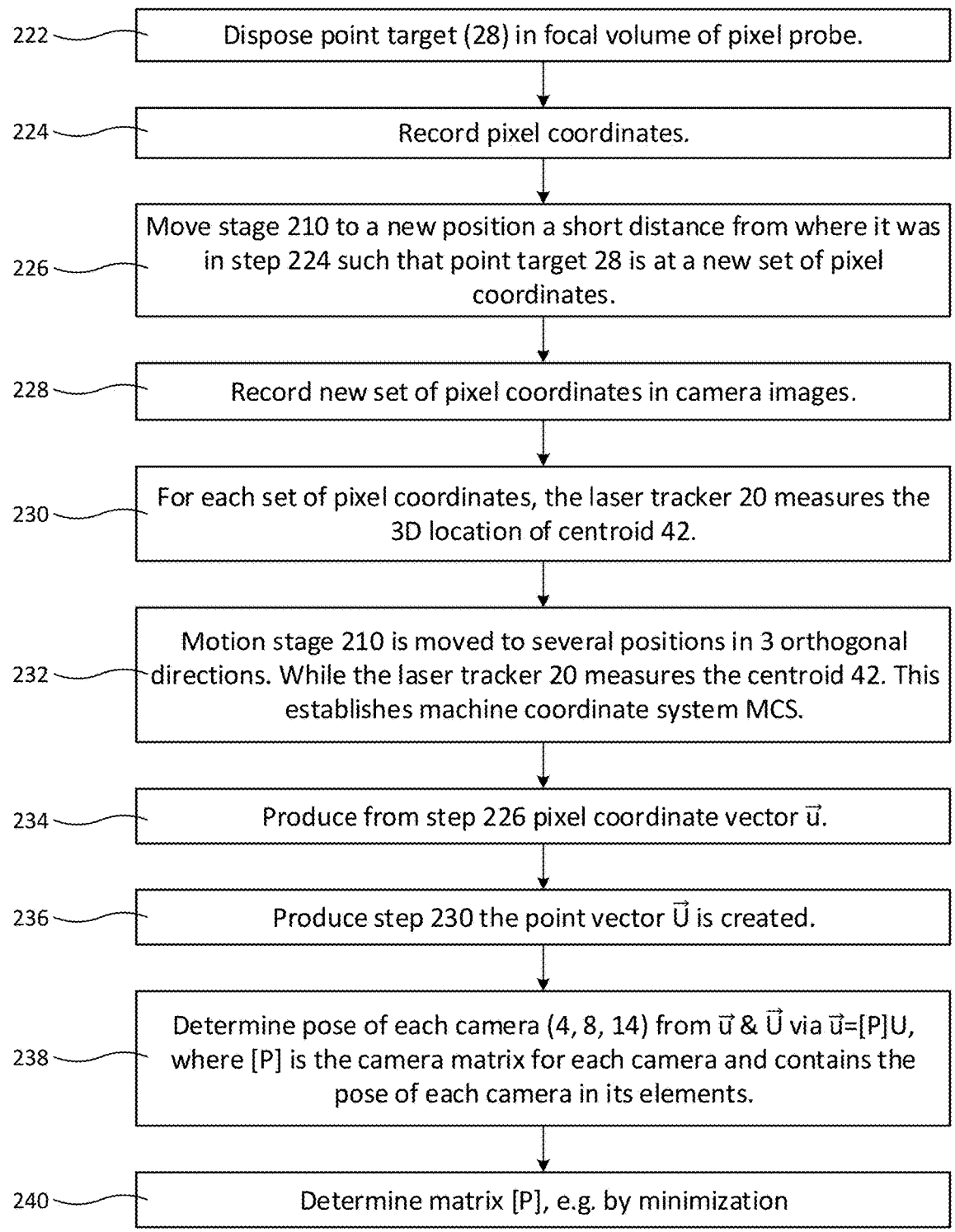
FIG. 22 shows a flow chart for calibrating a non-contact coordinate measuring machine.

In an embodiment, with reference to FIG. 22, a process for calibrating non-contact coordinate measuring machine 200 includes: disposing reference member 28 in probe focal volume 18 of non-contact coordinate measuring machine 200 with multidimensional motion stage 210 at a first position; obtaining, by first camera 4, first reference image centroid 70 of reference member 28; obtaining, by second camera 8, second reference image centroid 72 of reference member 28; obtaining, by third camera 14, third reference image centroid 74 of reference member 28; determining a first set of image centroids including first reference image centroid 70, second reference image centroid 72, and third reference image centroid 74; moving multidimensional motion stage 210 to a second position, such that reference member 28 has a second set of image centroids; measuring, by tracker 20, a three-dimensional location of the centroid 42; producing machine coordinate system MCS by moving multidimensional motion stage 210 to a plurality of positions along orthogonal directions while measuring, with tracker 20, the three-dimensional location of centroid 42 at each position; producing pixel coordinate vector $\vec{u}$ from the second set of image centroids; producing point vector $\vec{U}$ from the three-dimensional location of centroid 42; and determining a pose of first camera 4, second camera 8, and third camera 14 from pixel coordinate vector $\vec{u}$ and point vector $\vec{U}$ to calibrate non-contact coordinate measuring machine 200.

In the process for calibrating, disposing reference member 28 in probe focal volume 18 includes assuring reference member 28 is within the field of camera, camera 8 and camera 14.

Obtaining, by first camera 4, first reference image centroid 70 of reference member 28 includes using any number of image filters and or algorithms to identify the centroid of reference member 28. Obtaining, by second camera 8, second reference image centroid 72 of reference member 28 includes using any number of image filters and or algorithms to identify the centroid of reference member 28. Obtaining, by third camera 14, third reference image centroid 74 of reference member 28 includes using any number of image filters and or algorithms to identify the centroid of reference member 28.

The process can further include: determining a first set of image centroids including first reference image centroid 70, second reference image centroid 72, and third reference image centroid 74; moving multidimensional motion stage 210 to a second position, such that reference member 28 has a second set of image centroids; measuring, by tracker 20, three-dimensional location of centroid 42 using tracker software or other tracker related operating systems to capture tracker data; producing machine coordinate system MCS by moving multidimensional motion stage 210 to a plurality of positions along orthogonal directions while measuring, with tracker 20, the three-dimensional location of centroid 42 at each position using tracker software or other tracker related operating systems to capture tracker data; producing pixel coordinate vector $\vec{u}$ from the second set of image centroids by using any number of image filters and or algorithms to identify image centroids; producing point vector $\vec{U}$ from the three-dimensional location of centroid 42 obtained from positions of the multidimensional motion stage 210 in the machine coordinate system MCS; and determining a pose of first camera 4, second camera 8, and third camera 14 from pixel coordinate vector $\vec{u}$ and point vector $\vec{U}$ by using various algorithms based on optical and or machine vision and or multi-view geometry theory and or any other analysis and algorithm implementation relating pixel coordinate vector $\vec{u}$ and point vector $\vec{U}$ in such a way as allows one to describe pose of first camera 4, second camera 8, and third camera 14.

Figure 23:
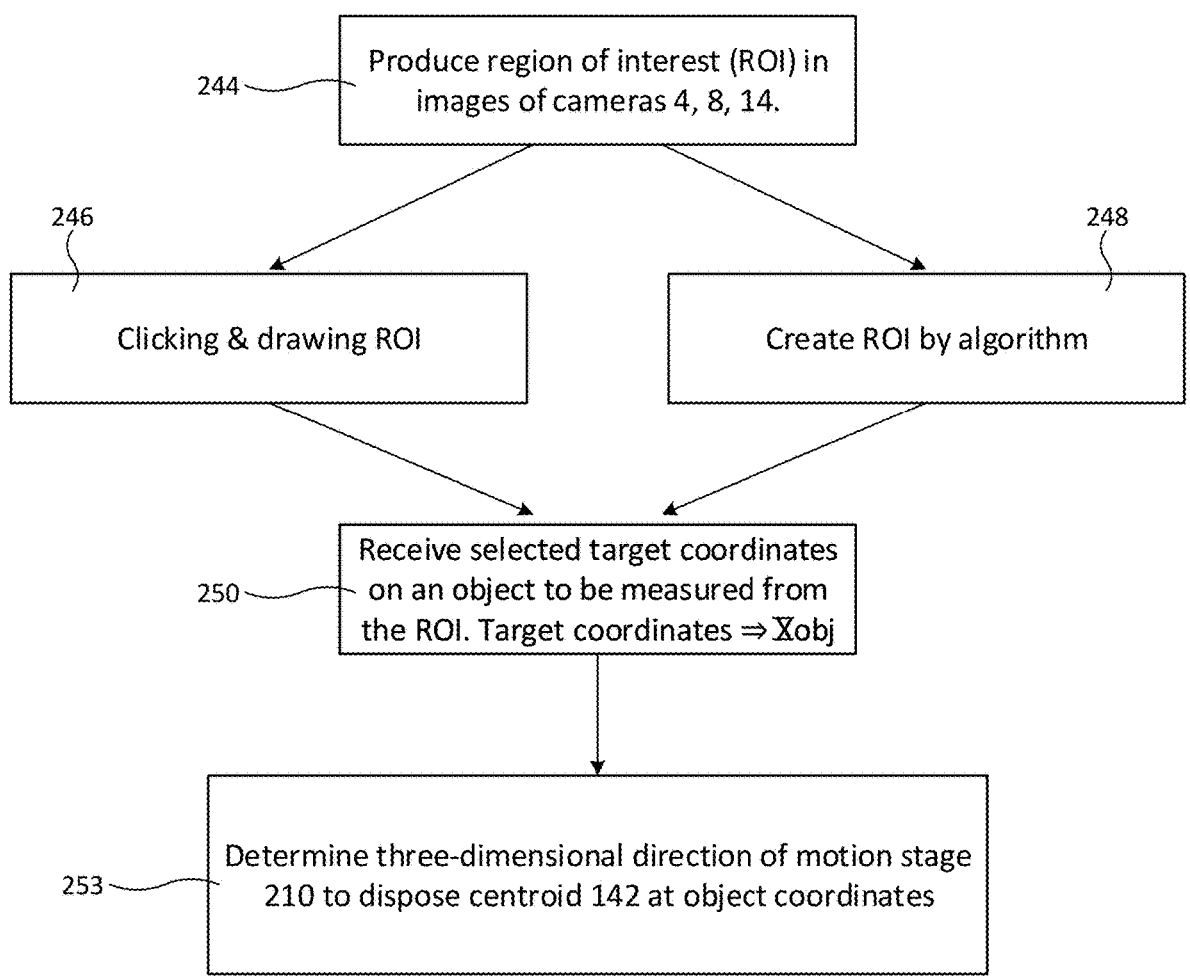
FIG. 23 shows a flow chart for targeting an object.

In an embodiment, with reference to FIG. 23, a process for targeting object member 46 with non-contact coordinate measuring machine 200 includes: determining centroid 42 of probe focal volume 18 for non-contact coordinate measuring machine 200; disposing object member 46 at an arbitrary position with respect to centroid 42; obtaining a first image of object member 46 by first camera 4; obtaining a second image of object member 46 by second camera 8; obtaining a third image of object member 46 by third camera 14; producing a region of interest of object member 46 in the first image, the second image, and the third image; determining, from the first image, first object image centroid 71 for object member 46; determining, from the second image, second object image centroid 73 for object member 46; determining, from the third image, third object image centroid 75 for object member 46; producing target coordinates from first object image centroid 71, second object image centroid 73, and third object image centroid 75; and determining distance differential 218 between centroid 42 and object centroid 48.

The process for targeting also can include moving multidimensional motion stage 210, based on distance differential 218, so that object centroid 48 overlaps centroid 42.

Noncontact metrology probe 2 and processes herein have advantageous and beneficial properties and uses. It is contemplated that noncontact metrology probe 2 determines a property of object member 46, wherein the property includes a location; an orientation; a size; or a combination thereof in an absence of contact between object member 46 and first camera 4, second camera 8, third camera 14, or tracker 20.

Moreover, noncontact metrology probe 2 determines the location or size of object member 46 to an accuracy of less than or equal to 1 µm. Additionally, noncontact metrology probe 2 determines the orientation and the location of object member 46 in six degrees of freedom. In some embodiments, noncontact metrology probe 2 provides determination of object centroid 48 of object member 46, detection of an edge of object member 46, determination of a location of a fiducial (e.g., a marking on object member 46, an indentation in the object member 46, a projection from object member 46, and the like) disposed on object member 46, inspection of object member 46, or a combination thereof. Noncontact metrology probe 2 can provide determination of an absolute alignment of object member 46 with respect to an auxiliary member (for example a second object member or secondary reference member) disposed in a location relative to the secondary members.

Further, noncontact metrology probe 2 has beneficial properties such as being based on images acquired by cameras (4, 8, 14); being physically contactless (i.e., free from physical contact); independent of a particular type of illumination (e.g., any wavelength of light can be used to acquire images, including phase contract and light blocking); being scalable to selected resolutions; being used in conjunction with image analysis algorithms to connect features in an image to the tracker coordinate system; providing adjustability of spatial resolution or effective size of non-contact metrology probe 2 on the fly from one pixel in size to a plurality of pixels such as by adjusting a number of pixels grouped around pixel coordinates of reference member 28. Additionally, noncontact metrology probe 2 provides spatial metrology for object member 46 in the case where object member 46 includes a material with low albedo (e.g., optically semitransparent, transparent material), a material that is highly optically reflective (e.g., soft materials such as liquid and wax), an object that is intangible or virtually present (e.g., a distribution of light from a laser beam, a projected image of a real object, a hologram, and the like), and the like. Noncontact metrology probe 2 can simultaneously acquire or determine spatial information and optical, infrared, spectral, polarization properties for object member 46.

Noncontact metrology probe 2 can provide noncontact, optical tracking and size information for object member 46 that is substantially larger than noncontact metrology probe 2, made of solid material, can be physically contacted without deformation, has well characterized albedo, or lacks sharp edges or corners. Additionally, noncontact metrology probe 2 provides noncontact, optical tracking or size information for object member 46 that is substantially smaller than noncontact metrology probe 2. In an embodiment, object member 46 (e.g., a millimeter (mm)-wave antenna) includes dimensions for a feature of interest that is less than or equal to 1 mm; has a sharp corner; has a sharp edge; includes polished metal; is too delicate to contact; or a combination thereof. Noncontact metrology probe 2 provides spatial metrology of such object member 46.

Beneficially, noncontact metrology probe 2 is a working distance they can be from 1 mm to 500 mm, e.g., a working distance that is greater than 100 mm. Here, noncontact metrology probe 2, e.g., camera (4, 8, 14), does not interfere with object member 46 (e.g., an antenna) or mounting hardware for object member 46. Advantageously and surprisingly, noncontact metrology probe 2 has a field of view (6, 10, 16, 22) sufficiently large enough to image or track object member 46, e.g., entire antenna component. In an embodiment, noncontact metrology probe 2 includes a high pixel resolution and large total field of view, e.g., a 30 µm pixel resolution across a total field of view, e.g., 3 cm×3 cm at a working distance of 100 mm between camera (4, 8, 14) and object member 46.

Noncontact metrology probe 2 can be used for various metrological purposes, including integration with a machine vision system, noncontact spatial characterization of object member 46 (e.g., antenna) such as aperture centroiding, aperture detection, fiducial marker locating, and inspecting. Moreover, noncontact metrology probe 2 can provide for manipulation of a plurality of antennas or other objects for relative alignment of antennas. It is contemplated that noncontact metrology probe 2 can be used for absolute alignment of antennas by linking machine vision information to tracker 20 of noncontact metrology probe 2. In this manner, noncontact metrology probe 2 can precisely locate object member 46, e.g., a mm wave antenna, for aligning and positioning such as a nearfield scanner.

It should be appreciated that non-contact coordinate measuring machine 200 provides solutions to several unsolved problems in coordinate metrology. Coordinate measuring machines (CMM) and coordinate measuring systems (CMS) fall into either portable or non-portable form factors. Non-portable systems can take up whole rooms and laboratories while portable systems can be placed on tripods and have hand held accessories. Non-portable systems are the most accurate while the portable systems are less accurate yet have the advantage of portability. On the other hand, non-portable systems provide coordinate measurements that provide information about dimensions of the object under measure but do not provide information about the object orientation, position, and dimensions that are within a larger world coordinate systems. Furthermore, conventional non portable CMM and CMS require physical contact via a contact or tactile probe to make coordinate measurements of an object so there is a tradeoff between utility of non-portable and portable systems. Furthermore, conventional portable coordinate metrology systems including a laser tracker use a large-scale tracking system. These tracking systems have further limitations and can be limited to tracking specific targets rather than directly measuring an object's surface. The probes used with measure object surfaces but do not measure edges that define an object's boundary. Such probes are limited on the smallest object they can measure that can be a few centimeters. Accordingly, conventional portable systems have difficulty or cannot measure objects on the meso and micro scale in size of approximately 50 mm to 1 micron in size. Coordinate measurement machine 200 overcomes these problems that are characteristic of conventional non-portable and portable CMMs and CMSs. The following is a list of solutions to several unsolved problems in coordinate metrology that are overcome by coordinate measuring machine 200. In particular, non-contact coordinate measuring machine 200 has the following attributes: has both portable and non-portable ability by enabling the use of a tracker in conjunction with a multidimensional motion stage; measurements are made in a world coordinate system, wherein dimensions as well as the orientation and position of the object under measure can be determined rather than just relative dimensions; extends the dimensional scale of objects that can be measured with a tracker within a world coordinate system into the meso and micro scale thus extending the full range of object sizes to encompass several meters, to millimeters, to microns; adds automation to the measurements a tracker can make through object and coordinate targeting; provides measurement of orientation, position, and dimension in a world coordinate systems without physical contact; provides removal of tracker system without loss of calibration, providing measurements made with coordinate measurement machine 200 to be combined with tracker measurements into a single world coordinate system; provides relative position and dimensions not in a world coordinate system; provides optical non-contact probe 2 that can be configured for different resolution, and a host of measurement abilities based on optical design of non-contact probe 2; and has resolution and accuracy commensurate with that of a traditional non-portable CMM or CMS but can be included in a portable system that overcomes the tradeoff of conventional non-portable and portable CMMs and CMSs.

The articles and processes herein are illustrated further by the following Examples, which are non-limiting.

EXAMPLES

Example 1. Noncontact Metrology Probe

The noncontact metrology probe (NMP) is based on optical imaging and includes three cameras arranged in a tetrahedral and include three 2592×1944 CMOS pixel arrays (also referred to as focal plane arrays FPA) and three 12.5 mm focal length low distortion machine vision lenses. From each camera, a single pixel was linked to a laser tracker through a calibration process we describe below. These three pixels were then used to unambiguously define a single point in space, P* that was known in the native coordinate frame of the laser tracker (LT). Because P* was defined through the camera images, it is in actuality a virtual object that is conjugate to the physical pixels in each FPA. As such, there is nothing physically there at the location of P*. In use, P* is a set of pixel coordinates from each camera and can be virtually placed on the object we wish to measure by using the camera images. Here, the NMP does not physically touch the object under measure. The FPAs provide spatial resolution about tens of μm and also makes the spatial resolution of the NMP scalable by judicious choices of FPA pixel size and lens focal length. The NMP had approximately 25 μm spatial resolution.

The non-contact imaging nature of the NMP allowed novel measurement modalities not obtainable with other LT probes and targets, such as measuring sharp corners, sharp edges, objects that are soft, optically transparent, objects of high and low reflectance as well as virtual objects (such as an image of a real object). In addition, other optical information such as geometries determined from machine vision algorithms, thermal infrared data, spectral and polarization information that represents other physical quantities could also be simultaneously linked to the spatial measurement of the LT. This provides a measurement framework to perform direct multi-physics measurements with a LT. Such measurements could be used to compare multi-physics simulations with real data at the spatial resolution of the NMP. The NMP can also be used for robot Tool Center Point (TCP) calibration and teaching with spatial resolution and accuracy about tens of μm. The imaging properties of the NMP provide robot tool end effectors to be measured such as water jets, laser welding spots, and the like.

Example 2. Point Projection to a Pixel

Although spatial resolution is readily obtained in the image plane transverse to the optical axis (OA), for a single lens system the spatial resolution along the OA is provided by the depth of focus (DOF) of the lens and not pixel resolution. The DOF is the distance over which an object can be shifted along the OA while remaining in focus. In a ray optics picture, this distance can be considered zero. However, due to the wave nature of light in a real optical system, the DOF is a non-zero value that depends on the ratio of the focal length to lens aperture, i.e., the f-number denoted as F/#. The DOF for a rotationally symmetric lens can be closely modeled with a Gaussian beam. Consider the expression for a Gaussian beam generated by a lens. The DOF for such a beam is given by formula (1).

$$DOF = \frac{8\lambda}{\pi}(F/\#)^2. \tag{1}$$

If we want to measure the displacement of an object along the OA then we would want a relatively small DOF, such that we determined the plane of our object to within the error provided by the DOF. From (1), small DOF is produced from small F/#. However, this may come at expense of a bringing the object we are imaging close to the lens and also a decrease in image field of view. For instance, a 50×, F/0.9 microscope objective has very good DOF resolution of ≈1 µm, but with an object-to-lens distance (working distance) of only ≈1 cm, the field of view is ≈50 µm.

In contrast to a microscope objective, a typical machine vision lens has a comparatively long DOF of several millimeters, yet does provide transverse resolution of tens of am, with a respectable field of view of tens of mm and working distance of hundreds of mm. For the NMP, the camera lens and FPA used allow for roughly a 25 µm pixel resolution across a total FOV of roughly 3 cm×3 cm at a working distance of 100 mm.

Using only a single lens to locate an object in three dimensions would result in good spatial discrimination of position of the object transverse to the OA in the image plane. However, this lens would produce a comparatively ambiguous measure of object location along the lens OA. Therefore, to obtain the same spatial discrimination along the OA that can be achieved in the image plane, a way to break the ambiguity that results from the relatively long DOF of the lens is used.

Figure 24:
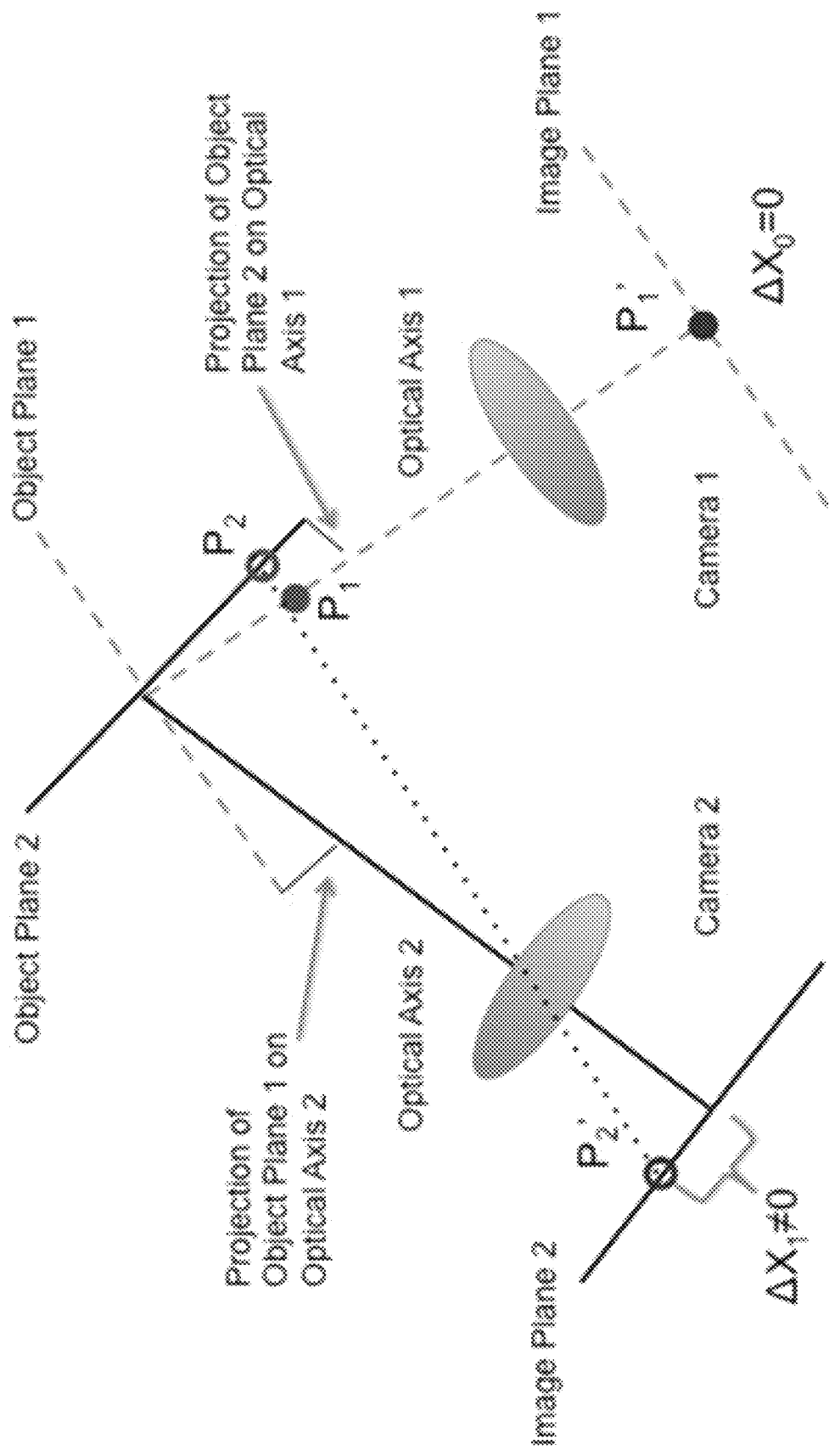
FIG. 24 shows a geometry cameras in a noncontact metrology probe.

Point projection onto multiple images planes was used to address the DOF ambiguity of a single lens. To accomplish this a three-camera approach was used. Three cameras were nominally oriented in a tetrahedral such that the OA of one camera was projected along the image plane of the others. This way a movement of a point along the OA of one camera was seen as a translation in the other two and thus the DOF ambiguity was broken. As such, the FPA of the other two cameras provided spatial resolution, and spatial discrimination along the OA of the third camera. Spatial resolution was comparable to the FPA in three directions: along the two dimensions of the image plane and along the OA. This is depicted in FIG. 24. $P_1$ (solid dot) shown in FIG. 24 is positioned on the OA of Camera 1 but located by some amount inside the plane of best focus, denoted as the Object Plane 1, but within the DOF of Camera 1. Point $P_1$ is at the same time being projected along Object Plane 2 of Camera 2 thereby creating point $P_2$ (open circle). The image of $P_1$ in Camera 1 is seen as $P_1'$ (solid dot) and in Camera 2 as $P_2'$ (open circle).

In Camera 1, $P_1'$ remained in the center of Image Plane 1 with little detectable change, whereas $P_2'$ is seen to have shifted by a measurable number of pixels denoted by $\Delta X$. The extent of the shift on Image Plane 2 depends on the physical shift of $P_2$ and by the image magnification dictated by the lens focal length of Camera 2 and the object image conjugate distances of $P_2$ and $P_2'^7$. As such, $P_1$ has three conjugate images, one on each camera (remember there are three cameras in this example). Given that one pixel represented a smallest discernable element in the image planes, $P_1'$ and $P_2'$ was represented as a set of pixel coordinates. Therefore, a given $P_1$ will have a unique set of two-dimensional pixel coordinates $(x_p, y_p)$ in each camera image. Thus, using three cameras $P_1$ is specified with a set of 3-pixel coordinates, (x1p, y1p), (x2p,y2p), (x3p,y3p). We linked $P_1$ to a LT such that these pixel coordinates defined a point that was known to the LT, and $P_1$ became a LT probe with spatial resolution of a single pixel.

Example 3. Linking a Pixel to a Laser Tracker

Figure 25:
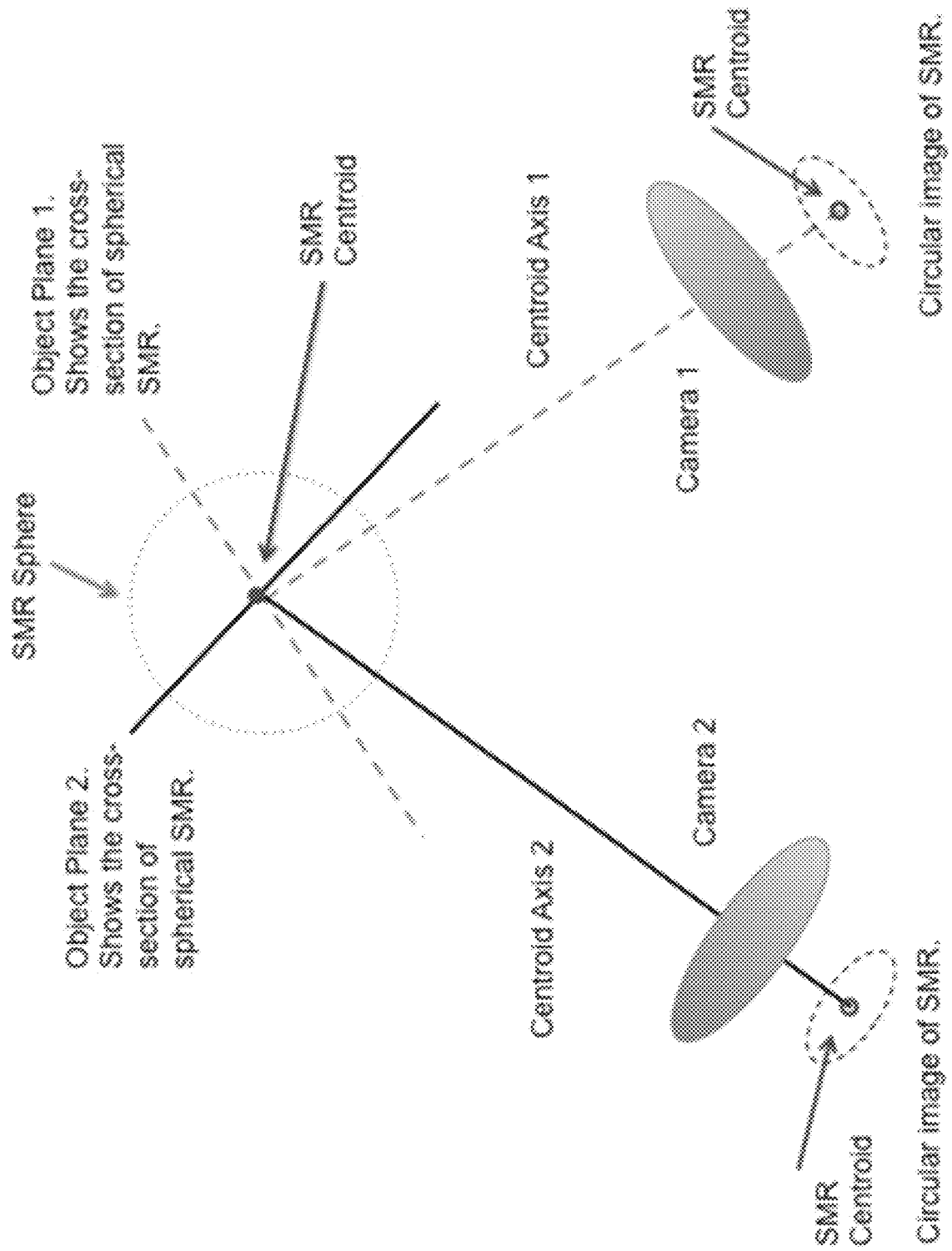
FIG. 25 shows a geometry cameras in a noncontact metrology probe.

Using the principle of projection to the three image planes as was done for the single point $P_1$, a sphere that is imaged by the three cameras will result in three circular images at each of the image planes. Furthermore, the centroid of these three circular images, when projected back to the object plane, are coincident with the 3D center of the sphere. Therefore, just as we were able to assign a unique set of three pixel coordinates to the single point, $P_1$, we assigned a similar set of three pixel coordinates to the centroid of the sphere. As is commonly known, the geometrical center of a spherical mirror reflector (SMR) is also coincident with the location that is measured by the LT to within a nominal alignment of 5 to 10 µm. Because the cameras can identify the sphere center, by projection to the pixel arrays, as well as the LT can, we have a direct way to link the set of pixel coordinates of the sphere center to the LT. This is depicted in FIG. 25, which shows a projection of an SMR that linked the cameras to a laser tracker. The circular images in Camera 1 and 2 that were produced by the projection of the SMR are shown. The centroid of these SMR images coincided with the centroid of the spherical form of the SMR.

Figure 27:
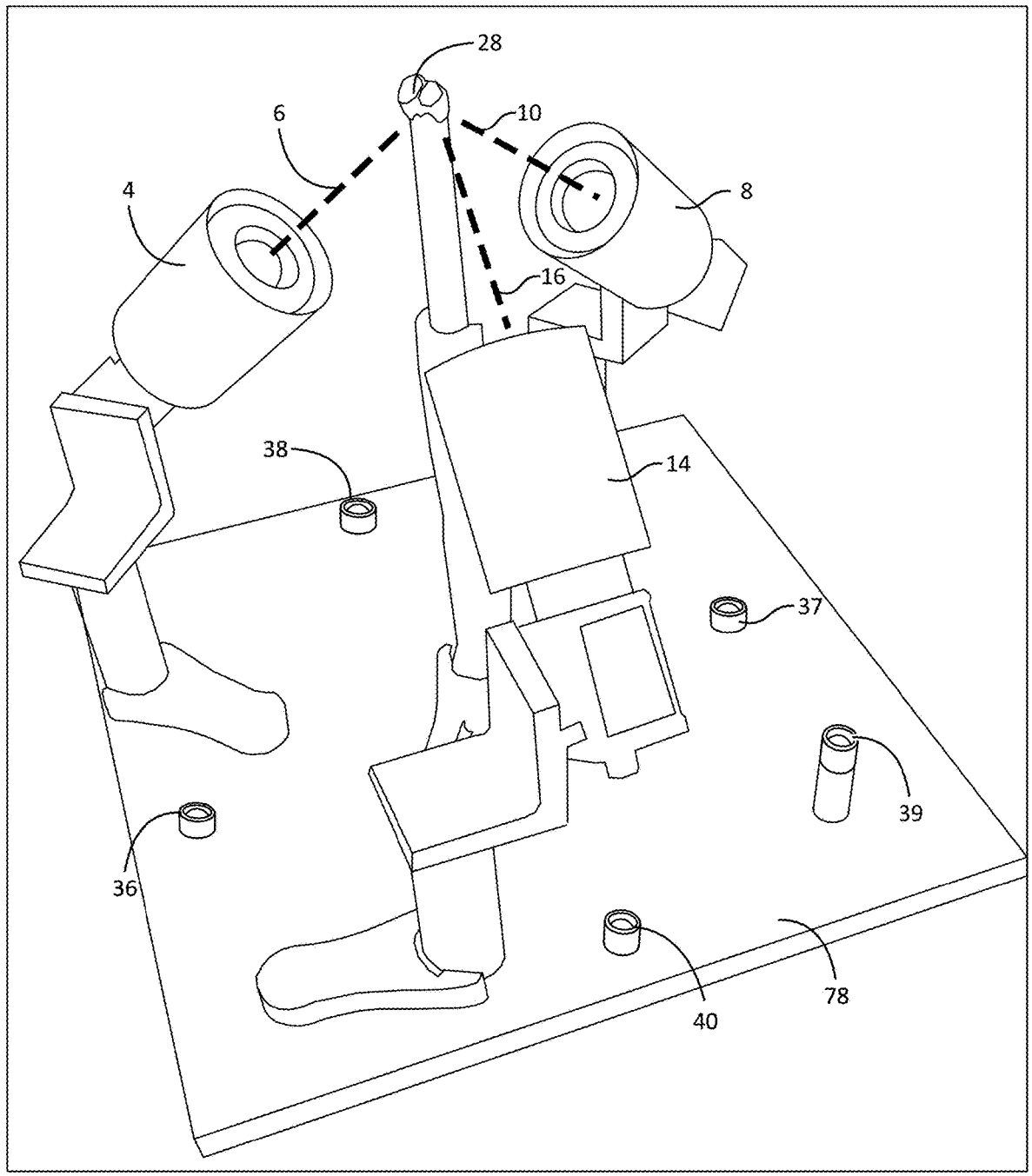
FIG. 27 shows a photograph of a portion of a noncontact metrology probe.

FIG. 27 shows an NMP that included three cameras arranged in a tetrahedral with a constellation of five SMRs fixed in relation to the cameras. The intersection of the optical axis (OA) for each camera to the location of reference member (here a spherical mirror reflector) is shown in FIG. 27. The points captured by the laser tracker representing the constellation of SMRs that was used to locate the NMP in the laser tracker coordinate frame.

Figure 26:
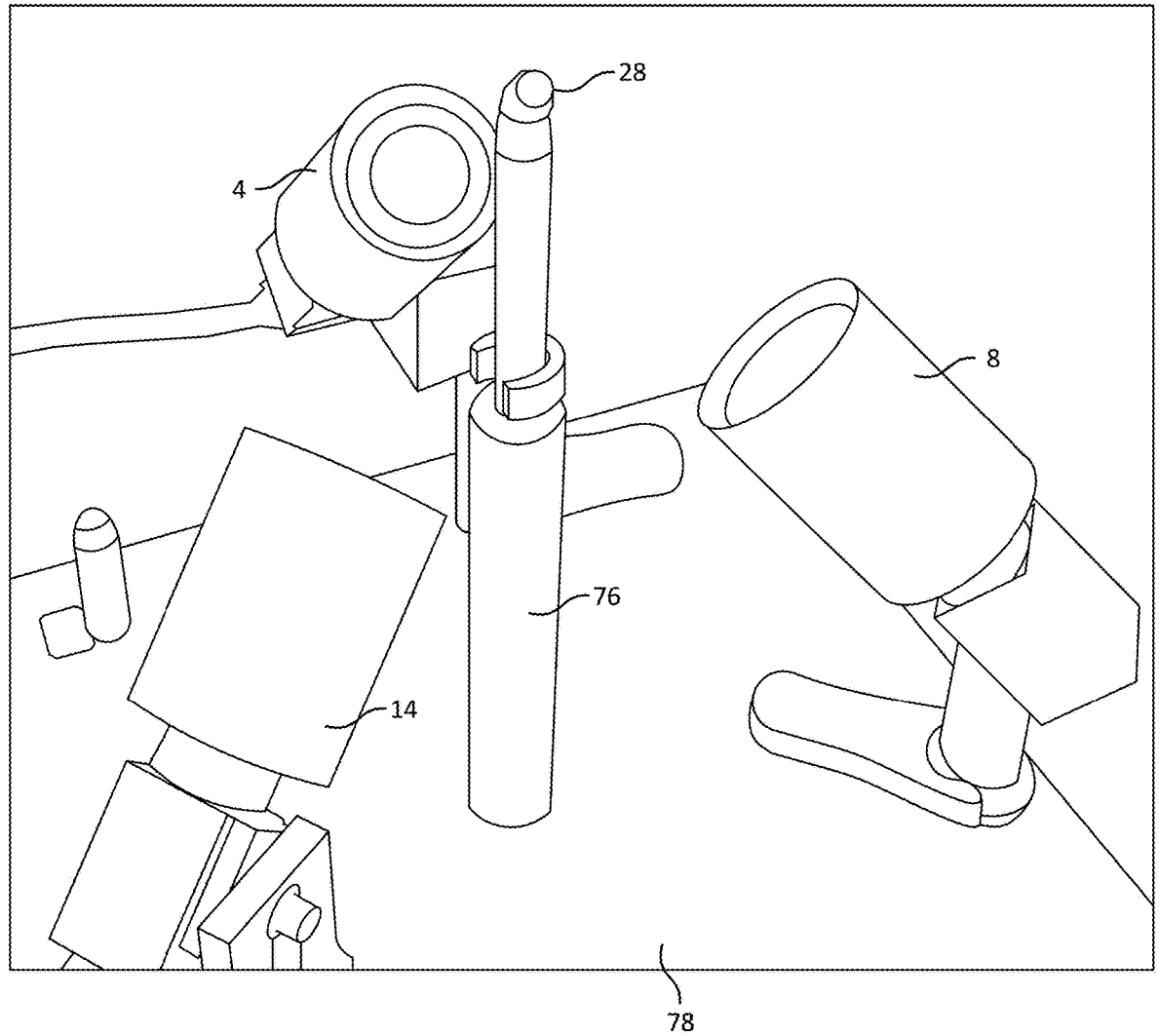
FIG. 26 shows a photograph of a portion of a noncontact metrology probe.
Figure 28:
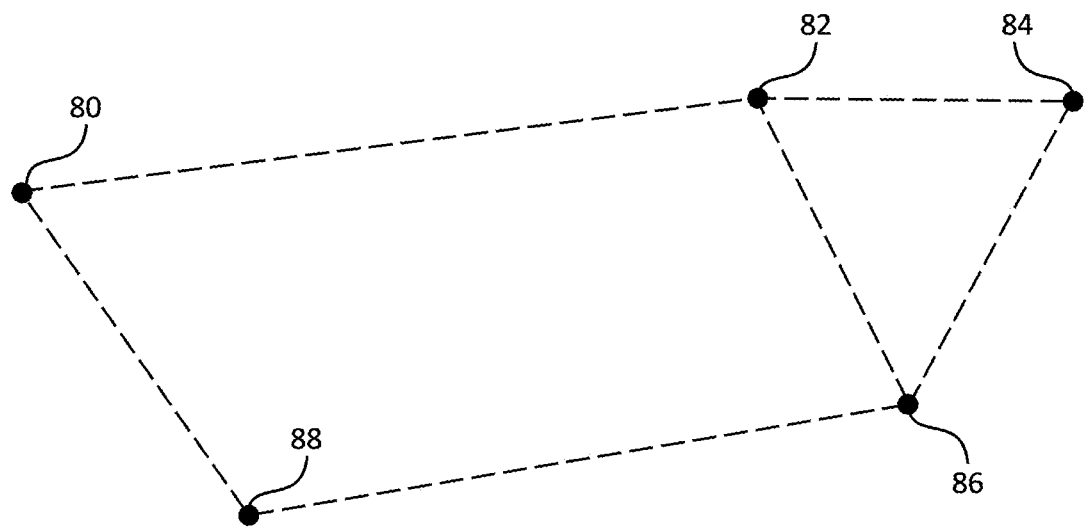
FIG. 28 shows a plurality of centroids corresponding to a reference member and secondary members shown in FIG. 26 and FIG. 27.
Figure 29:
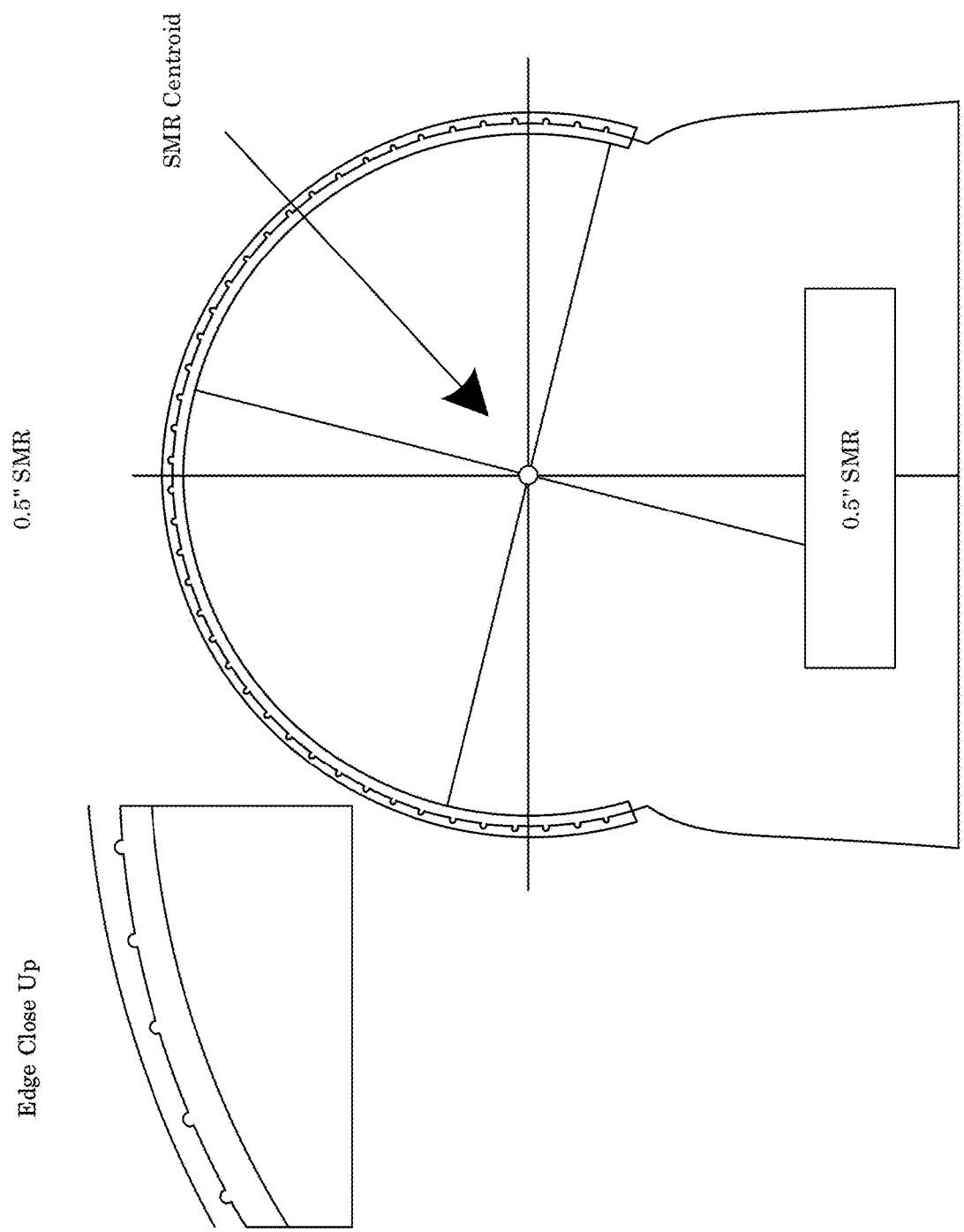
FIG. 29 shows an image of a reference member.

FIG. 28 shows a plurality of centroids corresponding to the reference member and secondary members shown in FIG. 26 and FIG. 27. Here, multiple centroids were generated by establishing a fixed constellation of SMRs relative to the three cameras, one of which (called reference member) is placed in the center of the FOV of the three cameras and plays the role of the sphere described previously. Five other SMRs (secondary members, labelled SMR1, SMR2, SMR3, SMR4, and SMR5) were mounted to the base of cameras, SMR1 through SMR5. To link the laser tracker to a single pixel from each of the cameras, a bright field image of reference member was first captured by each camera (See FIG. 29). A panel of light emitting diodes was used as to generate a Lambertian bright field background and a mat black shroud was placed around reference member and the cameras to stop unwanted reflections off the reflective SMR sphere. An edge detection algorithm was then used to determine the set of pixel coordinates that defined the centroid of reference member. FIG. 29 shows the bright field image of reference member. The cross hairs locate the centroid, the border is the region of interest (ROI) used in the edge detection process. Dots on the perimeter of the SMR and inside the ROI are the location of the edge pixels determined from the edge detection algorithm. These three pixel coordinates were stored in memory and highlighted in the images of the three cameras. Although the entire sphere was not visible due to the SMR nest. Here, FIG. 29 shows a bright field image of a 0.5-inch SMR as seen through the cameras of the NMP. This bright field image is the implementation of the SMR projection depicted in FIG. 25. (Top Left) A close up of the SMR edge is shown. The boundary is the ROI used for the edge detection process. Dots show the location of the pixels at the SMR edge in the bright field. (Center) The centroid of the SMR determined from fitting a circle to the edge pixels is also shown.

While reference member remains in the same position relative to the cameras and the rest of the constellation (SMR1 though SMR5) the LT measured the entire constellation of SMRs. At this moment reference member was removed from the constellation. This is because the centroid of reference member was stored in memory as pixel coordinates, and these coordinates uniquely defined the point in space of the centroid of reference member relative to the rest of the constellation. As such, when a point on an object appears to lie at the same location as the stored centroid pixels in all three cameras simultaneously, then that object occupies the same location as centroid of reference member did. In the NMP, the stored pixels were highlighted in each of the three images. The user then moved the NMP such that these highlighted pixels appear at the same location on the object one is trying to measure. That is, the user is in essence virtually placing the centroid of reference member at a known location on the object of measure. At this moment, the laser tracker then captured the rest of the SMRs in the constellation. Since the constellation has a fixed relationship to the centroid of reference member the location on the object under measure is also know by the LT. In this way, a physical LT target was not used to touch the object we measured. In essence, we created a virtual LT probe that is the size of a single pixel, or about 25 µm in the NMP. In the rest of these Examples, the point in space corresponding to the centroid of reference member is referred to just as reference member. Although a constellation of SMRs was used in conjunction with reference member, it would be equally effective to establish a coordinate frame using a six-degree-of freedom LT target that had a fixed relationship to reference member. This would have advantages such as easier tracking ability and quicker measurement time, as the processing of the SMR constellation relationship to reference member might be included. Next, we describe the validation and measurements made with the Noncontact metrology probe.

Example 4. Validation Measurement

Figure 30:
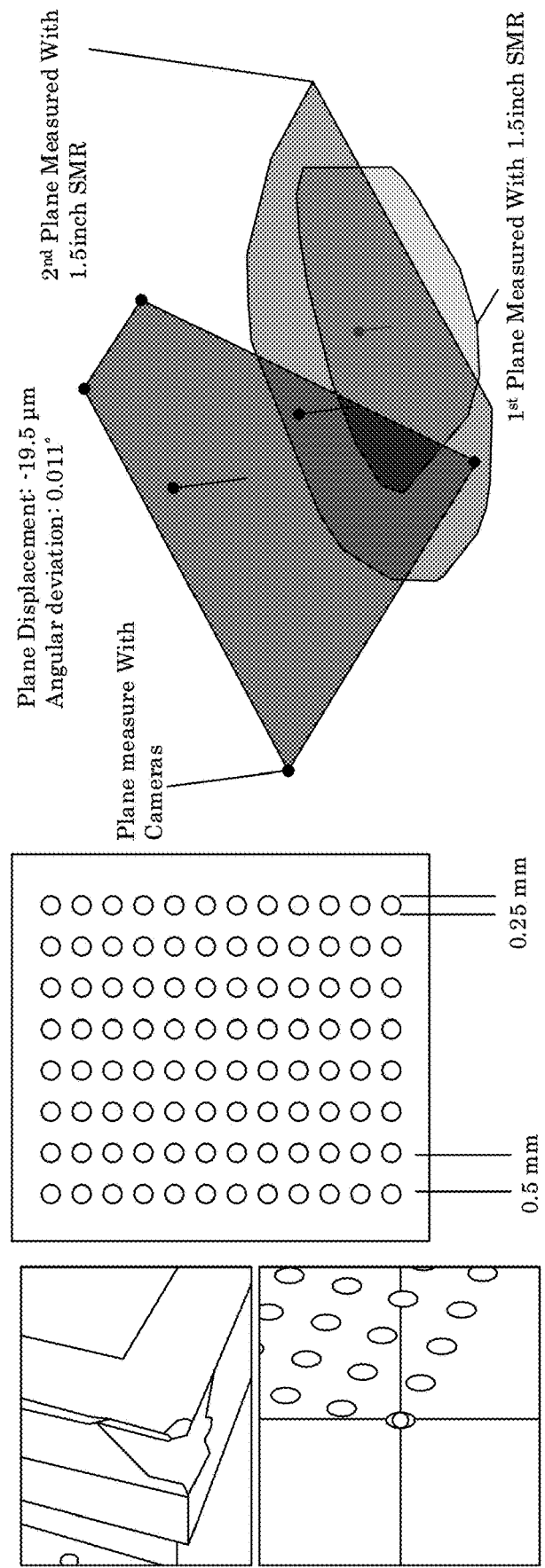
FIG. 30 shows a grid test setup.

A validation measurement was performed to compare the performance of the NMP to a standard 1.5" SMR. A glass 2"×2" plate camera test target grid made of 250-µm-diameter electron-beam-etched chrome dots spaced by 500 µm was used. Since the grid dots are only a few hundred nanometers out of the plane of the glass, the dots were not distinguishable from the plane of the glass using a LT. This allowed for a comparison measurement of the plane of the test target to be made between the SMR and NMP. The dots provided repeatable fiducials for the NMP to measure in the plane of the grid. While the optically flat glass substrate provided a repeatable surface for the SMR to measure. A spatial scan was performed as the SMR was moved along the surface of the glass grid. The NMP was used to measure several dots in the grid. Planes were then fitted to the individual data sets and the displacement and angular deviation of the normal were compared. Two SMR planes were measured and compared to the plane determined by the NMP. This is shown in FIG. 30. The rms fit statistics for the NMP plane was, 0.0021 mm, and the two SMR measured planes 0.0038 mm and 0.0039 mm respectively. This yielded a mean plane offset between the NMP measured plane and SMR measured planes of 19.5 µm, which is in the laser tracker uncertainty. The angular deviation determined was 0.11°.

FIG. 30 shows a grid test target that included a square grid of 0.25 mm diameter chrome dots spaced by 0.5 mm. Full field and zoomed in images of the test target as seen in the NMP images are also shown. In the lower left reference member is located at the blue dot at the intersection of the red cross hairs. FIG. 30 (right panel) shows a visual comparison of planes determined from fits to data from the NMP (blue plane) and the 1" SMR (Red and Green Planes) measurements. A mean plane displacement of 19.5 and mean angular deviation of 0.11° was determined.

Example 5. Measuring Millimeter-Wave Antenna Apertures

Figure 31:
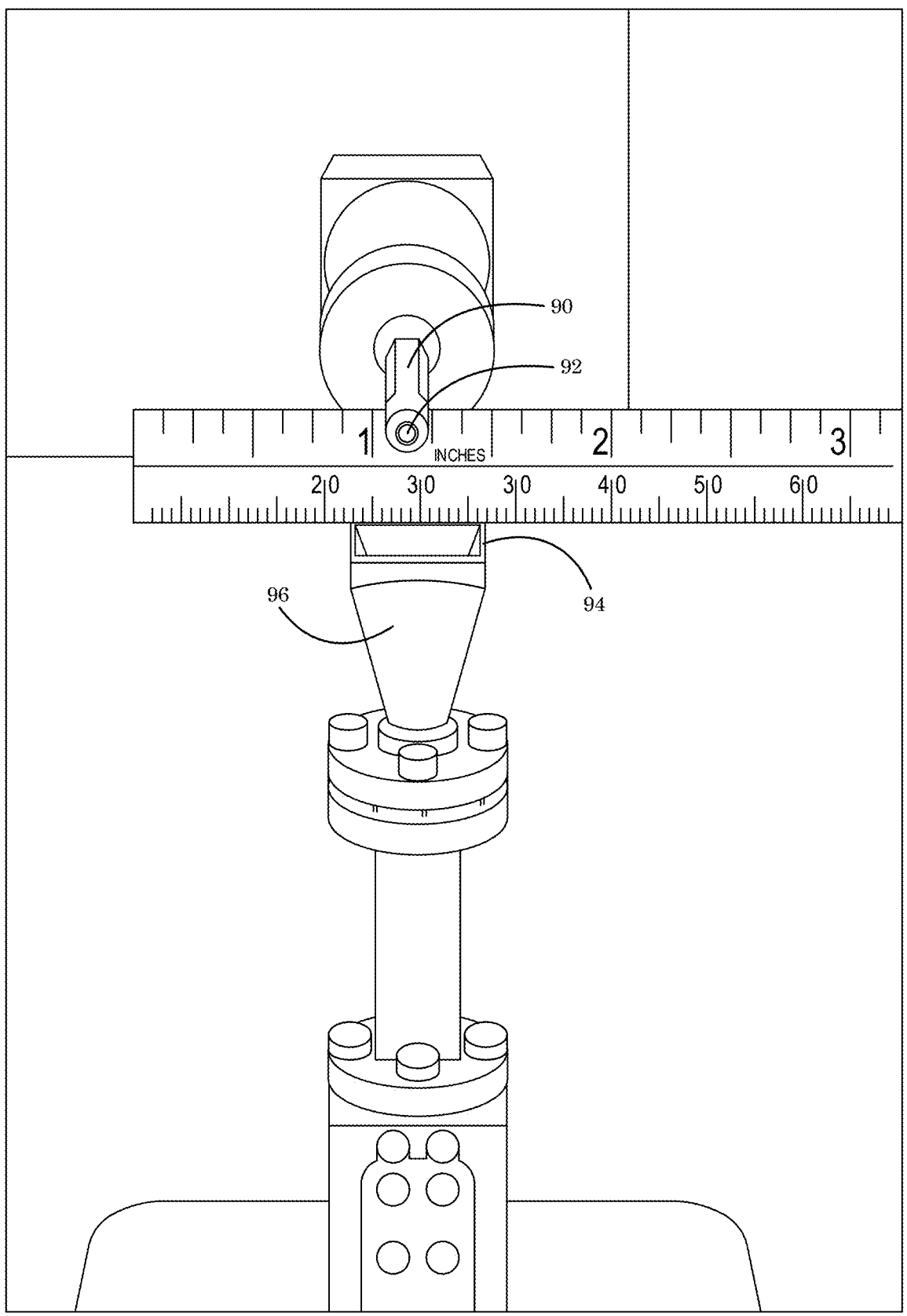
FIG. 31 shows a photograph of object members.

A circular probe antenna and a pyramidal horn antenna with a rectangular opening were measured. These antennas are shown in FIG. 31. The manufacturer specified dimensions for the circular aperture is 1.5 mm diameter and 12.55 mm×9.58 mm for the rectangular aperture. Both of these antennas are gold plated, are defined by sharp edges and quite delicate. For the purposes of antenna metrology, it is important to define a coordinate frame for these antennas based on the plane, center, and orientation of the aperture using an LT. These antennas are typically fixed to a mechanical positioner and tracked with an LT. Therefore, it is also important to know the antenna frame relative to the other LT targets that are used to track the positioner. Recent advances in antenna scanning systems use these antennas as the end effector tool of a robot arm[8]. Having a way to teach the robot the location of the antenna frame (i.e. tool tip frame) was one of the motivating factors in developing the NMP. As these antennas are much smaller than an SMR, and too delicate to touch, and require alignment accuracy of better than 50 m, currently available methods for tool tip calibration were not suitable. The NMP not only allowed for tool tip calibration through the native robot controller routines, but also allowed for directly measuring the offset between the antenna aperture frame (i.e. tool tip) and a six-degree-of-freedom target or set of SMRs fixed on the robot.

FIG. 31 shows a circular probe antenna with nominal aperture radius of 1.5 mm and pyramidal horn antenna with rectangular aperture of nominal dimensions 12.55 mm×9.58 mm.

Figure 32:
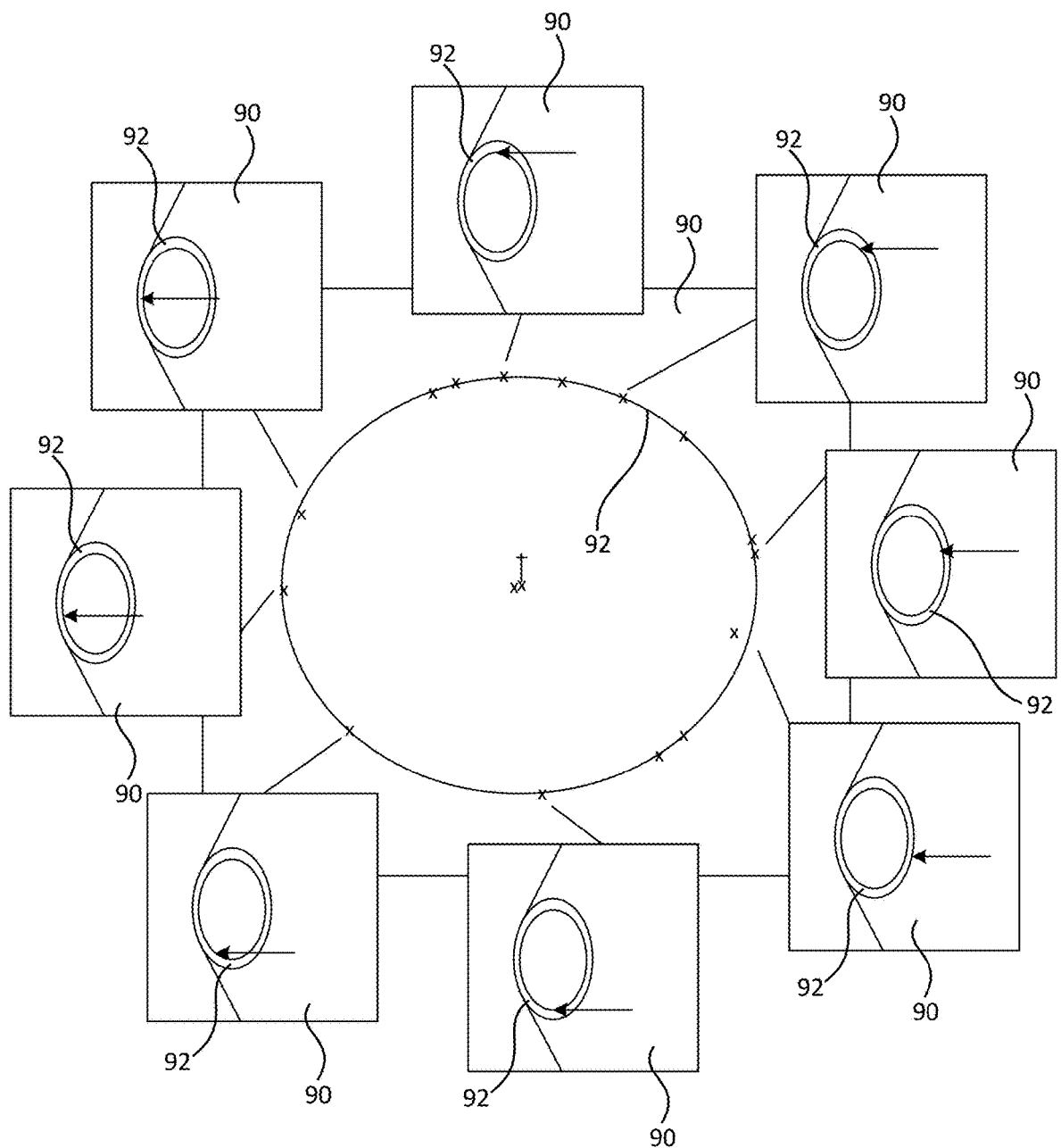
FIG. 32 shows images of an object member.
Figure 34:
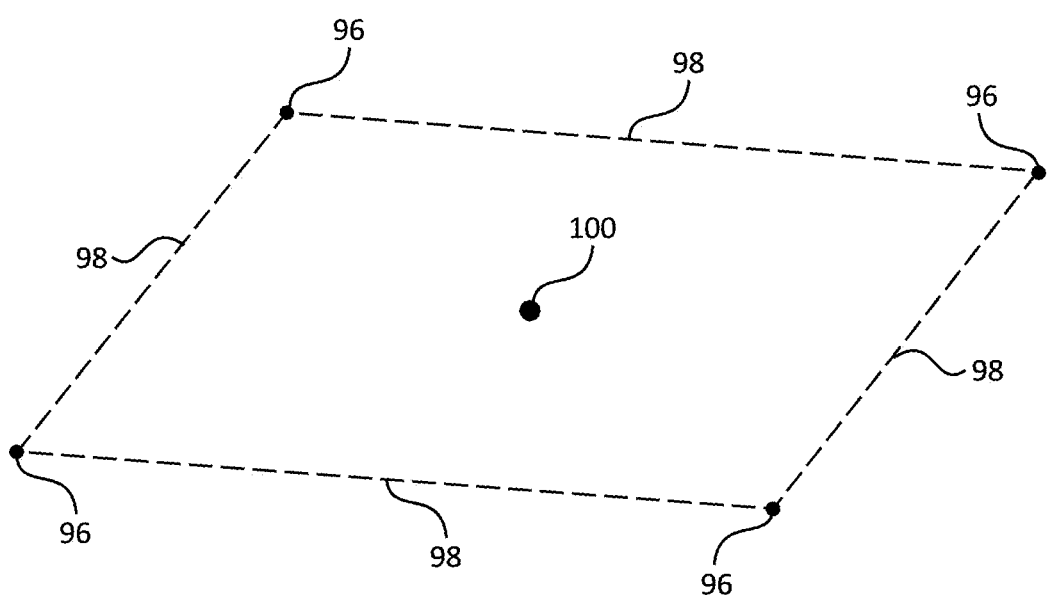
FIG. 34 shows locations of corners, edges, and center of the object member shown in FIG. 33

The NMP was used to trace out the edges of these antenna apertures. Geometries were then fitted to determine the center, plane, and orientation of each antenna aperture. FIG. 32 and FIG. 34 show the NMP measurements and the fitted geometry for the circular probe and pyramidal horn respectively. The circular aperture of the probe antenna was measured at 15 locations around the perimeter. These data were then fitted to a circle to determine the plane and diameter of the aperture. The circle fitting resulted in a diameter of 1.486 mm with an rms fit error of 22 µm. This is consistent with the manufacturer specifications of a 1.5 mm diameter aperture. The center and plane of this circle were used to define the coordinate frame of the probe antenna. The orientation of this frame in the plane of the circle was left arbitrary until an electrical alignment referenced to the plane of electric-field polarization to the test antenna was later performed.

The four corners of the pyramidal horn aperture were measured to determine the aperture dimensions. A rectangle was then fitted to these corners. A coordinate frame for the aperture was then defined in the plane of the rectangle and clocked to the short end of the rectangle. FIG. 34 shows the measurement of the four corners and the resulting coordinate frame. The dimensions of the rectangular aperture determined from these measurements was 12.65 mm×9.68 mm×12.63 mm×9.68 mm with a fit error of ≈20 µm, which is in good agreement with the manufacturer specifications of 12.55 mm×9.58 mm.

FIG. 32 shows, in the center of figure, the circle that was fitted to measurements made with the NMP around the perimeter of the antenna aperture. Data points lie along this fitted circle. At each measurement location, an inset photo of the aperture as seen with the NMP is shown. In each inset, photo an arrow points to locations on the aperture where the NMP obtained measurements. FIG. 31 shows a photo of the circular probe antenna. A ruler is also shown for scale. The diameter of this antenna aperture determined from the NMP measurements was 1.486 mm with an rms fit error of 22 μm.

Figure 33:
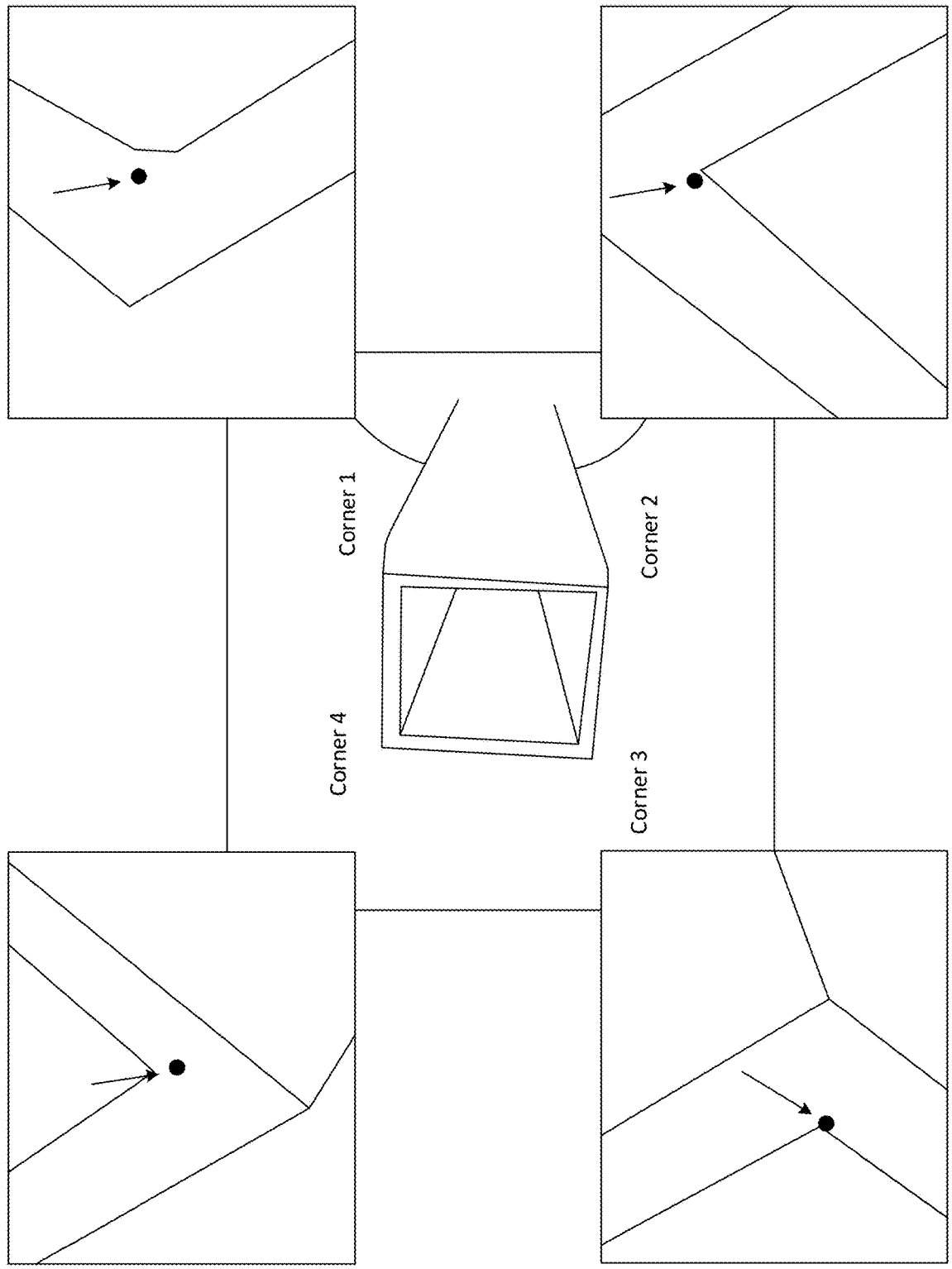
FIG. 33 shows images of an object member.

FIG. 33 shows corners of the pyramidal horn antenna measured with the NMP. Arrows point to dots, which provide the locations at which the corners 1,2,3,4 were measured. FIG. 34 shows a coordinate frame generated using these corners. The dimensions of aperture were determined to be 12.65 mm×9.68 mm×12.63 mm×9.68 mm with a fit error of ≈20 μm.

Example 6. Measuring Transparent and Soft Objects with the NMP

The imaging and non-contact measuring capability of the NMP provided for soft material to be measured with the NMP without deforming the object. Furthermore, the imagining capability allowed for objects constructed of weak albedo (low optically reflecting) material to be measured. We demonstrated this by measuring two objects with these attributes. First, measurements to determine the shrink ratio of clear Heat Shrink® (commercially available form of material with biaxial asymmetric coefficient of thermal expansion) before and after shrinkage were made. Second, the geometry of a man-made spider web constructed from strands of clear epoxy was measured. This spider web is an extreme case of an object with these attributes and that is not easily measured with a LT, but that can be routinely measured with the NMP.

Figure 35:
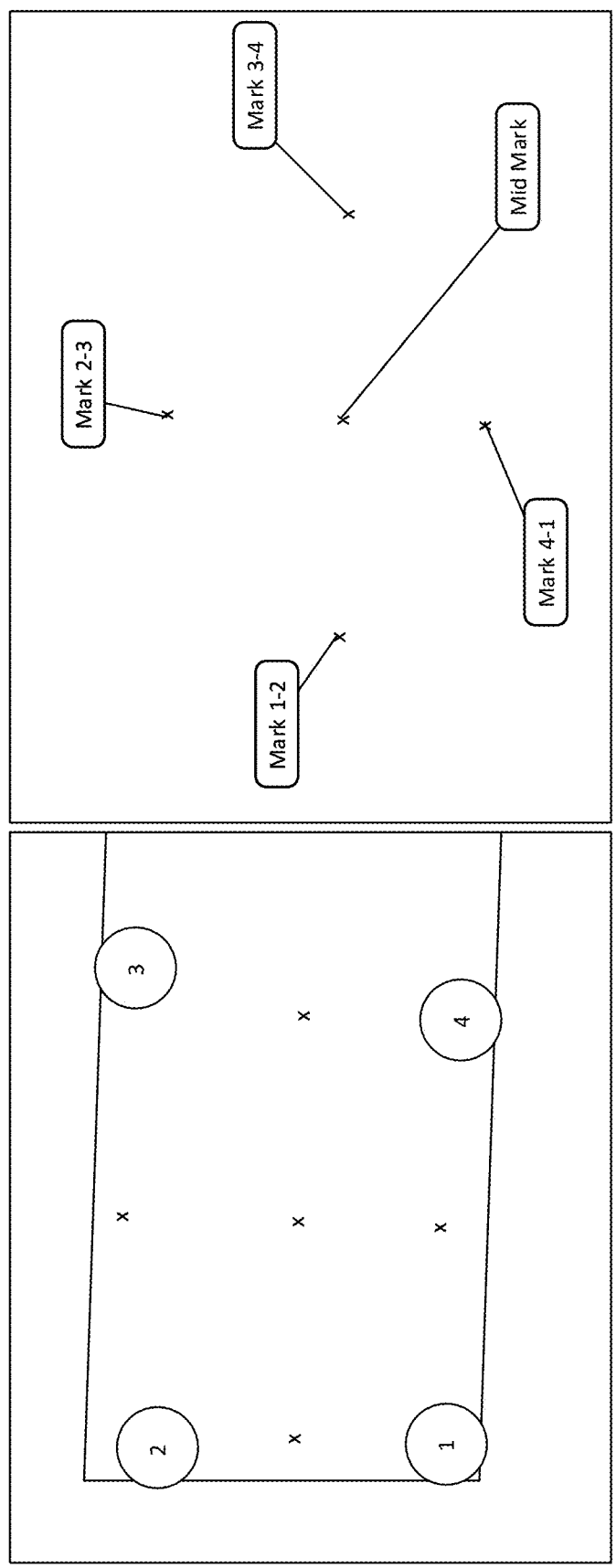
FIG. 35 shows a photograph of an object member and marks on the object member.

The shrink ratio of the material we used was 2:1 such that it should shrink twice as its original size. However, Heat Shrink® is anisotropic in its shrinking behavior, such that it is designed to shrink only in one direction according to the specified shrink ratio, and not shrink in the orthogonal direction. A tube of Heat Shrink® was cut lengthwise to form a rectangle and fixed to a foam board with thumbtacks. Prior to shrinking a permanent marker was used to mark the Heat Shrink® along the direction of least shrinkage and most shrinkage. FIG. 35 (left) shows the Heat Shrink® fixed to the foam board with thumbtacks prior to shrinking. The thumbtacks were numbered 1 through 4 to avoid accidental confusion with the orientation of Heat Shrink® during measurement. FIG. 35 (right) shows the measured marks with the NMP prior to shrinking. They are labeled Mark 1-2, 2-3, 3-4, 4-1 and Mid Mark for the thumbtacks they lie between. Because the Heat Shrink® was meant for use as wire sheathing the non-shrinking direction was taken as along the direction of the tube prior to cutting. Using the NMP the separation between marks 2-3 and the mid mark and, 3-4 and the mid mark was measured to be 18.74 mm and 21.77 mm respectively. After shrinking the separation of these marks measured to be 6.89 mm and 22.67 mm. This gave a shrink ratio in the two directions of 2.77 and 0.96. This shows anisotropic shrinkage a bit larger than a 2:1 ratio. As a heat gun was used to shrink the material, the temperature applied was not as controlled as may be required by the manufacturer. This may be the biggest reason for the discrepancy between in the measured shrink ratio to the specified one.

FIG. 35 shows a piece of clear Heat Shrink® fixed to foam board with thumbtacks. Marks were used to determine shrink ratio are shown. Numbered thumbtacks were visible. The right panel of FIG. 35 shows NMP spatial data for the Heat Shrink®.

Figure 36:
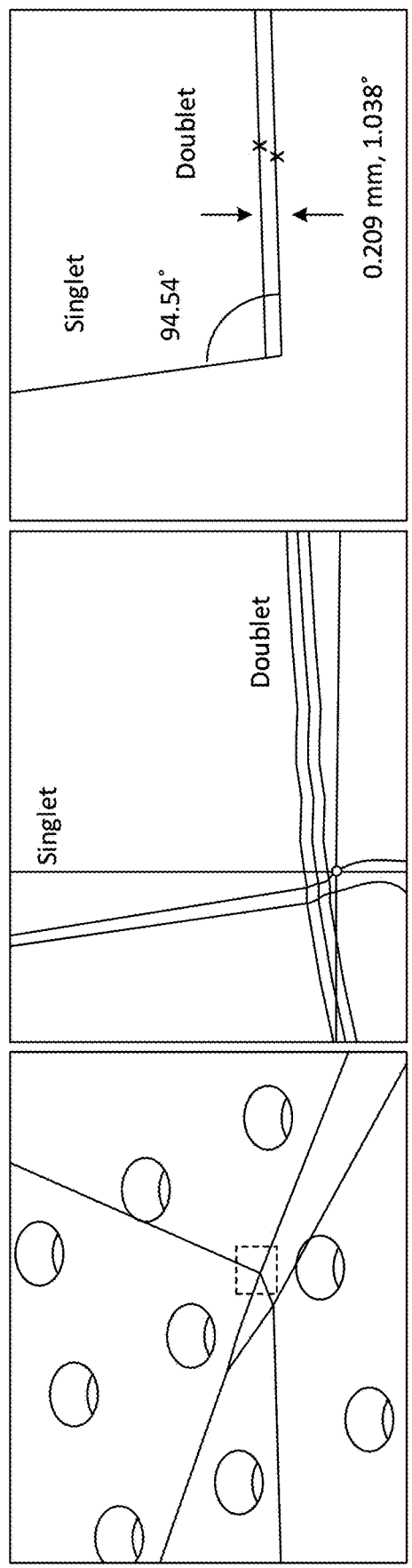
FIG. 36 shows images of an object member.

FIG. 36 shows (left panel) a photograph of the spider web made from stands of clear epoxy. ¼-20 holes on 1" centers in the optics breadboard supporting the web are also visible in the background. Within the dotted box lies the junction of web strands that were measured with the NMP. The middle panel of FIG. 35 shows a close-up image through the NMP of the web strands. Cross hairs mark the location of the reference member pixel. Singlet and doublet strands were identified to be measured. The right panel of FIG. 35 shows a spatial data plot for the geometry of the singlet and doublet strands.

The spider web was supported by metal posts screwed to a small optical breadboard that had ¼-20 tapped holes on 1" centers. The web was measured at several locations along strands and at the points of strand intersection. The dotted box in FIG. 36 (left) shows the region of the web measured using the NMP. FIG. 36 (center) shows the close-up view through the NMP. The intersection of the red crosshairs marked the location of the reference member pixel. A singlet and doublet set of strands were identified to be measured. From these data the geometry of the spider web was determined, and the separation of the members of the doublet was determined as well as the angle made between the singlet and doublet. The angle between individual doublet members was determined to be 1.038° with a mean separation distance of 0.209 mm. The mean angle between the singlet and doublet was determined to be 94.54°. This is shown in the right panel of FIG. 36.

Example 7. Linking Machine Vision Derived Geometries to a Laser Tracker

Figure 37:
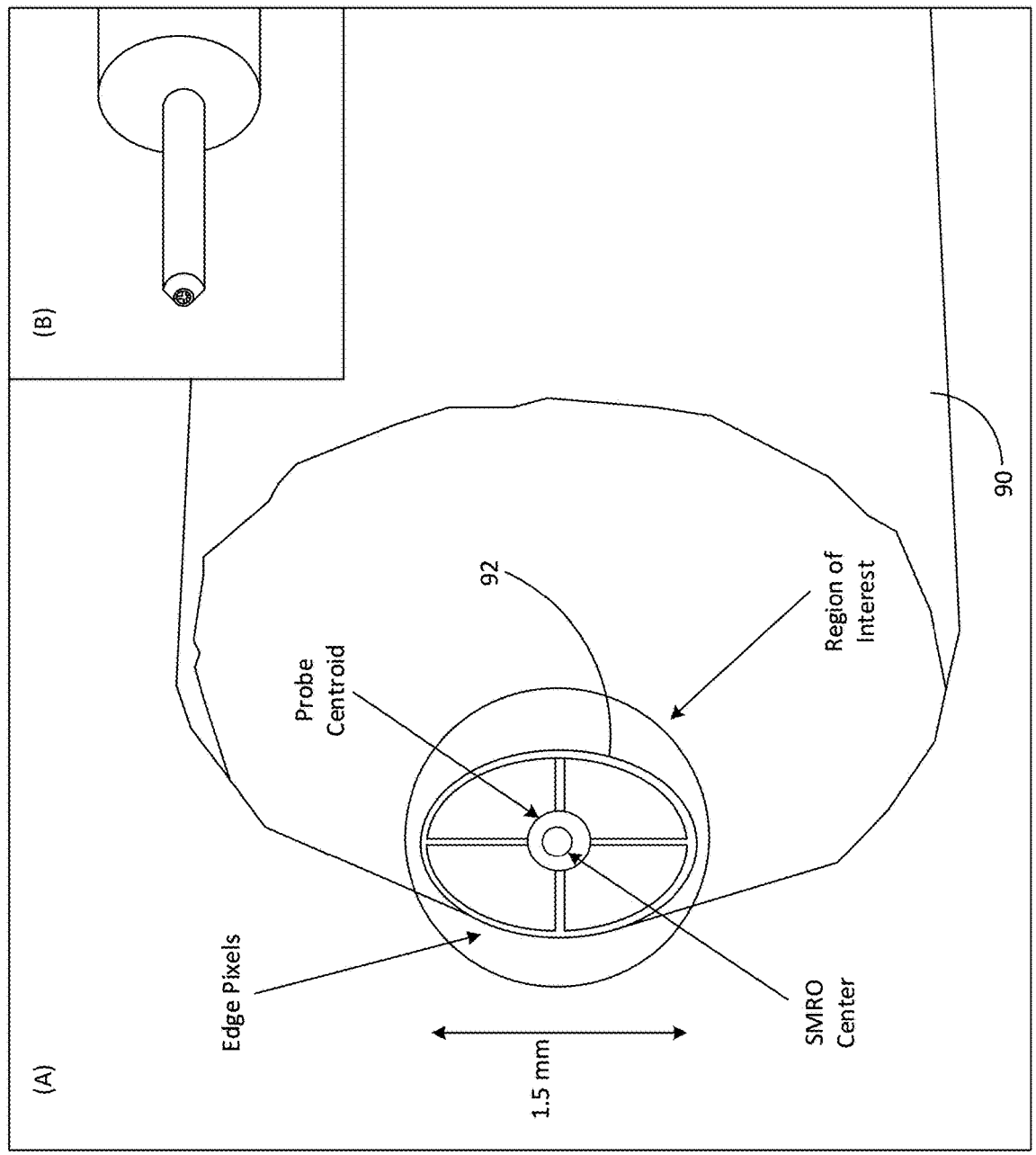
FIG. 37 shows images of an object member.
Figure 38:
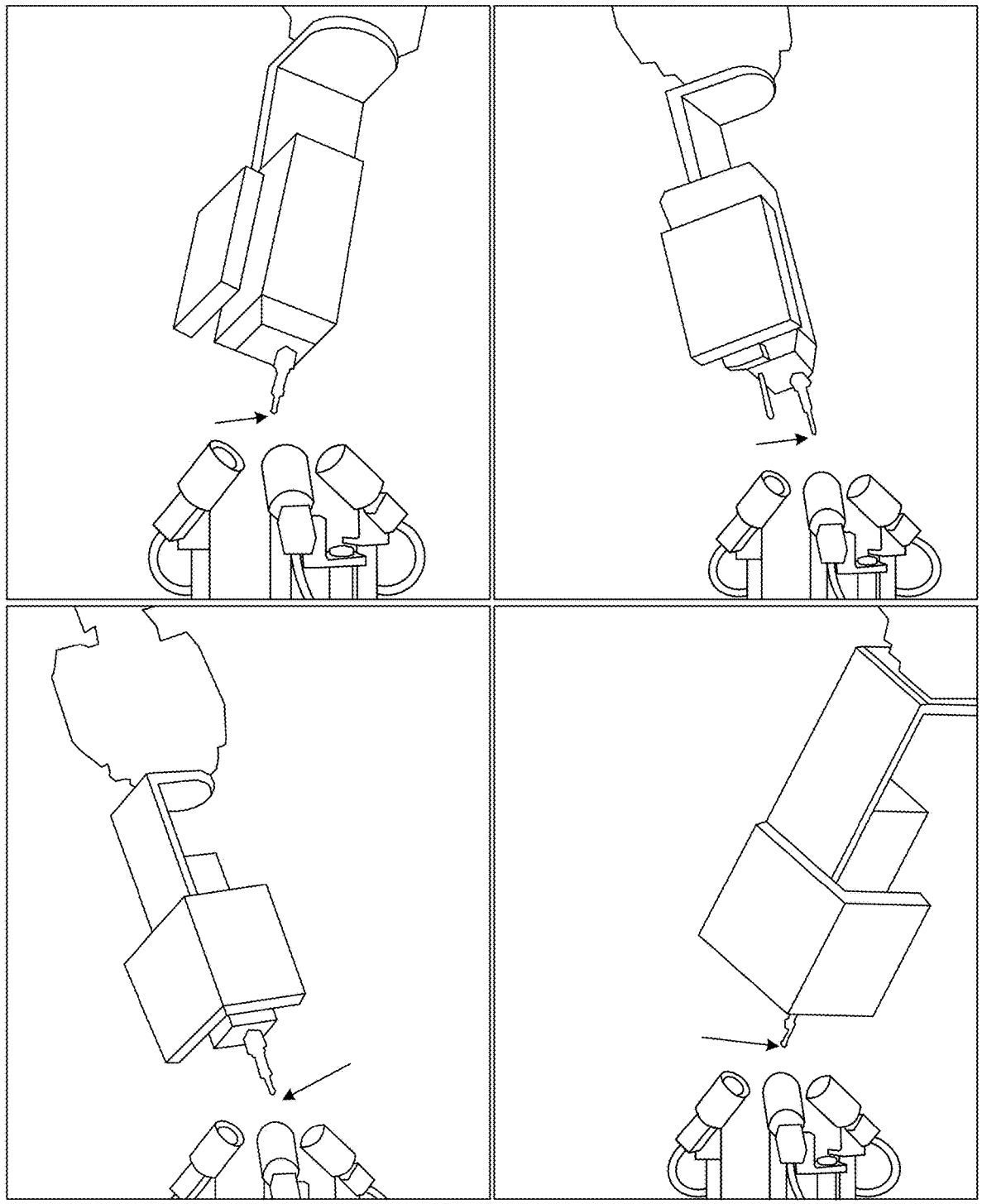
FIG. 38 shows photographs of a noncontact metrology probe and object member.

Using the NMP, geometries that are derived from machine vision were directly linked to the LT. An example of this is given for the circular antenna probe aperture in FIG. 37. In FIG. 37, a region of interest (ROI) was defined in the images of the NMP around the circular aperture. An edge detection algorithm was then applied within the ROI to find the edge of the aperture. An ellipse-fitting algorithm was then used to find the center of the aperture. Once the ellipse center was determined, the reference member point in the NMP image was then placed at the same location as the ellipse centroid. At this moment, the centroid of the ellipse was now linked to the LT. FIG. 37 shows one image from the NMP depicting this process. The ROI is shown as the green boarder. The red boarder is made of highlighted pixels that were determined from the edge detection algorithm. These pixels define the edge of the aperture and were used to fit the ellipse. The red cross hairs are the major and minor axis of the ellipse. The yellow circle is the fitted ellipse centroid. The blue circle is the location of reference member from the NMP. When the blue circle and yellow circle overlap in the NMP images then the location of reference member and the centroid of the ellipse were in the same location in space. At this moment, the ellipse centroid became linked to the LT. Furthermore, the error in the alignment between the yellow and blue circles was determined in real-time from calculating the pixel offset from the center of each circle. Although we have not deliberately calibrated how this pixel offset error translates into X,Y,Z errors in the LT frame, we envision a volumetric calibration could be performed to provide X,Y,Z tacking of alignment errors and is the topic of future work. This would allow direct tracking of errors between the NMP reference member point and machine vision derived geometries. An application of this technique is for non-contact robot TCP calibration. This technique was used at the NIST Configurable Robotic Millimeter-Wave Antenna (CROMMA) Facility[7] to teach the robot arm the location of the center of the circular probe antenna aperture end effector. The robot arm was driven to five different poses, such that for all poses the TCP remained at the same point in space. This point in space was defined using the reference member point of the NMP. For each pose of the robot arm, the center of the circular probe aperture was determined using the edge detection and ellipse fitting algorithms just described. The robot was driven such that the center (yellow circle) of the fitted ellipse was aligned to the reference member point (blue circle) in the NMP just as is shown in FIG. 37. FIG. 38 shows the robot arm of the CROMMA in four of the five robot poses used to teach the robot controller the TCP location.

FIG. 37a shows a close-up image of circular probe antenna, and FIG. 37b shows a full field view. Edge detected pixels, circular probe centroid, reference member center, and region of interest are shown.

FIG. 38 shows the robotic arm in the CROMMA facility. The NMP was mounted to a tripod while the robot arm was driven to the four poses FIG. 38(a)-(d) used for the TCP teach process. The circular probe antenna was the robot end effector. Only four poses are shown for brevity. White arrows point to the end of the antenna that was co-located with the reference member point of the NMP during the TCP calibration process.

Example 8. Non-Contact Coordinate Measuring Machine Based on an Invisible-Stylus Coordinate Measurement System Via Scaled Orthographic Projection An invisible stylus from which a non-contact 3-D coordinated measuring system referred to a non-contact coordinate measuring machine is described. This invisible stylus, referred to a noncontact metrology probe or pixel probe, is made through orthographic projection of a spherical mounted reflector (SMR) through a trifocal camera system. Through this, a single point in space that is linked to a laser tracker world frame is mapped to a unique set of pixel coordinates in the trifocal camera creating the pixel probe. The system is constructed through the union of a pixel probe, a laser tracker, and calibrated XYZ stage, and does not require contact to obtain a measurement. In the configuration, system resolution and accuracy better than 20 µm is demonstrated on objects in the meso/micro scale that are well below the range of a laser tracker alone. A simple single-point coincidence condition allows the user to specify a measurement coordinate by pointing-and-clicking in the images captured by the pixel probe.

Coordinate measurement systems (CMS) include facility type coordinate measuring machines (CMM) and portable systems. The range of capability of these systems can be extended through the probes including touch trigger probes and tactile probes. Some conventional systems have weaknesses, limitations, and uncertainties associated with the way in which they capture and measure a coordinate. The non-contact coordinate measuring machine improves a metrological ability to make measurements.

Certain contact and non-contact probes sense coordinates in 3-D. Contact stylus-based probes provide a method for measuring coordinates and range from millimeter sized ball types as in touch-trigger probes to micron-sized tactile optical fibers. Contact based systems can provide measurements to establish traceability at national metrology institutes. However, conventional systems are less suited for measuring larger surfaces and may not be portable. Non-contact methods such as photogrammetry, laser line scanners, structured light, and laser radar capture data over large surfaces but may not be suited for measuring micro- or meso-scaled objects nor be as accurate or repeatable as contact-based methods. Furthermore, some systems such as laser trackers and photogrammetry can be optimized to measure specifically designed targets such as the spherical-mounted reflector (SMR) (as for a laser tracker) and point targets (as for photogrammetry) rather than make direct coordinate measurements on objects.

Different types of CMS are described that do not include contact and also leverages optical and machine vision elements in an absence of a photogrammetry system. This system in essence produces an invisible stylus non-contact probe from which a CMS is constructed by uniting it with a portable laser tracker and calibrated XYZ stage. The laser tracker determines the probe location in 3-D and the XYZ stage allows a user to target and position the probe on a coordinate to be measured. Because this CMS works with a laser tracker, measurements live in the world coordinate system W of the laser tracker and can be linked to other laser tracker measurements, bridging portable and non-portable metrology.

Figure 39:
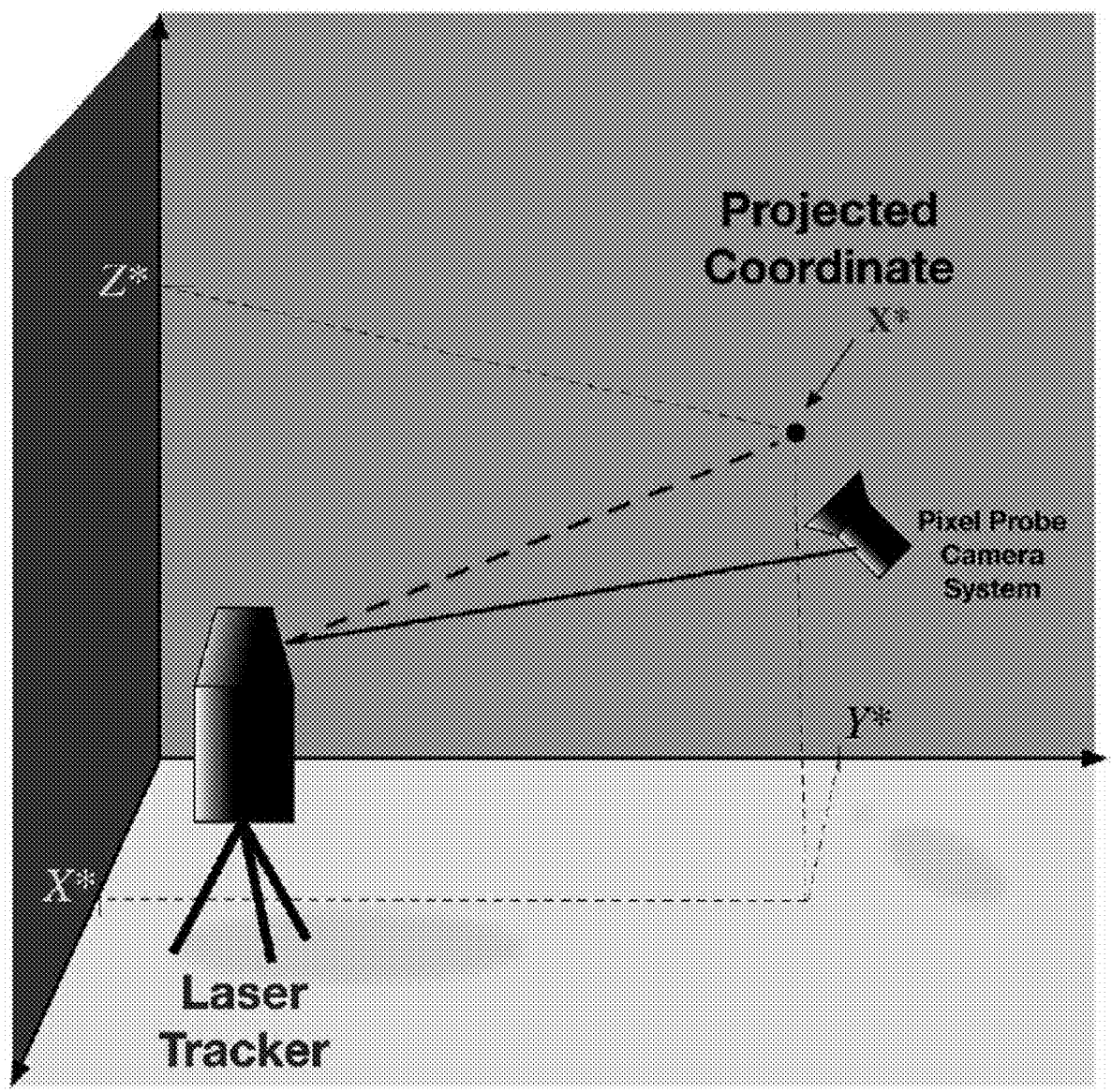
FIG. 39 shows a pixel probe in which a laser tracker measures the cameras, and the solid line represents the measurement laser beam. The cameras project a set of pixels to coordinate $X^* = [X^*, Y^*, Z^*]^T$. The laser tracker sees a measurement at X* (represented by the dotted line) in world coordinate system W.

A pixel probe can include calibrated cameras that project a set of image coordinates to a single point in space $X^*$. A location of $X^*$ is tracked in the world frame W of a coordinate measurement system such as a laser tracker. One can imagine a pixel floating in space that is tracked by a laser tracker or similar system. The 2-D image coordinate $x_{img} = [x_{img}, y_{img}]^T$ this pixel appears at in the camera system has a direct correspondence to only one 3-D coordinate $X^* = [X^*, Y^*, Z^*]^T$ in W. See drawing in FIG. 39.

As opposed to stereo vision or multi-view photogrammetry systems where full frame images are correlated to reconstruct coordinate measurements across a field of view, only the single point $X^*$ is used. Furthermore, the camera system does not form a 2-D or 3-D reconstruction of a scene, nor does it track any targets as is common in photogrammetry. As such, although cameras are used, the pixel probe does not function as a photogrammetry system and is distinctly different. Rather it provides a direct and repeatable measurement at a single 3-D coordinate.

The point $X^*$ acts as an invisible stylus so that non-contact measurements can be made at a specific and repeatable location with a laser tracker to approximately the resolution of a single pixel (which is on the order of microns). This is about 104 smaller than a typical SMR (38.1 mm diameter) laser tracker target and about 103 smaller than the width of the laser beam used by the laser tracker. The Pixel probe in comparison has a much smaller spatial scale than an SMR and therefore extends the size range of objects that can be measured with a laser tracker alone, down to the meso/microscale (approx. 50 mm-to-1 µm) below the typical macroscale/meso (approx. >1 m-to-50 mm) of a laser tracker.

Figure 40:
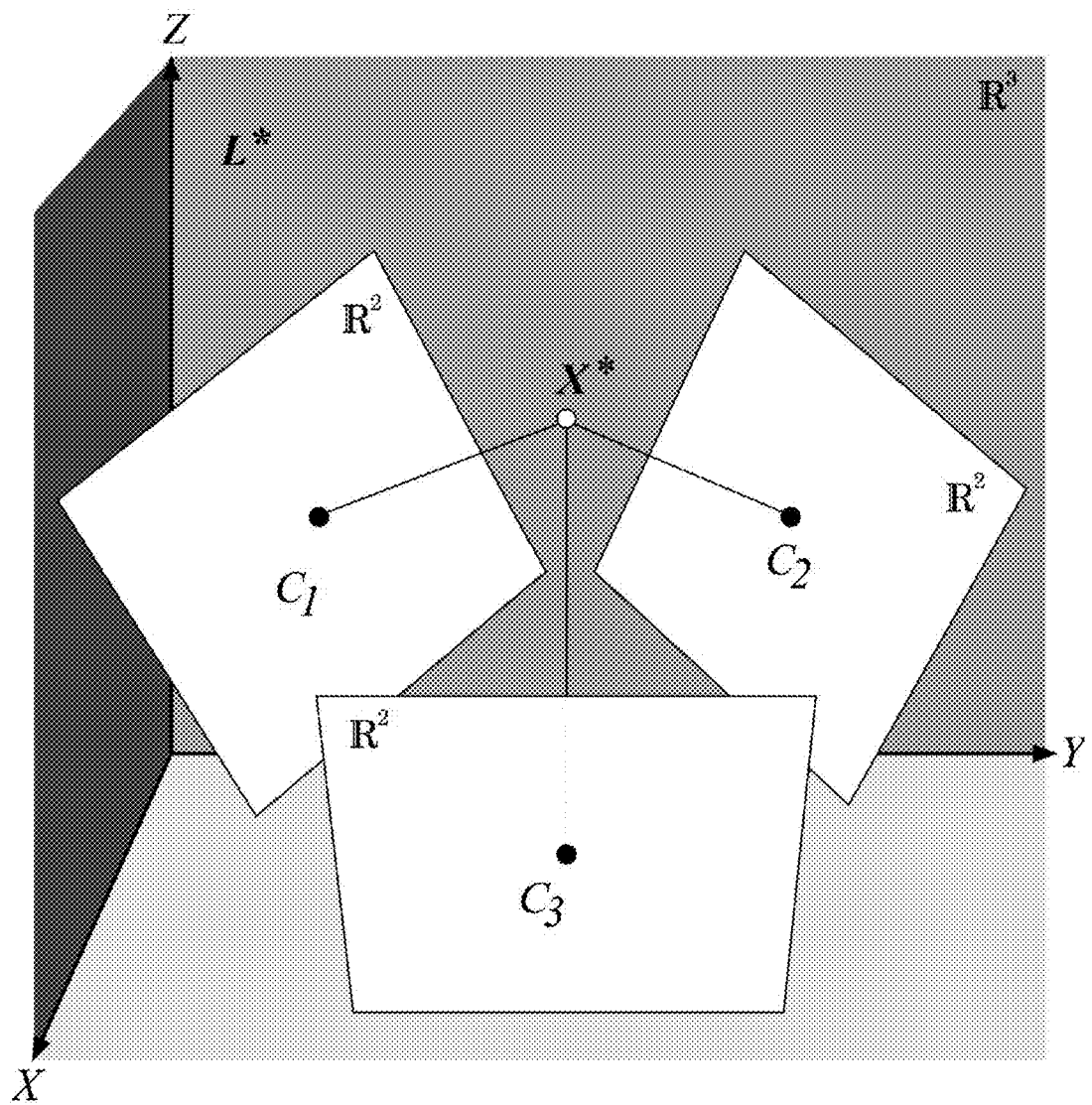
FIG. 40 shows an imager, wherein three cameras have centers C1, C2, and C3 that are arranged in a tetrahedral configuration having fixed poses in local coordinate system L*. Camera image planes include IR2, and L*, and IR3 so that the three image axes intersect at point X*.

Given a laser tracker whose native coordinate system is defined as the world frame W, the first step in realizing the pixel probe is to establish a local coordinate system L* within W that is measurable by the laser tracker. All measurements ultimately reside in W which defines the coordinate metrology space of the PiCMS. Both Wand L* define 3-D space (IR3). Within L* resides a fixed camera system which projects a set of 2-D (image space) coordinates from IR2 onto one (object space) IR3 coordinate $X^* = [X^*, Y^*, Z^*]^T$. Here, a trifocal imager is used for the camera system and includes three cameras constructed from three imaging lenses paired with three imaging arrays (i.e., CMOS, CCD). Cameras are represented using the pinhole model. The three cameras are nominally arranged in a tetrahedral configuration with the optical axis of each camera coincident with a side of the tetrahedral so that all three optical axes nominally intersect at the vertex and the field of view of each camera overlap as shown in FIG. 40.

This configuration is chosen in order to minimize ambiguity when projecting points from each camera in IR2 back to a single point in IR3 within L*. Each camera is specified by an intrinsic coordinate system with origins at camera centers C1, C2, and C3, respectively all which reside in L*. The action of the jth camera, is a mapping between points X in IR3, to points $x_j$ in IR2 at the image plane of camera Cj. The mapping represented by the 3×4 camera projection matrix $[P_j]$, is $$x_j = [P_j]X \tag{1}$$

with, $$[P_j] = [K_j][R_j|t] \tag{2}$$

where $[K_j]$ is the camera calibration matrix containing the focal length and image distortion coefficients. $[R_j]$ is the 3×3 rotation matrix and tj the translation vector from the origin of a reference coordinate system. Together $[R_j]$ and $t_j$ describe the pose of camera Cj. The $[P_j]$'s are the basic building blocks from which the Pixel probe and PiCMS are developed.

Two levels of calibration for the pixel probe are camera calibration, and pixel probe calibration. An intrinsic calibration method is used to determine the camera distortion through $[K_j]$ for each camera. For the remainder of this Example, assume $[K_j]$ are known and the cameras are intrinsically calibrated.

Figure 41:
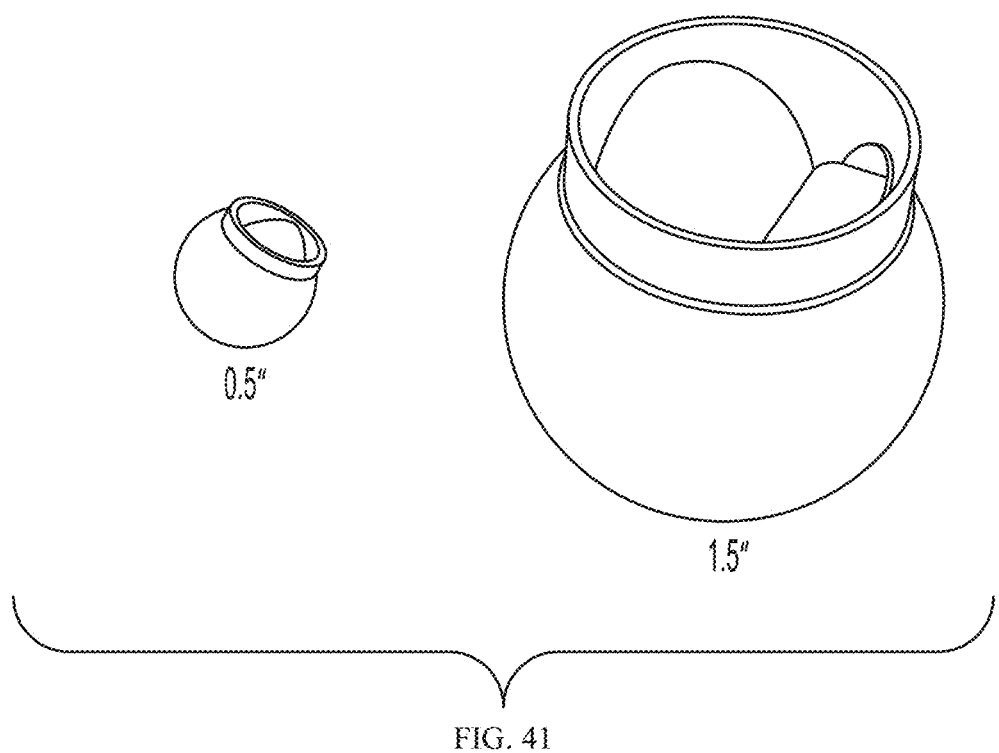
FIG. 41 shows spherically-mounted-reflector (SMR) laser tracker targets.

The second calibration is used to define the pixel probe and provides a means to realize the point X* in such a way that it can be tracked and measured with a laser tracker thus creating the invisible stylus. This is achieved through the scaled orthographic projection of an SMR laser tracker target. Laser tracker target SMRs (see FIG. 41) are constructed from a hollow corner cube reflector made from three orthogonal mirrors mounted in a hardened steel spherical housing. Such SMRs typically come in two sizes, 38.1 mm and 12.7 mm diameter and are referred to in English units as 1.5" and 0.5", respectively. Before moving on, the traits of laser tracker target SMRs are worth noting: 1) The spherical hardened steel housings have tolerances on sphericity routinely ≤3 μm, and 2) The offset between the center of the spherical housing and the center of the corner cube reflector it encases are routinely within ≤3 μm. Thus, by design, the geometrical center of an SMR is co-located with the coordinate measured with a laser tracker.

In calibrating the pixel probe, use these traits along with considering the image projection of the SMR through the cameras in the following scenario. An SMR is placed with its center nominally at the vertex of the trifocal imager so that it is near the optical axis of each camera and also several focal lengths away. The aperture of the SMR is pointed away from camera Cj so that only the solid steel back hemisphere of the SMR is viewed through the cameras. Focus is set on the center of the SMR. Given the size of the SMR, the assumed intrinsically calibrated camera (e.g. negligible distortion) and the distance the SMR is from the camera, the formation of the image of the SMR can be considered a weak perspective projection and thus treated as a scaled orthographic projection.

Under scaled orthographic projection the mapping of a point in IR3 to IR2 along the direction of the optical axis and perpendicular to the image plane is represented by the projection matrix, $$[P_{orth}] = \begin{bmatrix} S & 0 & 0 & 0 \\ 0 & S & 0 & 0 \\ 0 & 0 & 0 & 1 \end{bmatrix} \tag{3}$$

The result of this projection is that the Z-coordinate is stripped away for points on the SMR sphere $X_S = [X_S, Y_S, Z_S, 1]^T$, leaving the X and Y coordinates at the image plane scaled by a factor S that is governed by the camera magnification. So that, $X_S \to x_{orth} = [SX_S\ SY_S\ 1]^T$ via, $$\begin{bmatrix} SX_S \\ SY_S \\ 1 \end{bmatrix} = \begin{bmatrix} S & 0 & 0 & 0 \\ 0 & S & 0 & 0 \\ 0 & 0 & 0 & 1 \end{bmatrix} \begin{bmatrix} X_S \\ Y_S \\ Z_S \\ 1 \end{bmatrix} \tag{4}$$

Figure 42:
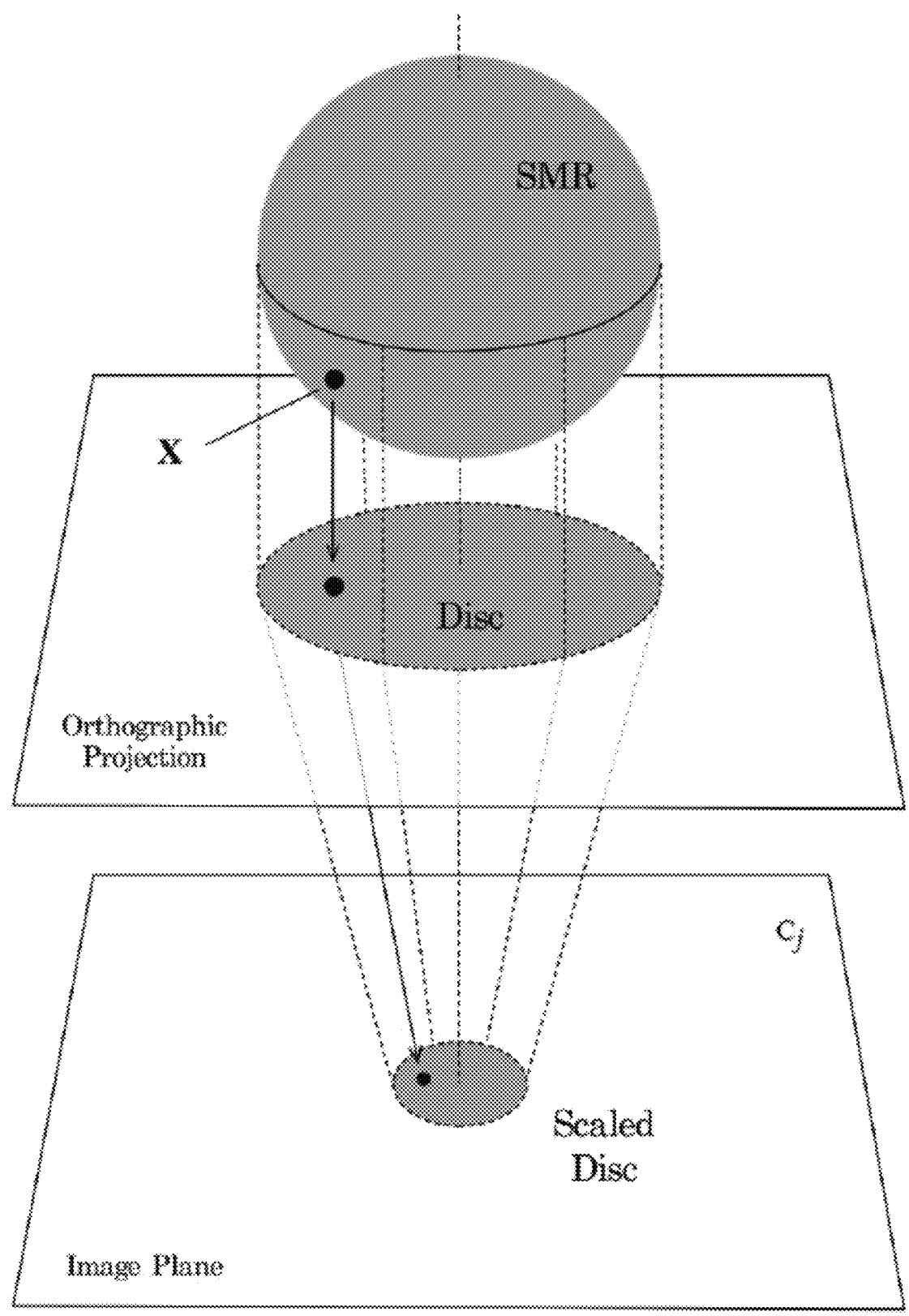
FIG. 42 shows a scaled orthographic projection of an SMR through camera Cj. The 3-D coordinates X (black dot) on the SMR sphere are mapped to a plane through orthographic projection creating a disc. Parallel dotted lines depict the mapping progression from 3-D to 2-D. The disc is scaled by the camera onto the image plane while preserving the 2-D coordinate relationships.

This projection can be thought of as a straight orthographic projection followed by a linear scaling onto the image plane of the camera. This is depicted in FIG. 42. The result is that the image of the three dimensional spherical SMR becomes that of a disc with a radius that of the SMR scaled by S. Although this may seem intuitive under visual perception, weak perspective projection through a camera system is in general not guaranteed and thus neither is representation as orthographic projection. As such, some amount of care must be taken to ensure the correct projection of the SMR is achieved by the camera system.

Figure 43:
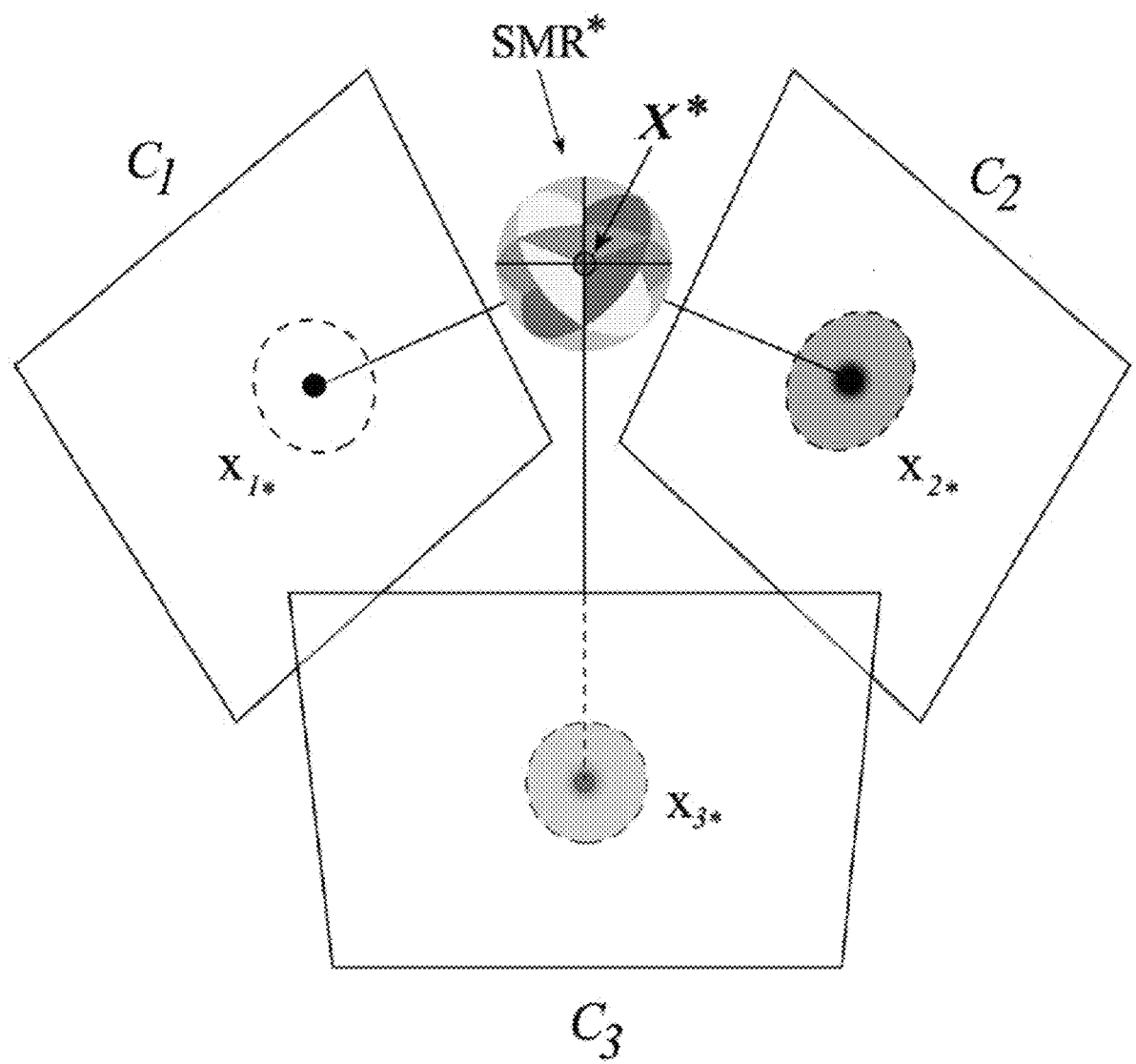
FIG. 43 shows a scaled orthographic projection of SMR* onto image planes of cameras C1, C2, and C3. Projected orthographic discs are represented as dotted outlines on each camera plane. Conjugate pairs of discs at the image planes and cross-sectional planes at SMR* are shown for each camera. Disc centroid coordinates $x_{1*}$, $x_{2*}$, and $x_{3*}$ conjugate to X* are included as features of a pixel probe.

The projection of the disc at the image plane is conjugate to the cross-sectional plane of the SMR that passes through its center. Including the projections from all three cameras results in three planes intersecting at the center of the SMR (see FIG. 43). Furthermore, the centroids of the three orthographic discs defined as $x_{1*}$, $x_{2*}$, $x_{3*}$ for cameras C1, C2, C3 respectively are conjugate to the center coordinate X* of the SMR in IR3. These centroids have unique coordinates in the pixel array of each camera (in general not necessarily at the center of a pixel), and define the Pixel probe.

$$x_{1*} = [x_{1*}, y_{1*}]^T, x_{2*} = [x_{2*}, y_{2*}]^T, x_{3*} = [x_{3*}, y_{3*}]^T \tag{5}$$

A bright field imaging scheme is used to isolate the orthographic disc and to actualize $x_{1*}$, $x_{2*}$, $x_{3*}$. For this, a 0.5" diameter SMR was placed at the vertex of the trifocal imager denoted SMR*, as in FIG. 43. This diameter SMR was found to work well with the field of view of typical machine vision cameras and lenses in the focal length range of 12 mm-35 mm. A conical kinematic magnetic nest mounted to a 0.5" diameter optical post was used to hold SMR* while also maximizing the observable perimeter of its silhouette in each camera.

Figure 44:
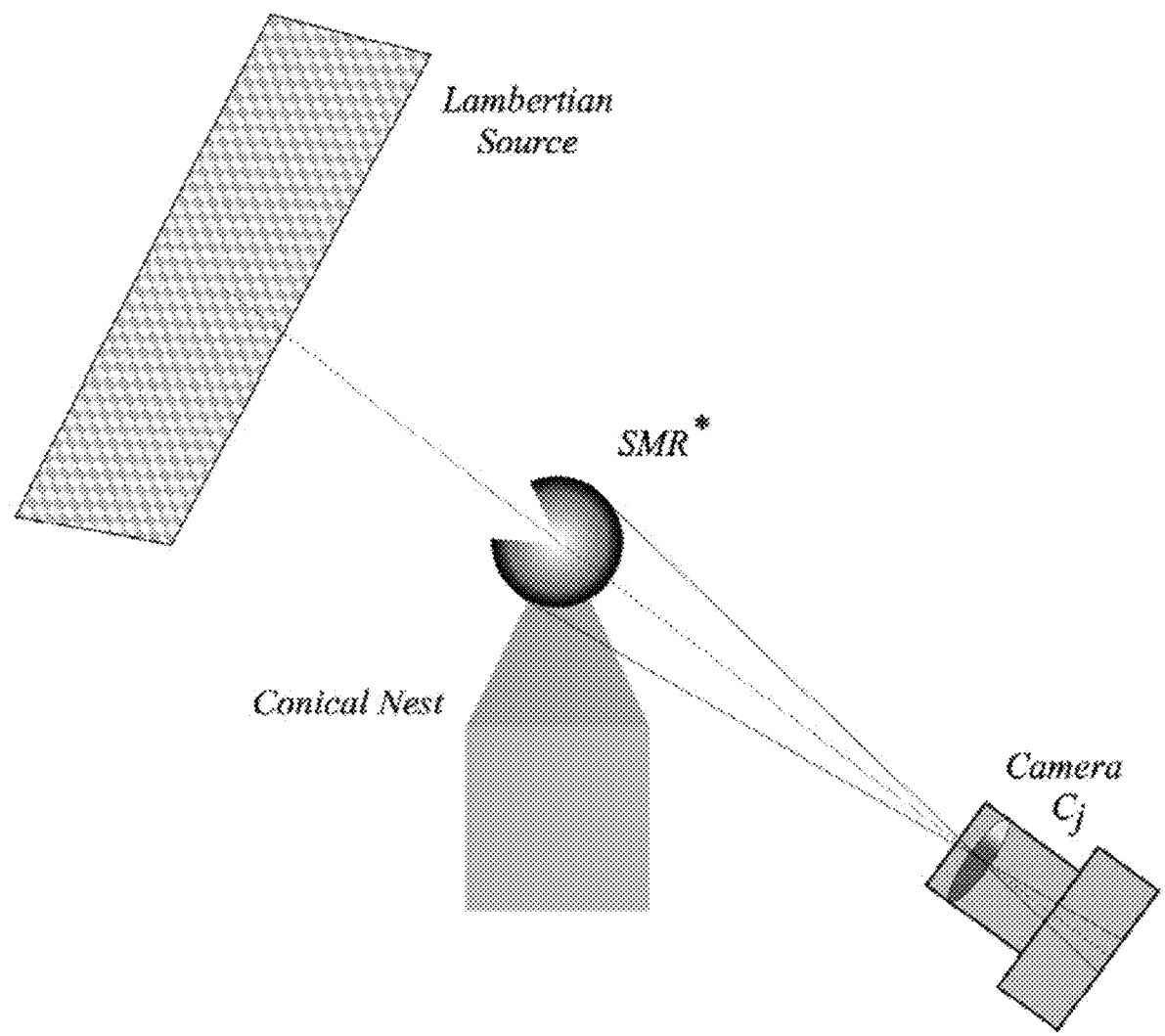
FIG. 44 shows a bright field illumination scheme used for calibrating a pixel probe. SMR* is held in the conical nest and illuminated diametrically opposite camera Cj by the Lambertian source. The aperture of the SMR is pointed away from the camera so only the spherical form is imaged.
Figure 45:
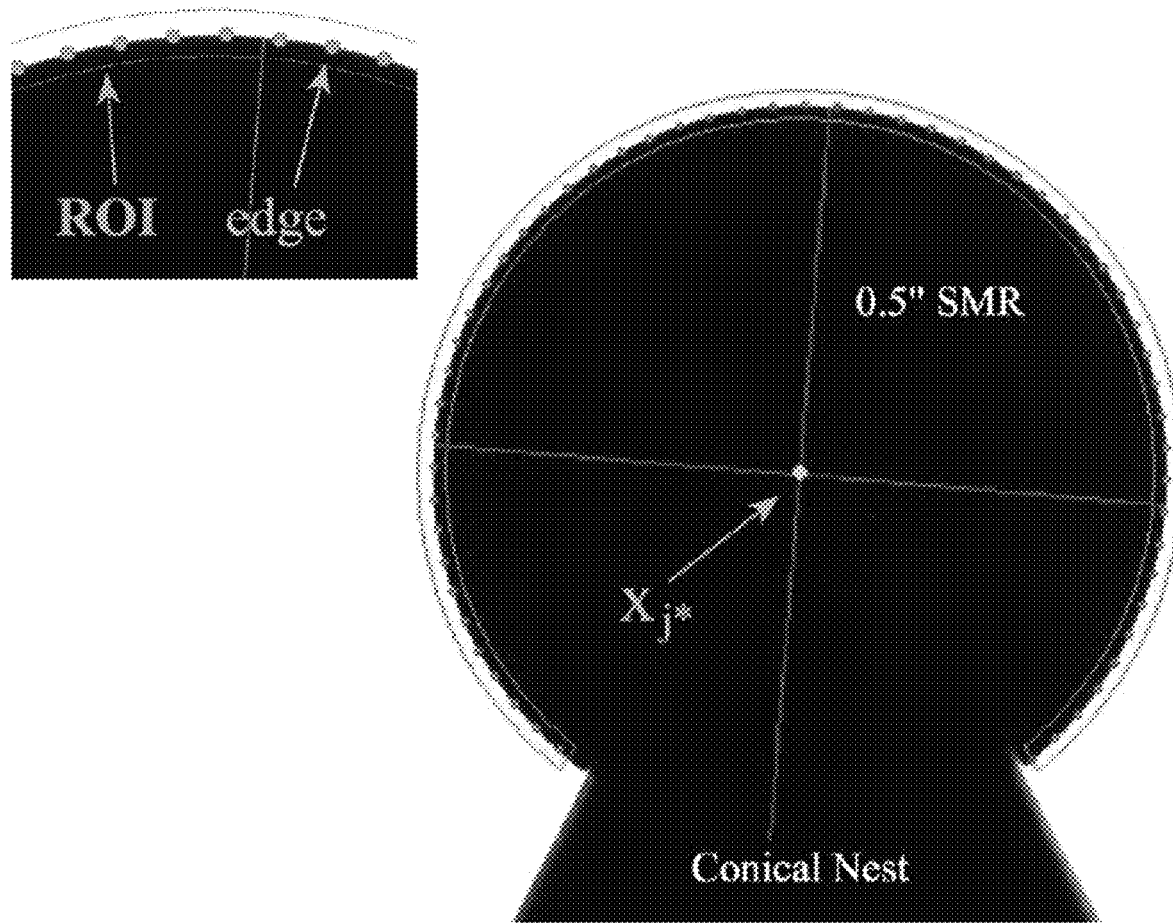
FIG. 45 shows a scaled orthographic projected disc of a 0.5" SMR held by conical nest. Determination of $x_{j*}$ image conjugates is achieved through an edge finding algorithm and circle fitting. Conjugate $x_{j*}$ (yellow dot) is determined by applying the edge finding algorithm in the image from camera Cj. Cross-hairs show major and minor axes of the fit ellipse. A closeup (top left) shows an ROI bounding the disc and edge points.

With SMR* in place, a planar Lambertian white light source is place behind it, diametrically opposite from one of the cameras Cj. This is shown in FIG. 44. A white-light LED panel with a diffuser was used here as the Lambertian source. The SMR aperture is pointed away from the camera so that the solid hemisphere is viewed, and the source is placed far enough away such that illumination on SMR* is uniform and not dependent on minor alignment changes relative to the camera optical axis. This is verified by viewing the SMR in the images while moving the light source. Other sources such as telecentric illuminators could be used. To eliminate stray light an absorbing shroud made of black flocking can be used to cover the setup. Gamma adjustment in the images is also useful for improving edge definition and compressing image values during this process. A camera image showing the orthographic projected disc resulting from this illumination scheme is shown in FIG. 45.

The image observed in the camera is that of the orthographic projected disc of the SMR* on top of the silhouette of the conical nest. The disc is well defined and surrounded by a uniform intensity. Because of the cone-style nest, nearly 320° of the disc are observed.

From this bright field image, the coordinate $x_{j*}$ for the centroid of the disc in camera Cj is found using a machine vision algorithm. A semi-annular region of interest (ROI) is established around the perimeter of SMR*. This shaped ROI allows the silhouette of the conical nest to be excluded by choosing the start and stop angle of the semi-annulus. The inner radius and outer radius of the semi-annulus are chosen to bound the edge of the orthographic disc. An edge finding algorithm is then used to identify the edge of the disc by detecting the sharp dark-to-light transition along radial trajectories every 2° between the inner and outer edge of the ROI. The ROI and edge detection process are also shown in FIG. 45. As the centroid coordinate of the disc does not depend on its area or knowing accurate dimensions, the requirement for the edge detection algorithm having to determine dimensions with accuracy can thus be relaxed (with the caveat that the illumination be uniform). In other words, an over or under estimation of the diameter of the image of SMR* will not change the found centroid location $x_{j*}$. Sensitivity to image errors could be minimized further by the use of appropriate object-space-telecentric imaging lenses. In this case the centroids will be less sensitive to accidental variations in magnification while achieving focus. However, such lenses can become large due to the path of the chief ray for appreciable fields of view.

As the $x_{j*}$ are based on the direct measurement of SMR* disc, they are obtained with sub-pixel resolution. The centroid finding process is repeated for the other two cameras so that all three centroids $x_{1*}, x_{2*}, x_{3*}$ are established and stored in memory.

Figure 46:
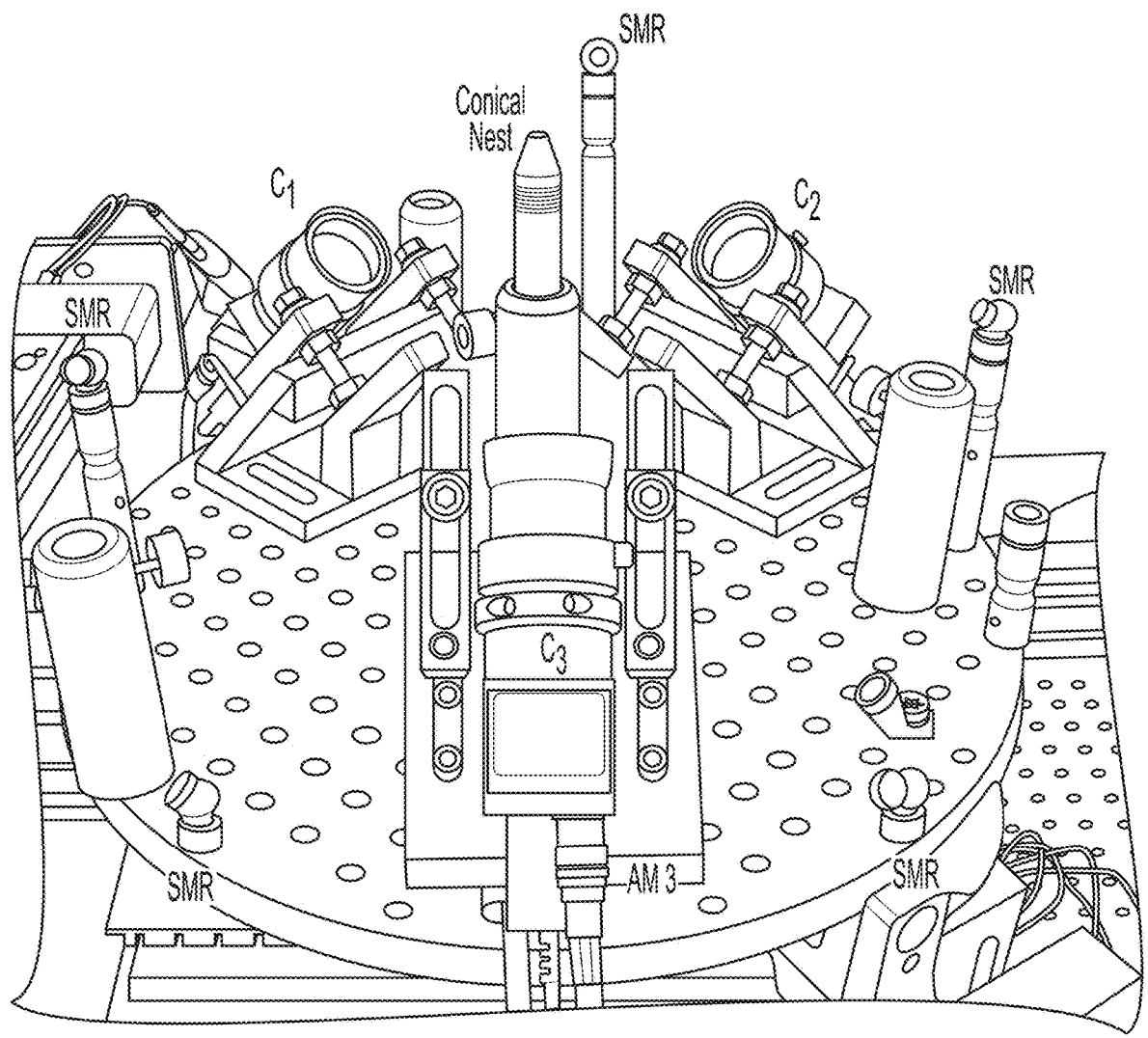
FIG. 46 shows an arrangement of cameras in a non-contact coordinate measuring machine. Three identical 5 MP CMOS cameras having 2.2 μm sized pixels and configured with 18 mm focal length lens are labeled C1, C2, and C3 and shown along with the SMRs and conical nest.

The last step in calibrating the pixel probe is to link X* to the laser tracker by establishing the local coordinate system L* within which X* uniquely resides. Mount a set of SMRs, {SMR1:SMRj} at varying heights and locations on the mechanical base the cameras are fixed to. Shown in FIG. 46 is a pixel probe that has the cameras along with the set {SMR1:SMR5} fixed to a small optical breadboard.

To link X*, SMR* as well as the {SMR1:SMR5} are measured with the laser tracker thereby creating a constellation of six points in W representing the center coordinates of the SMRs. This constellation simultaneously defines both L* and X*. X*has a fixed relationship to {SMR1:SMR5} regardless of SMR* being physically there. Actualization of the pixel probe is completed by removing SMR* leaving behind the projected image of X* via $x_{1*}, x_{2*}, x_{3*}$ that were stored in memory and realize that to retrieve the location of X* within L* we need only re-measure {SMR1:SMR5} with the laser tracker. As only three out of {SMR1:SMR5} are involved for L*, here five SMRs reduced errors due to noise, computational precision, and the finite accuracy of the laser tracker.

Through this calibration, X* achieves a direct correspondence between the laser tracker and any coordinate within W that gets imaged by the trifocal imager.

Because the pixel probe is intrinsically linked to a laser tracker, it can be used to make measurements by itself. The IR3 coordinate $X_{obj}$ of a feature on an object in W maps to three coordinates of the trifocal imager in IR2 as, $$x_{1obj}=[x_{1obj},y_{1,obj}]^T, x_{2obj}=[x_{2obj},y_{2obj}]^T, x_{3obj}=[x_{3obj}, y_{3obj}]^T \quad (6)$$

The coordinate measurement of $X_{obj}$ in IR3 is simply obtained by orienting the pixel probe such that $\{x_{1,obj}, x_{2,obj}, x_{3,obj}\}$ coincides with $\{x_{1*}, x_{2*}, x_{3*}\}$. Letting $\delta_j=|x_{j,obj}-x_{j*}|$, and $\Delta=\|X_{obj}-X^*\|$, this coincidence relation in IR2 is, $$\Sigma_{j=1}^3 \delta_j = 0 \quad (7)$$

which simultaneously satisfies the desired condition in IR3, $$\Delta = \|X_{obj}-X^*\|=0 \quad (8)$$

and makes $X_{obj}$ coincident with X* in W. Capturing {SMR1: SMR5} with the laser tracker under this condition completes the measurement and we obtain $X_{obj}$ within W without physical contact.

The pixel probe provides nearly an infinitesimal invisible stylus located at X* and has other aspects that further enhance its utility for coordinate measurements and spatial metrology. As a stylus, it provides a very repeatable and unambiguous point measurement free from re-projection and correlation errors that can result from relying on 3-D reconstruction using full image frames. This is mainly due to the direct calibration achieved using the orthographic projection of the SMR as described above. As such, rather than determining coordinates in IR3 through a parallax disparity requiring calibration across entire sets of images, it reduced the measurement to a single point, i.e., X* and link this to a laser tracker. Therefore, unambiguous, precise, and accurate knowledge of a single point is traded for full 3-D reconstruction across an image that is less accurate. This single-point function is used in modes of operation, direct mode and feature mode. These modes allow different types of measurements to be obtained with a laser tracker and leverage both the stylus-like nature and imaging nature of the pixel probe.

Figure 47:
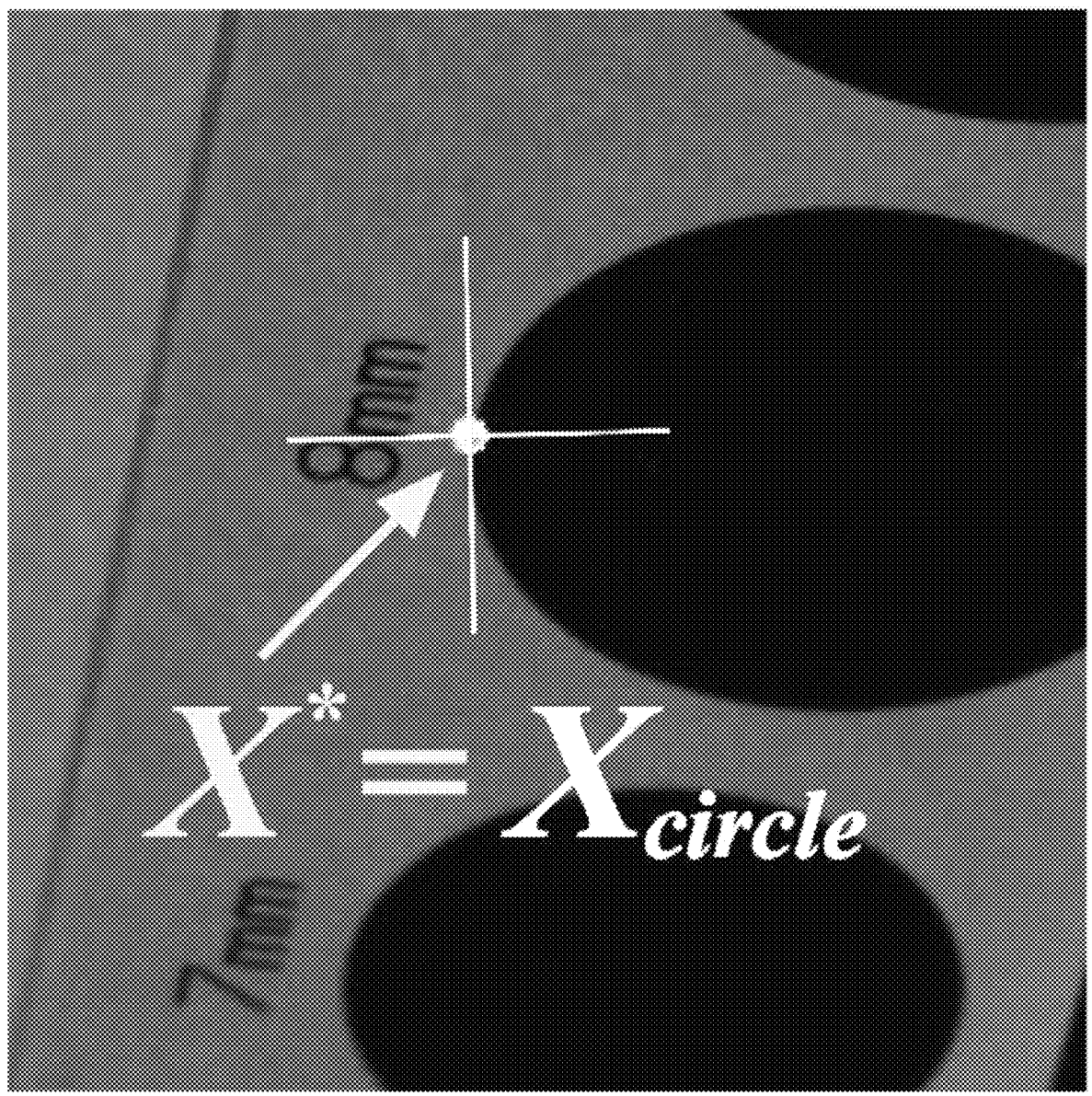
FIG. 47 shows direct mode operation with an optical shape target with an image from a camera. X* is shown as a center dot and is coincident with a location X at an edge of an 8-mm diameter circle at a center of cross-hairs.

In direct mode, the pixel probe functions like a stylus and obtains a single point measurement through the one-to-one correspondence between X* and the coordinate $X_{obj}$ of a physical feature on an object via (7) & (8). A canonical example of this is shown in FIG. 47, wherein a point on the edge of a planar circular optical target is measured.

The pixel probe is represented by the dot (with coordinates $x_{1*}, x_{2*}, x_{3*}$) in the image captured from one of the cameras (note that the size of the blue dot has been exaggerated for visibility in the figures and represents a single point coordinate at its center). When the center of the dot is placed at a location on the edge of the circle so that $X_{obj}=X_{circle}$, then X* is also at the same time physically at the corresponding location in IR3. The laser tracker captures the set {SMR1:SMR5}, and subsequently, $X_{circle}$ in the laser tracker world frame W is obtained. Moving the pixel probe about the circumference of the circle and continuing this process aligning X* with different locations generates a set of points which can then be fit to obtain not only circle dimensions (perimeter, and radius) but full pose within W (center coordinate, and normal vector).

In feature mode image processing is used for identifying features from the scene observed by the pixel probe. Unlike in photogrammetry systems, no reconstruction from image space-to-object space is used. To the pixel probe, features that have been extracted at the camera image planes have a conjugate in W. As such these features represent structures in 3-D space that need not have a literal corresponding form. These structures may be derived from any number of means (optical filters, artificial intelligence, machine vision algorithms, etc.) able to identify patterns of interest in the images. Furthermore, these structures may be microns in size and need only be resolvable by the cameras to be measured. As such, scaling camera resolution and magnification can very easily enhance the resolution and spatial scale measurable with the pixel probe.

Figure 48:
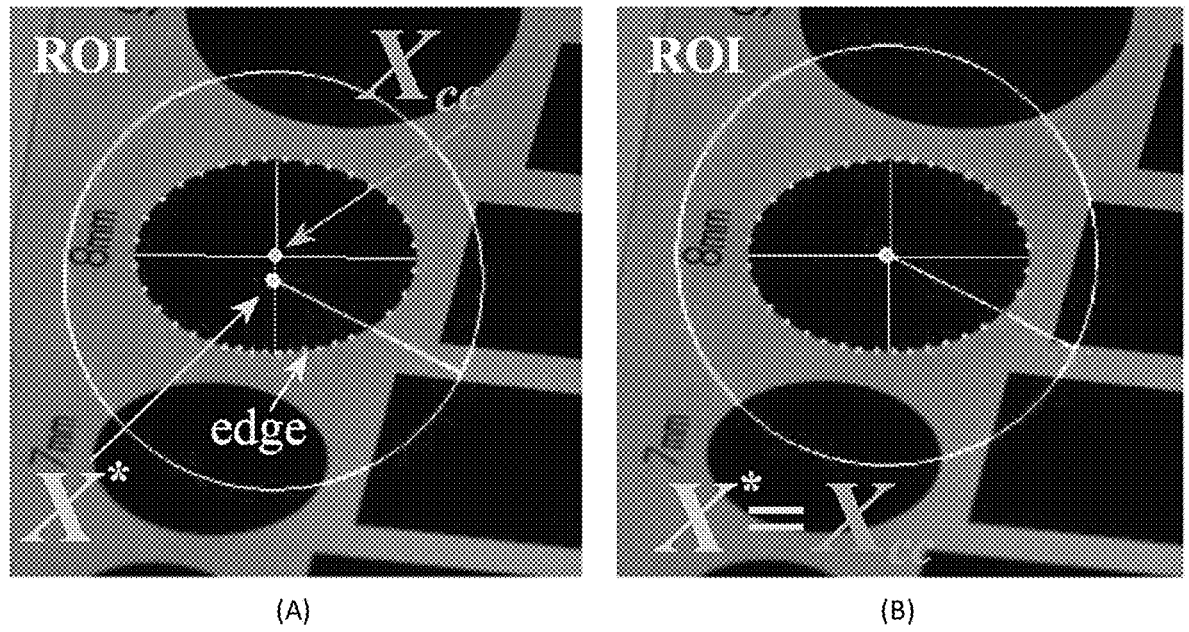
FIG. 48 shows feature mode operation with an 8-mm diameter circle of the optical shape target with an images from a camera. Circles appear as ellipses due to normal perspective distortion. (a) First the center of the circle, Xcc is found using the edge detection image filter. The ROI (boundary), edge points (dots) and major and minor ellipse axes (cross-hairs) are shown. X* is a center of dot, and at first is not coincident with the found circle center Xcc. (b) After positioning the pixel probe, the coincidence condition is satisfied with X*=Xcc and the coordinate of the circle center is able to be measured with the laser tracker.

Through the mapping of X* to W, the pixel probe measures coordinates of these derived structures with a laser tracker and demonstrates this with the canonical example of the circle target. In direct mode, finding the center of the circle in W required measuring individual points about the perimeter, then fitting a circle to these points from which the center can be determined. Alternatively, image processing can be applied to the images to first identify (not measure) the center of the circle. Due to normal perspective distortion the circle appears as an ellipse. Thus, by applying an ellipse identifying filter comprised of an ROI and an edge finding algorithm, the circle center $X_{cc}$ can be identified and prescribed a pixel coordinate $x_{j,cc}$ within the images. With $X_{cc}=X_{obj}$, initially, the coincidence condition (8) is in general not satisfied such that $x_{j,cc}$ appear away from $x_{j*}$ in the images. This is shown in FIG. 48(a), where the location of $x_{j,cc}$ corresponding to $X_{cc}$ is shown as a dot, and the location of $x_{j*}$ corresponding to X* is shown as another dot (note again the dot sizes are exaggeration). The pixel probe is then moved such that X* is coincident with Xcc thus, satisfying (8) as shown in FIG. 48(b). The laser tracker then captures {SMR1:SMR5} once again obtaining $X_{cc}$ in W. Therefore, in feature mode $X_{cc}$ is obtained through measuring the coordinate of the center of the circular pattern as identified with the image filter and not by deliberately measuring the shape of the circle.

Figure 49:
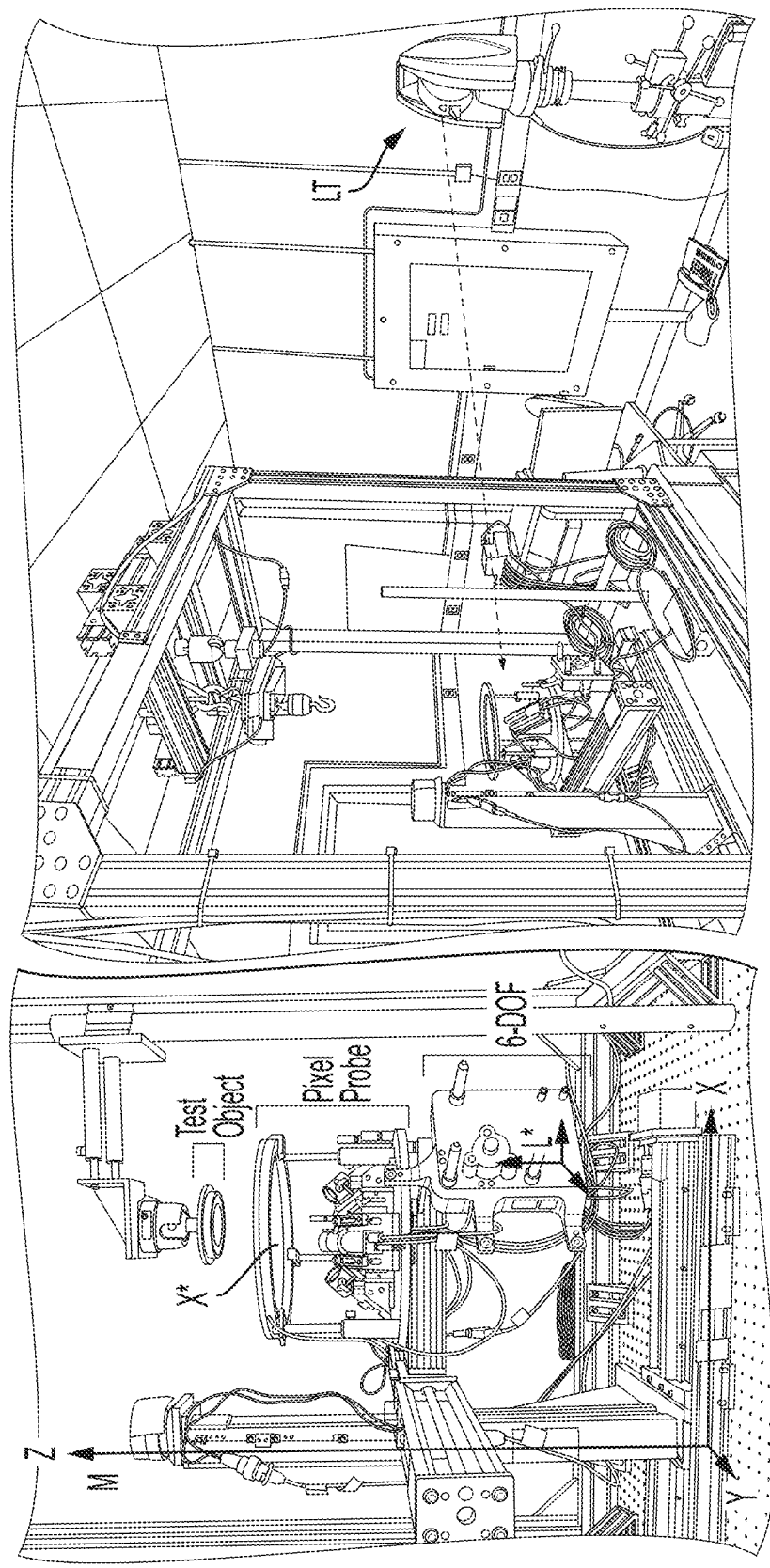
FIG. 49 shows construction elements of non-contact coordinate measuring machine. (Left) labels identify: Pixel probe with ring light, location of X*, XYZ stage and corresponding machine frame M, 6-DOF laser tracker target and corresponding local frame L*. (Right) System with laser tracker (LT), wherein dotted line depicts the laser beam path.
Figure 50:
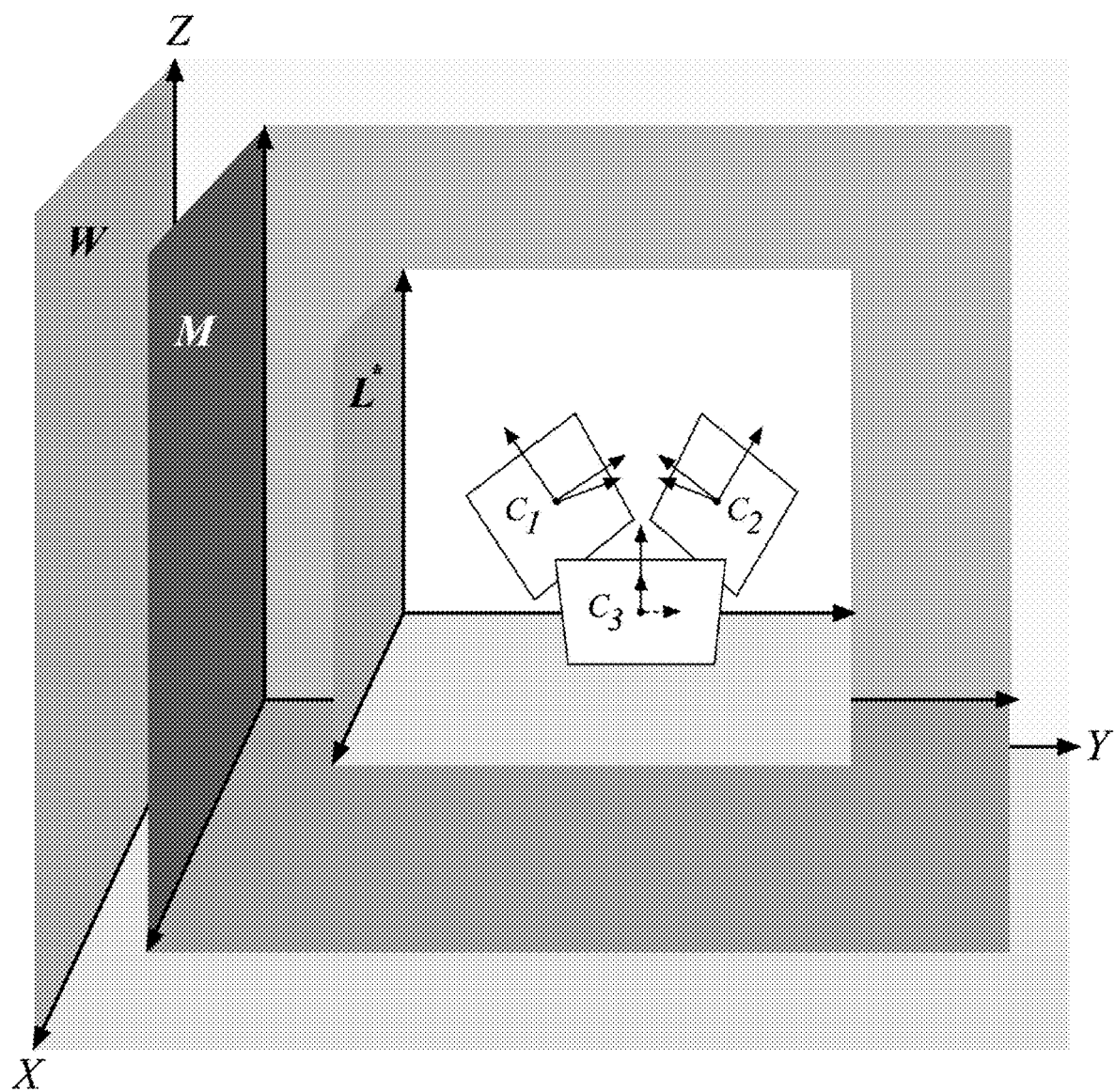
FIG. 50 shows a hierarchy of coordinate frames: World (W), Machine (M), Local (L*), Cameras (Cj) for the non-contact coordinate measuring machine. Frames W, M, and L* are shown oriented similarly for clarity but can be posed arbitrarily.

The usability and convenience of the pixel probe can be extended to CMS configuration (called PiCMS). For this, the pixel probe is attached to a motorized three-axis (X,Y,Z) translation stage having machine coordinate M (See FIG. 49). An extrinsic calibration estimates location of X* within M so that the XYZ stage can autonomously perform the movement required to satisfy coincidence relations (7) and (8). Since W intrinsically follows the laser tracker, X* is tracked correctly regardless of where the laser tracker is placed. Thus, by design the extrinsic calibration also allows for the laser tracker to be relocated without loss of calibration so that it is not tied up indefinitely and can be pulled in and out of the system for other use. The hierarchy of frames (World-to-cameras) used to describe the PiCMS is W→M→L*→C1→C2→C3. This is shown in FIG. 50.

The pixel probe was constructed from three low distortion machine vision lenses and 5 mega pixel monochrome CMOS sensors. Lenses used were also "high-G" lenses and are capable of handling high G-forces, vibration due to motion, and changes in orientation without image shifts. This is a design consideration as the alignment of image coordinates that results from the orthographic projection of the SMR are sensitive to lens shifts. Lens focal lengths are 18 mm and set to F/5.6 and sensor pixel size is 2.2 µm. The working distance from the lenses to X* was set to give a magnification of approximately 10× (image-to-object space) and a pixel foot print of ≈22 µm at X*. Manufacturer stated distortion values of 0.01% are consistent with the values found in $[K_j]$. The cameras were mounted on a 0.5" thick solid aluminum optical bread board. A ring light was fixed above the pixel probe which could be configured for bright field and dark field illumination. To aid in measurement efficiency a 6-degree-of freedom (6-DOF) laser tracker target which inherently generates the frame L* was fixed to the optical bread board. This was used instead of SMR set {SMR1:SMR5}. A laser tracker capable of 3-degree-of-freedom (3-DOF) point as well as 6-DOF frame measurements was also used. Laser tracker accuracy was better than 20 µm. Three linear stages having 6 µm resolution driven with stepper motors were used to construct the XYZ stage. An assembly constructed from 1.5" diameter stainless steel optical posts and mounting plate were used to hold measurement samples. The resulting PiCMS is shown in FIG. 49.

Automatic targeting of $X_{obj}$ determines the required motion of the XYZ stage to move the point X* to the desired measurement coordinate. For this, triangulation based on the discrepancy $\Delta=[\Delta X,\Delta Y,\Delta Z]=X_{obj}-X^*$ is used and calculated from the current value of $X_{obj}$ projected through all three cameras. Using the estimated poses and corresponding camera matrices determined from extrinsic calibration gives, $$x_{1,obj}=[P_1]X_{obj} \tag{9}$$

$$x_{2,obj}=[P_2]X_{obj} \tag{10}$$

$$x_{3,obj}=[P_3]X_{obj} \tag{11}$$

From the extrinsic calibration, the machine coordinate system M was defined with the origin at the pixel probe, so that $X^*=[0,0,0]^T$. The discrepancy is simply $\Delta=X_{obj}$ so that, $$[\Delta X,\Delta Y,\Delta Z]=X_{obj} \tag{12}$$

Accurate targeting is achieved by finding $X_{obj}$. Using the fact that $x_j \times x_j = 0$ gives, $$0=x_{j,obj}\times([P_j]X_{obj}) \tag{13}$$

Arranging (9)-(11) in the form of $0=[A]X_{obj}$, the non-trivial solution $X_{obj}\neq 0$ is found through the minimization of $\|[A]X_{obj}\|$ subject to the constraint $\|X_{obj}\|=1$. The singular value decomposition (SVD) of [A] is used to estimate $X_{obj}=X_{obj,est}$. Where, per usual convention, $$[A]=[U][D][V]^T \tag{14}$$

where [D] is a 4×4 diagonal matrix with the singular values of [A], and $[V]^T$ is a 4×4 orthogonal matrix. With, $$[V]=\begin{bmatrix} v_{11} & v_{12} & v_{13} & v_{14} \\ v_{21} & v_{22} & v_{23} & v_{24} \\ v_{31} & v_{32} & v_{33} & v_{34} \\ v_{41} & v_{42} & v_{43} & v_{44} \end{bmatrix} \tag{15}$$

In homogeneous coordinates the solution is given by the last column of [V], $$X_{obj}=\Delta=\begin{bmatrix} \Delta X \\ \Delta Y \\ \Delta Z \\ 1 \end{bmatrix}=\begin{bmatrix} v_{14}/v_{44} \\ v_{24}/v_{44} \\ v_{34}/v_{44} \\ 1 \end{bmatrix} \tag{16}$$

The movement for the XYZ stage to locate the selected coordinate and make $X^*=X_{obj}$ in W is given by $\Delta X=v_{14}/v_{44}$, $\Delta Y=v_{24}/v_{44}$, $\Delta Z=v_{34}/v_{44}$. Point-to-point targeting using this method can be iterated a few times to reduce Δ to as close to zero as possible, with values ending up in the range of a few microns.

Because a user can interact with camera images, coordinates on an object in the scene of the trifocal imager can be specified with the click of a mouse. This is achieved by specifying a target coordinate $X_{target}$ in the images that the XYZ stage drives the pixel probe to, where now $X_{target}=\Delta$. The chosen $X_{target}$ results from the mode the pixel probe is used in, direct mode or feature mode. An interactive ROI that is manipulated on the computer screen allows the user to easily specify $X_{target}$. For the measurements presented below two types of ROIs were used: a single point ROI for direct mode allowed pointing-and-clicking on a coordinate through the images and, a circular ROI in feature mode was used where the edge finding algorithm is implemented.

Calibrated optical test targets consisting of shapes patterned from (≈200 nm thick) chrome deposited on a glass substrate provided a control measurement set to validate the PiCMS for this proof of concept. Such targets are manufactured to tolerances well below the resolution of the pixel probe and are certified as calibration standards making them useful for testing purposes. Coordinate measurements were acquired to determine dimensions and pose of these shapes as they exist within W.

Figure 51:
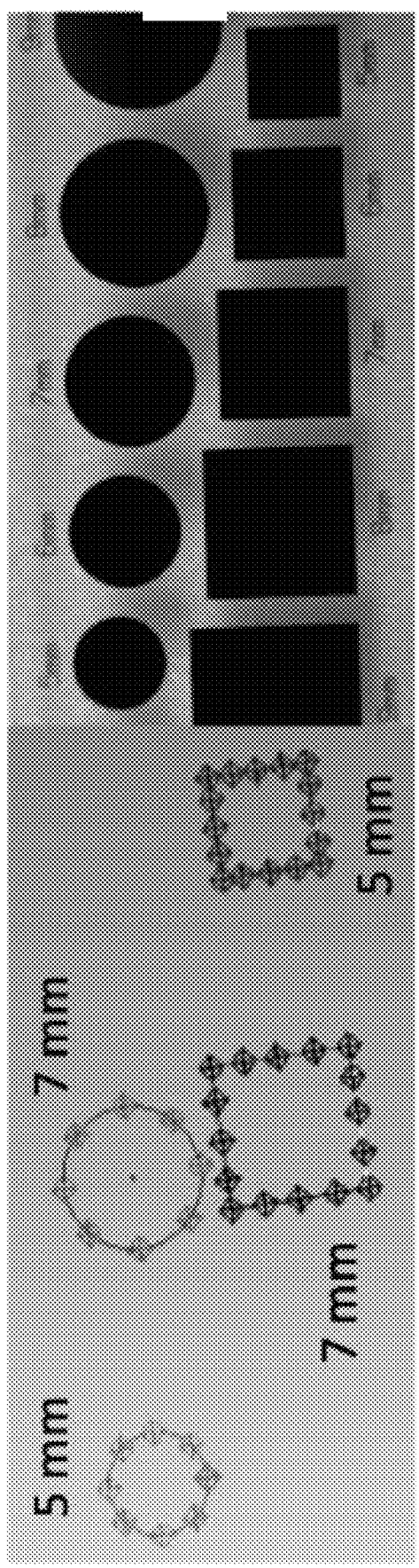
FIG. 51 shows (left) Coordinate points measured with the non-contact coordinate measuring machine for the 5-mm and 7-mm square and circle shapes. (Right) Optical shape target.

Three kinds of targets were used: square shapes with dimensions ranging from 0.5 mm×0.5 mm-10 mm×10 mm, circle targets with diameters ranging from 0.5 mm to 10 mm, and a square grid of 250 µm diameter dots with 500 µm spacing. Stated uncertainties (size, spacing) were ±2.5 µm for all targets. Direct Mode was used to measure coordinates along the perimeter of the squares and circles. Sixteen and eight coordinates were measured around the squares and circle respectively. The targets were placed in the PiCMS at the "Test Object" location (see FIG. 49). FIG. 51 shows the shape target and corresponding coordinate measurements. Data are shown for the 5 mm and 7 mm squares and circles. Lines and circles where fit to these data sets using commercially available spatial metrology software to determine the shape dimensions.

Figure 52:
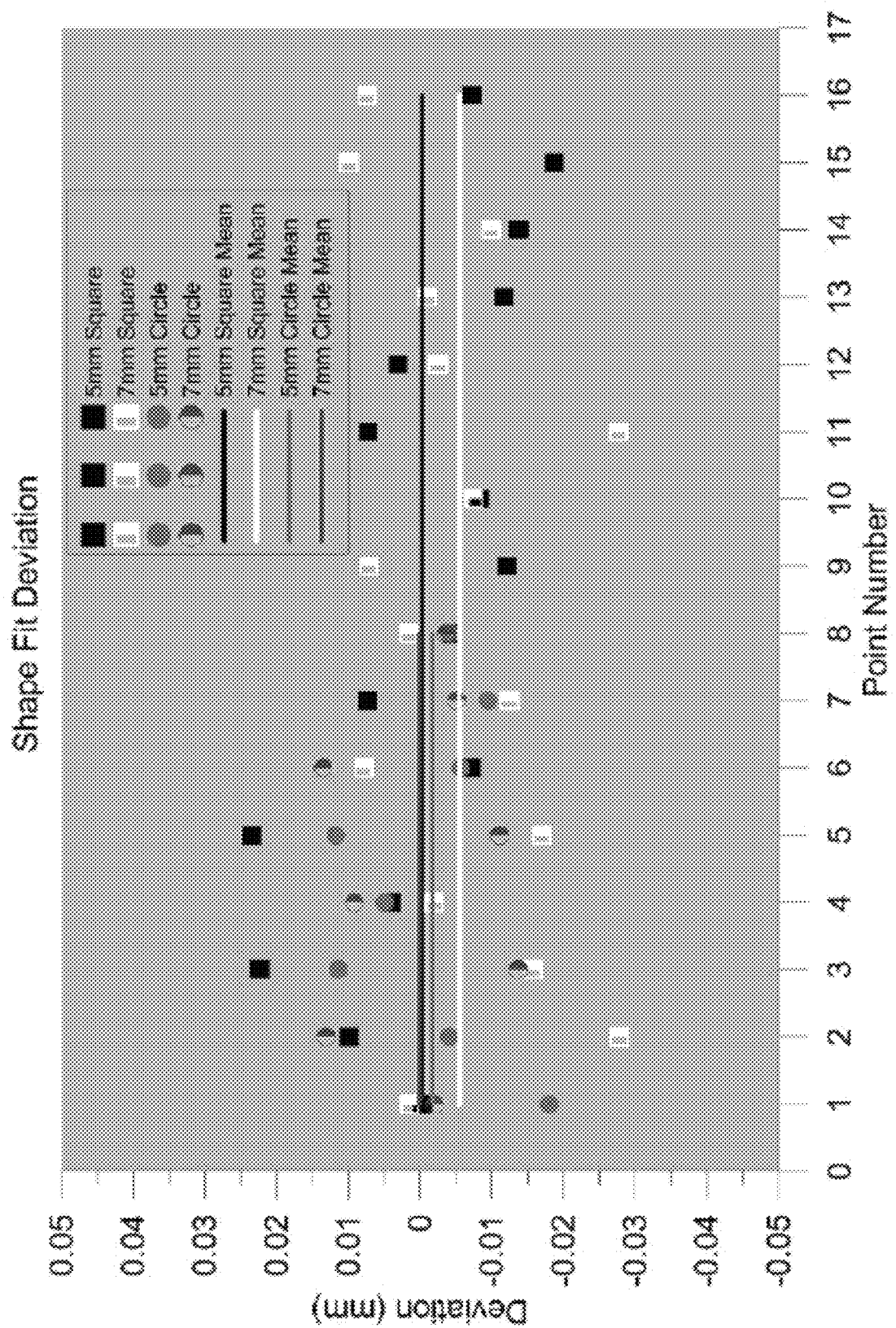
FIG. 52 shows a plot of the fit deviation of each measurement coordinate from the ideal square and circle shape. Mean fit deviation for each shape is also given (solid lines)

For the 5 mm square the dimensions were found to be 5.000 mm×5.017 mm with a mean fit deviation from ideal of µ=−0.000 mm and RMS fit error of 0.012 mm. For the 7 mm square the dimensions were found to be 7.015 mm×7.011 mm with µ=−0.006 mm and RMS fit error of 0.013 mm. For the 5 mm circle the diameter was found to be 5.015 mm with µ=−0.002 mm and RMS fit error of 0.010 mm. For the 7 mm circle the diameter was found to be 7.018 mm with µ=0.000 mm and RMS fit error of −0.099 mm. FIG. 52 shows the fit deviation from the ideal geometry of all data points acquired for the four shapes. Nearly all deviations lie within the range of ±25 µm with mean deviations below 10 µm. As mentioned above, since measurements are within a world coordinate system their poses are also measured by the PiCMS. From each shape data set the following poses were determined in fixed angle convention [θx,θy,θz]: 5 mm square, [91.0208 ○, 1.9943○,−27.099○]; 7 mm square, [91.005○, 1.9895○,−26.783○]; 5 mm circle, [90.974○, 1.819○,−28.156○]; 7 mm circle, [91.076○,2.000○,−28.285○]. All poses are nearly identical as they should be since the shapes are patterned on the same glass substrate and thus lie in the same plane.

Figure 53:
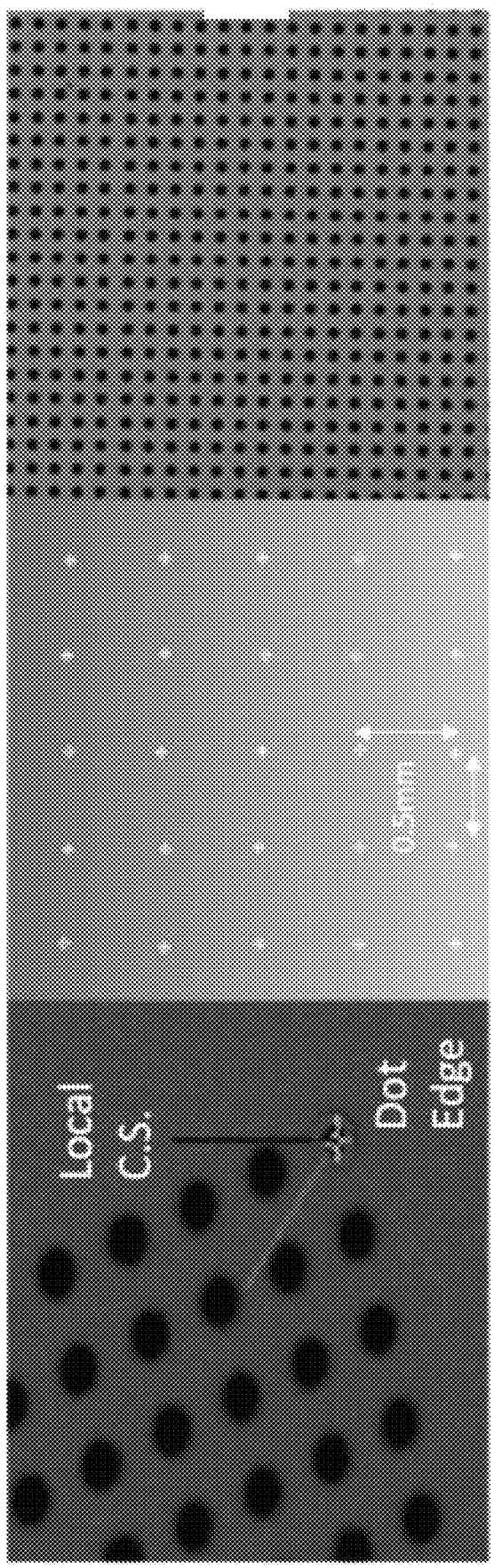
FIG. 53 shows a grid target. (Left) Closeup shows the measurement of the center of one 250-μm diameter dot in the grid. The cluster of edge points are shown. The machine coordinate system M denoted by "Local C.S." with center defining the noncontact metrology probe is centered on the dot because the coincidence relation is being satisfied. (Center) Acquired data points for the 5×5 sub grid. (Right) Dot grid.
Figure 54:
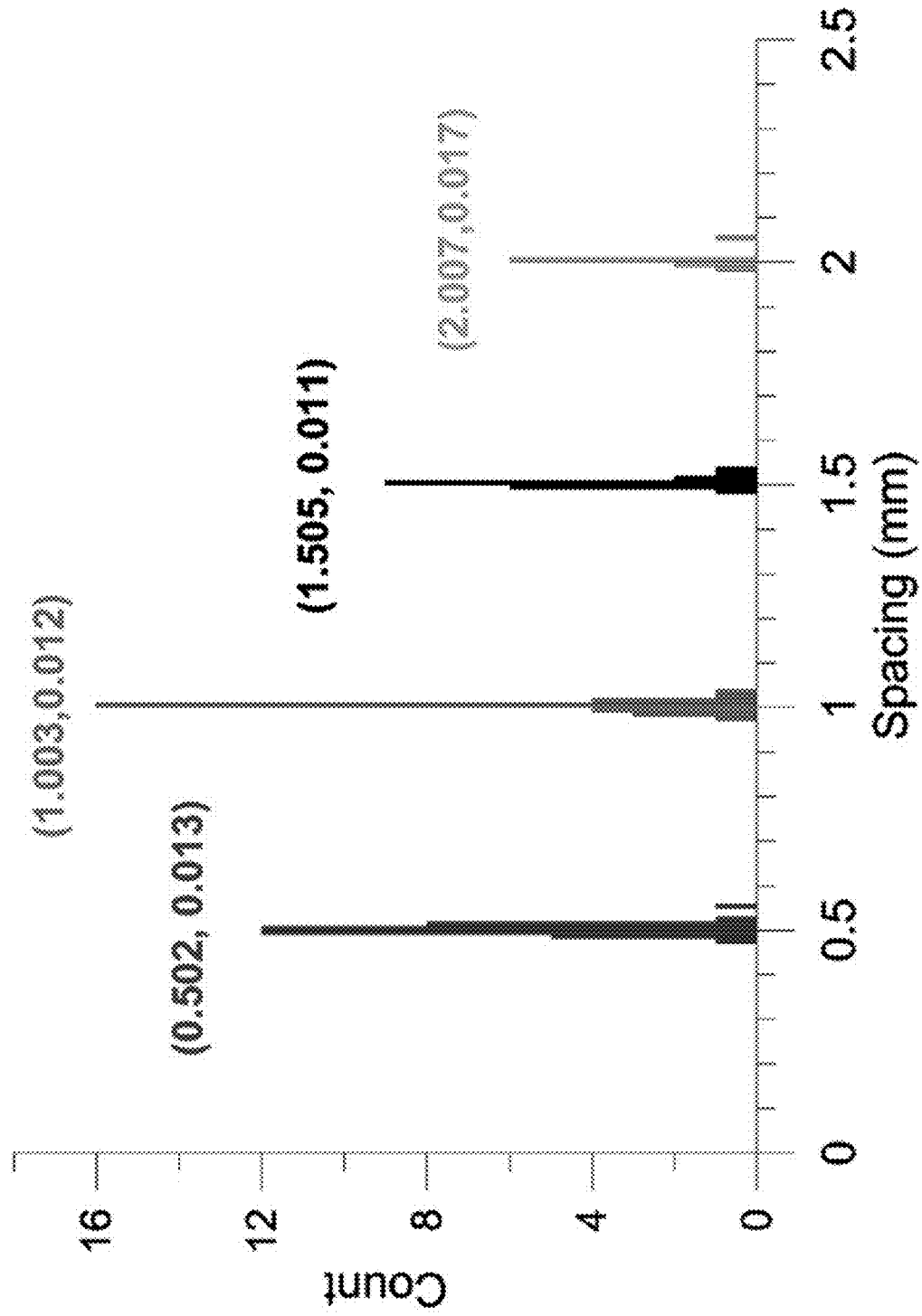
FIG. 54 shows a histogram for 100 data points with clustering around each spacing category: 0.5 mm, 1.0 mm, 1.5 mm, 2.0 mm. Mean and standard deviation (μ, σ) are given above each cluster.

The dot grid target and corresponding measurement locations are shown in FIG. 53. Feature mode with an annular ROI was used to find the center of each dot. The center-to-center spacing between the dots in a 5×5 sub-grid section spanning a 2 mm×2 mm patch was measured. The distance between all pairs of dots along the orthogonal directions were calculated for all four separation categories: 0.5 mm, 1.0 mm, 1.5 mm, 2.0 mm resulting in 100 data points. A histogram for these data is shown in FIG. 54 along with the mean and standard deviation (µ, δ) for each dot spacing category, both of which show errors below 20 µm. Tight clustering about each spacing for the data points is clear from the histogram. For comparison, these dots are ≈150 times smaller than a typical 38.1 mm diameter SMR laser tracker target yet resolved and individually measured in the laser tracker world frame W via the PiCMS.

Figure 55:
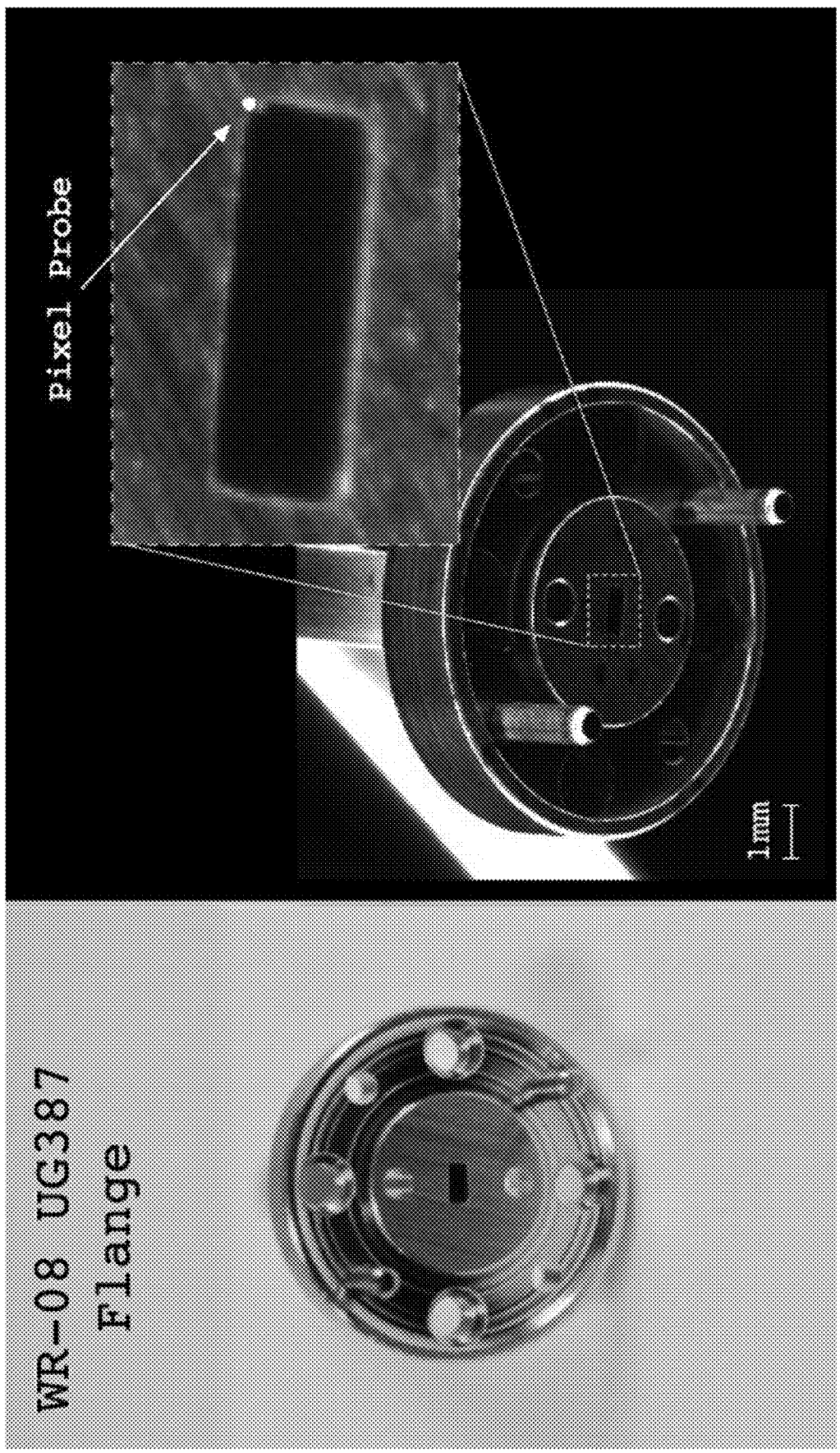
FIG. 55 shows (left) a WR-08 UG-387 microwave waveguide flange, (right) dark-field image of flange, and (inset) the WR-08 waveguide aperture with noncontact metrology probe at upper right corner.

A WR-08 UG-387 microwave waveguide flange was chosen to demonstrate measuring and reconstructing real-world 3-D objects using the PiCMS. The major dimensions of this flange must meet military specification and are standardized to MIL-DTL-3922 with mechanical features ranging across the macro/meso scale. FIG. 55 shows a photo of the WR-08 UG-387 flange.

Figure 56:
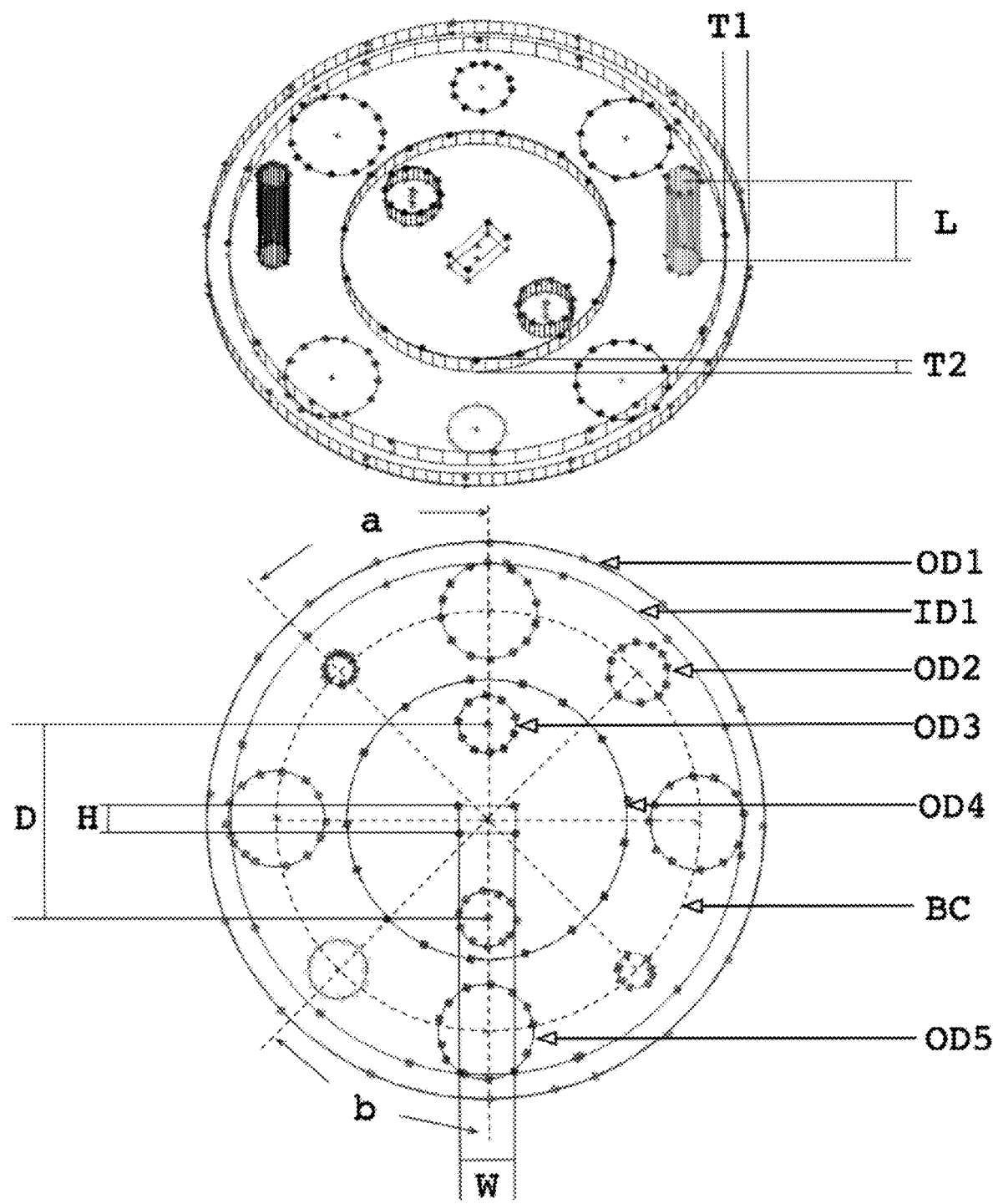
FIG. 56 shows a 3-D reconstruction of a WR-08 UG-387 flange. (top) Out-of-plane and (bottom) in-plane plane views are shown. Locations of the individual coordinate measurements are represented as points along with the geometries fitted to them.

The ring light (see FIG. 49) was configured for dark-field illumination so as to accentuate edges. The resulting dark-field image with the pixel probe at a corner of the WR-08 waveguide opening is also shown in FIG. 55. Again the pixel probe has been exaggerated so it is visible in the figure. The PiCMS was used in direct mode to measure coordinates along contours of major features. The 3-D reconstruction was generated by fitting geometries (rectangles, circles, cylinders, etc.) to these data using commercially available spatial metrology software provided with the laser tracker. The measured coordinate points and 3-D reconstruction are shown in FIG. 56 along with labeled dimensions. Table 1 compares the dimensions resulting from the 3-D reconstruction to the typically specified dimensions.

TABLE 1

| Dimension | PiCMS | Typ | Diff | Tol. |
| --- | --- | --- | --- | --- |
| OD1 | 18.915 | 19.02 | 0.105 | ±0.0254 |
| OD2 | 2.016 | 2.082 | 0.067 | — |
| OD3 | 1.924 | 1.981 | 0.057 | — |
| OD4 | 9.50 | 9.50 | 0.00 | — |
| OD5 | 3.24 | 3.20 | 0.04 | — |
| ID1 | 17.339 | 17.320 | 0.020 | — |
| BC | 14.288 | 14.288 | 0.00 | ±0.0254 |
| H | 0.926 | 1.016 | 0.091 | ±0.0254 |
| W | 1.908 | 2.032 | 0.124 | ±0.0254 |
| D | 6.599 | 6.604 | 0.005 | ±0.0254 |
| L | 5.066 | 5.00 | 0.066 | — |
| T1 | 0.787 | 0.765 | 0.022 | — |
| T2 | 0.743 | 0.765 | 0.022 | — |
| a° | 45.114 | 45.0 | 0.114 | ±0.5 |
| b° | 44.944 | 45.0 | 0.056 | ±0.5° |

The military standardized dimensions are those with tolerances and are listed in bold font. Results show agreement with designed values. Of the major dimensions OD1, H, and W show the largest discrepancies around 100 µm. In the case of OD1 this may be due to the chamfer and rounding of the outer surface of the flange which is visible in FIG. 55. In the case of the inner waveguide dimensions H and W this may be due to the electro-forming process by which the center rectangular hole is made. In this process a machined mandrel is first made on which copper is then grown through electrolysis, then the mandrel dissolved. As can be seen in FIG. 55 the rectangular opening has irregularities in the range of a few pixels (~100 µm) making for rounded corners and non-parallel sides. The other dimensions: (bolt circle) BC, secondary alignment pin hole separation D and the angular spacing between holes a and b show differences within specified tolerances.

Advantageously, the PiCMS directly measures sub-millimeter objects and edges with a laser tracker. The measurements presented were taken at the edges of samples or on surfaces that had noticeable features. This system can be scaled. The 5-megapixel CMOS cameras used can be replaced by, e.g., 50-megapixel cameras. Along with scaling of the optics, this can improve the PiCMS resolution to <<20 μm while reducing the size of the system.

Because the pixel probe is linked directly to the laser tracker and targeting is accomplished via the XYZ stage, the laser tracker can be taken in and out of the system without loss of calibration. Also, variations on the PiCMS that do not use a laser tracker can be realized. If relative measurements (not existing within a world frame) are only of interest, the PiCMS can be operated without a laser tracker with some modification. This may be accomplished by relying on the machine coordinate M for determining the location of X*. In the construction used here the position of encoders on the axes of the XYZ stage would then provide the values used to obtain relative measurements instead of the laser tracker. The accuracy of this method would depend on how well the XYZ stage movement is calibrated to the machine coordinate system. Using the laser tracker as was done here relaxes the calibration requirement of the XYZ stage.

Extrinsic calibration of the PiCMS involves establishing frame-to-frame relationships between M and cameras. Use a 3-D-point correspondence method to solve for the individual camera poses $[R_j|t_j]$ within M. Laser tracker measurements are used for this and for also defining the machine coordinate system M such that the Pixel Probe point X* is at the origin. The result are estimates of the camera matrices $[P_j]$ that allow automatic targeting of object coordinate $X_{obj}$ and for calculating the offset $\Delta = X_{obj} - X^*$. From this, the XYZ stage can move autonomously to the measurement location.

For this a set of three dimensional data points are obtained within M (IR3). This set is denoted by the vector U, with the corresponding set of image points (IR2) in the j'th camera denoted by the vector $u_j$, $$U = [X_1, Y_1, Z_1, X_2, Y_2, Z_2, \ldots X_N, Y_N, Z_N]^T \quad (A.1)$$

$$u_j = [x_{j1}, y_{j1}, x_{j2}, y_{j2}, \ldots x_{jN}, y_{jN}]^T \quad (A.2),$$

where the correspondence between U and $u_j$ are related for each set $\{1:N\}$ through the camera projection matrix $[P_j]$ via, $$u_j = [P_j]U = [K_j][R_j|t_j]U \quad (A.3)$$

The pose of each camera within M is then estimated from this correspondence.

X* of the pixel probe is taken as the origin of the machine coordinate M, and the XYZ stage is set with all three axes at the midpoint of travel so as to maximize available movement. A point target that is visible from all three cameras is fixed in place which is used to define the set of points U and image points $u_j$. The end of a thin wire with a diameter under 50 μm was used as the point target. The wire was held securely in place with a small clamp such that it is observed in the field of view of all three cameras. The end of the wire acts as the object coordinate $X_{wire} = X_{obj}$.

With the XYZ stage at the middle of travel, the end of the wire is positioned to coincide with the pixel probe such that, $X_{wire} = X^*$ and $\Delta = 0$. The XYZ stage is then moved to several locations along the ±X, ±Y, ±Z directions. At each location of the stage, the pixel coordinates of the end of the wire $x_{j,wire} = [x_{j,wire}, y_{j,wire}]^T$ in each camera image are identified and recorded creating a set of known image points. Define the vectors that contain these known image points for all three cameras as u1,0, u2,0, u3,0. At the same time, the location of the pixel probe measured by the laser tracker in M is recorded. The axes of M are defined by moving the XYZ stage in the ±X, then ±Y, then ±Z directions independently. The laser tracker data were then shifted so that the starting point of the XYZ stage, where $X_{wire} = X^*$, defined the machine origin M(0,0,0). These data were then used to estimate the camera poses $[R_j|t_j]$.

As the three cameras are fixed relative to one another, a linear least squares algorithm based on Newtonian iteration was used to estimate the camera poses. Although more complex minimization techniques could be used for pose estimation, this method is relatively straight forward to implement and is successful for this purpose. Expanding $[R_j|t_j]$ the rotation matrix is, $$[R_j(\theta_{jx}, \theta_{jy}, \theta_{jz})] = [R_{jz}][R_{jy}][R_{jx}] \quad (A.4)$$

where using a fixed angle convention, $$[R_{jx}] = \begin{bmatrix} 1 & 0 & 0 \\ 0 & \cos(\theta_{jx}) & -\sin(\theta_{jx}) \\ 0 & \sin(\theta_{jx}) & \cos(\theta_{jx}) \end{bmatrix} \quad (A.5)$$

$$[R_{jy}] = \begin{bmatrix} \cos(\theta_{jy}) & 0 & \sin(\theta_{jy}) \\ 0 & 1 & 0 \\ -\sin(\theta_{jy}) & 0 & \cos(\theta_{jy}) \end{bmatrix} \quad (A.6)$$

$$[R_{jz}] = \begin{bmatrix} \cos(\theta_{jz}) & -\sin(\theta_{jz}) & 0 \\ \sin(\theta_{jz}) & \cos(\theta_{jz}) & 0 \\ 0 & 0 & 1 \end{bmatrix} \quad (A.7)$$

with the translation column vector, $$t_j = [t_{jx}, t_{jy}, t_{jz}]^T \quad (A.8)$$

The coordinates of the image points uj which result from the projection of U by camera Cj, are dictated by the pose variables $\theta_x, \theta_y, \theta_z, t_{jx}, t_{jy}, t_{jz}$. Defining a pose vector vj as, $$v_j = [\theta_{jx}, \theta_{jy}, \theta_{jz}, t_{jx}, t_{jy}, t_{jz}]^T \quad (A.9)$$

and $$\partial v_j = [\partial \theta_{jx}, \partial \theta_{jy}, \partial \theta_{jz}, \partial t_{jx}, \partial t_{jy}, \partial t_{jz}]^T \quad (A.10)$$

we write the projection matrix as, $$[P_j] = [K_j][R_j|t_j] = [K_j][H(v_j)] \quad (A.11)$$

giving, $$u(v_j)_j = [K_j][H(v_j)]U \quad (A.12)$$

Furthermore, given the known image point coordinates $u_{j,0}$ from above, define the cost function, $$|u(v_{j,est})_j - u_{j,0}|^2 = r_j \quad (A.13)$$

In estimating the poses, find $v_j = v_{j,est}$ that minimizes the residual $r_j$. An initial estimate of the pose, $v_{j,int}$ is iteratively perturbed based on the value of $r_j$. The pose $v_j$ and image points $u_j$ are related through the Jacobian matrix given by, $$[J] = \left[\frac{\partial u_j}{\partial v_j}\right] = \begin{bmatrix} \frac{\partial u_{j1}}{\partial v_1} & \frac{\partial u_{j1}}{\partial v_2} & \frac{\partial u_{j1}}{\partial v_3} & \cdots & \frac{\partial u_{j1}}{\partial v_6} \\ \frac{\partial u_{j12}}{\partial v_1} & \frac{\partial u_{j2j1}}{\partial v_2} & \frac{\partial u_{j2j1}}{\partial v_3} & \cdots & \frac{\partial u_{j2j1}}{\partial v_6} \\ \vdots & \vdots & \vdots & \ddots & \vdots \\ \frac{\partial u_{j1N}}{\partial v_1} & \frac{\partial u_{jNj1}}{\partial v_2} & \frac{\partial u_{jNj1}}{\partial v_3} & \cdots & \frac{\partial u_{j1N}}{\partial v_6} \end{bmatrix} \quad (A.14)$$

that is approximated as, $$[J]=[\partial u_j/\partial v_j]\approx\{u_j(v_j'+\varepsilon_j)-u_j(v_j')\}/\varepsilon_j \quad (A.15)$$

where $\varepsilon_j$ is a small number used to calculate the derivatives and $v_j'$ is the current pose at any iteration. The change in the pose needed to reduce $r_j$ is computed by, $$\partial u_j=[J]\partial v_j \quad (A.16)$$

$$\partial v_j=[J^{-1}]\partial u_j \quad (A.17)$$

where [J-1] is the pseudo-inverse defined in the usual fashion as, $$[J^{-1}]=([J]^T[J])^{-1}[J]^T \quad (A.18)$$

Letting, $\partial u_j=u_{j,0}-u_j(v_j')$ We have, $$v_j''=v_j'+\partial v_j=v_j'+([J]^T[J])^{-1}[J]^T(u_{j,0}-u_j(v_j')) \quad (A.19)$$

where $v_j''$ is the updated pose. The $u_j$ as well as the derivatives in [J] are updated for each new $\partial v$. The process is continued and $r_j$ and $\partial u_j=u_{j,0}-u_j(v_j')$ recalculated for each iteration until the desired accuracy (value of $r_j$) is achieved. The final value of the pose is then taken as the estimate, $v_{j,est}=v_{j,final}'$. From the estimated pose vectors $v_{1,est}$, $v_{2,est}$, $v_{3,est}$ the camera projection matrices can then be calculated as, $$[P_1]=[K_1][H(v_{1,est})] \quad (A.20)$$

$$[P_2]=[K_2][H(v_{2,est})] \quad (A.21)$$

$$[P_3]=[K_3][H(v_{3,est})] \quad (A.22)$$

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

Reference throughout this specification to "one embodiment," "particular embodiment," "certain embodiment," "an embodiment," or the like means that a particular feature, structure, or characteristic described in connection with the embodiment is included in at least one embodiment. Thus, appearances of these phrases (e.g., "in one embodiment" or "in an embodiment") throughout this specification are not necessarily all referring to the same embodiment, but may. Furthermore, particular features, structures, or characteristics may be combined in any suitable manner, as would be apparent to one of ordinary skill in the art from this disclosure, in one or more embodiments.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." Further, the conjunction "or" is used to link objects of a list or alternatives and is not disjunctive; rather the elements can be used separately or can be combined together under appropriate circumstances. It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

What is claimed is:

1. A non-contact coordinate measuring machine comprising:
    a noncontact metrology probe comprising:
        a first camera comprising a first field of view and a first coordinate system;
        a second camera comprising a second field of view and a second coordinate system, the second camera arranged such that the second field of view overlaps the first field of view and forms a prime focal volume; and
        a third camera comprising a third field of view and a third coordinate system, the third camera arranged such that the third field of view overlaps the prime focal volume and forms a probe focal volume;
    a multidimensional motion stage in communication with the noncontact metrology probe on which the noncontact metrology probe is disposed and comprising:
        a machine coordinate system in which the multidimensional motion stage moves the noncontact metrology probe;
        a first motion arm that moves the noncontact metrology probe along a first machine direction of the machine coordinate system;
        a second motion arm that moves the noncontact metrology probe along a second machine direction of the machine coordinate system; and
        a third motion arm that moves the noncontact metrology probe along a third machine direction of the machine coordinate system;
    a camera platform disposed on the multidimensional motion stage and interposed between the multidimensional motion stage and the noncontact metrology probe such that the camera platform communicates motion of the first motion arm, the second motion arm, and the third motion arm to the noncontact metrology probe;
    a tracker comprising:
        a tracker field of view; and
        a world coordinate system to which an element in the tracker field of view is provided a world coordinate, wherein the tracker:
        optically overlaps the probe focal volume; and
        determines a location of the probe focal volume in the tracker field of view,
    the non-contact coordinate measuring machine having the noncontact metrology probe for non-contact coordinate measurement of the element in an absence of a stylus and in an absence of physical contact with the element.

2. The non-contact coordinate measuring machine of claim 1, further comprising a secondary member disposed on the camera platform in the tracker field of view and comprising a tracker coordinate system that links the first coordinate system, the second coordinate system, and the third coordinate system to the world coordinate system.

3. The non-contact coordinate measuring machine of claim 1, further comprising a controller in communication with the multidimensional motion stage and that controls:
movement of the first motion arm along the first machine direction,
movement of the second motion arm along the second machine direction, and
movement of the third motion arm along the third machine direction.

4. The non-contact coordinate measuring machine of claim 3, wherein the controller provides a single-point coincidence, and selection of a measurement coordinate through a graphical user interface (GUI) by point-and-click in an image captured by the non-contact coordinate measuring machine.

5. The non-contact coordinate measuring machine of claim 1, further comprising a reference member disposed in the probe focal volume.

6. The non-contact coordinate measuring machine of claim 5, further comprising a reference member support in communication with the reference member and on which the reference member is disposed.

7. The non-contact coordinate measuring machine of claim 6, wherein the non-contact coordinate measuring machine provides a first reference image centroid, a second reference image centroid, and a third reference image centroid of the reference member.

8. The non-contact coordinate measuring machine of claim 1, wherein the noncontact metrology probe provides a centroid of the probe focal volume.

9. The non-contact coordinate measuring machine of claim 8, further comprising an object member disposed external to the centroid.

10. The non-contact coordinate measuring machine of claim 9, wherein the non-contact coordinate measuring machine determines an object centroid of the object member.

11. The non-contact coordinate measuring machine of claim 10, wherein the non-contact coordinate measuring machine determines a distance differential between the centroid and the object centroid.

12. The non-contact coordinate measuring machine of claim 11, wherein the non-contact coordinate measuring machine further comprises a controller that moves the noncontact metrology probe based on the distance differential so that the object centroid and the centroid overlap.

13. The non-contact coordinate measuring machine of claim 1, wherein the multidimensional motion stage 210 further comprises a three degree-of-freedom motion stage or a six degree-of-freedom motion stage.

14. The non-contact coordinate measuring machine 200 of claim 1, wherein the non-contact coordinate measuring machine provides imaging-based non-contact to obtain the coordinate measurement of the object.

15. A process for calibrating the non-contact coordinate measuring machine of claim 1, the process comprising:
disposing a reference member in the probe focal volume of the non-contact coordinate measuring machine with the multidimensional motion stage at a first position;
obtaining, by the first camera, a first reference image centroid of the reference member;
obtaining, by the second camera, a second reference image centroid of the reference member;
obtaining, by the third camera, a third reference image centroid of the reference member;
determining a first set of image centroids comprising the first reference image centroid, the second reference image centroid, and the third reference image centroid;
moving multidimensional motion stage to a second position, such that reference member has a second set of image centroids;
measuring, by the tracker, a three-dimensional location of the centroid;
producing a machine coordinate system by moving the multidimensional motion stage to a plurality of positions along orthogonal directions while measuring, with the tracker, the three-dimensional location of the centroid at each position;
producing a pixel coordinate vector $\vec{u}$ from the second set of image centroids;
producing a point vector $\vec{U}$ from the three-dimensional location of the centroid; and
determining a pose of the first camera, the second camera, and the third camera from the pixel coordinate vector $\vec{u}$ and the point vector $\vec{U}$ to calibrate the non-contact coordinate measuring machine.

16. A process for targeting an object member with the non-contact coordinate measuring machine of claim 1, the process comprising:
determining a centroid of a probe focal volume for the non-contact coordinate measuring machine;
disposing the object member at an arbitrary position with respect to the centroid;
obtaining a first image of the object member by the first camera;
obtaining a second image of the object member by the second camera;
obtaining a third image of the object member by the third camera;
producing a region of interest of the object member in the first image, the second image, and the third image;
determining, from the first image, a first object image centroid for the object member;
determining, from the second image, a second object image centroid for the object member;
determining, from the third image, a third object image centroid for the object member;
producing target coordinates from the first object image centroid, the second object image centroid, and the third object image centroid; and
determining a distance differential between the centroid and the object centroid to target the object member.

17. The process of claim 16 for targeting the object member with the non-contact coordinate measuring machine, further comprising:
moving the multidimensional motion stage, based on the distance differential, so that the object centroid overlaps the centroid.

* * * * *